(12) United States Patent
Schmitt et al.

(10) Patent No.: US 9,858,619 B2
(45) Date of Patent: Jan. 2, 2018

(54) SYSTEM AND METHOD FOR AGGREGATING MARKET DATA OF FINANCIAL INTERESTS

(71) Applicant: AEQUITAS INNOVATIONS INC., Toronto, Ontario (CA)

(72) Inventors: Joseph Schmitt, Toronto (CA); Stephen Bain, Toronto (CA)

(73) Assignee: Aequitas Innovations Inc. (CA)

( * ) Notice: Subject to any disclaimer, the term of this patent is extended or adjusted under 35 U.S.C. 154(b) by 0 days.

(21) Appl. No.: 14/735,771

(22) Filed: Jun. 10, 2015

(65) Prior Publication Data

US 2015/0356678 A1    Dec. 10, 2015

Related U.S. Application Data

(63) Continuation of application No. PCT/CA2013/001014, filed on Dec. 9, 2013.

(60) Provisional application No. 61/838,763, filed on Jun. 24, 2013, provisional application No. 61/838,696, filed on Jun. 24, 2013, provisional application No. 61/894,608, filed on Oct. 23, 2013, provisional application No. 61/735,836, filed on Dec. 11, 2012, provisional application No. 61/735,846, filed on Dec. 11, 2012.

(51) Int. Cl.
*G06Q 40/00* (2012.01)
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ......... G06Q 40/00; G06Q 40/04; G06Q 40/06
USPC .............................................. 705/35, 36 R, 37
See application file for complete search history.

(56) References Cited

U.S. PATENT DOCUMENTS

| 5,820,463 A | 10/1998 | O'Callaghan |
| 6,278,982 B1 | 8/2001 | Korhammer et al. |
| (Continued) | | |

FOREIGN PATENT DOCUMENTS

| CN | 1361893 A | 7/2002 |
| DE | 08768112 T1 | 9/2010 |
| (Continued) | | |

OTHER PUBLICATIONS

International Search Report dated Feb. 24, 2014 corresponding to International Patent Application No. PCT/CA2013/001014, 3 pages.

(Continued)

*Primary Examiner* — Lalita M Hamilton
(74) *Attorney, Agent, or Firm* — Eric L. Sophir; Dentons US LLP

(57) ABSTRACT

Embodiments described herein relate to systems, methods, and computer readable instructions for processing data in financial interests, using automated electronic systems configured for aggregating market data relating to financial interests across multiple networked venues, including order books, venues, marketplaces, exchanges, alternative trading systems, and/or other markets, and/or various types thereof. Embodiments described herein may provide a consolidated view of market data specific to a market participant that may include generic data visible and accessible to other market participants and specific data visible and accessible only by the market participant.

11 Claims, 42 Drawing Sheets

(56) References Cited

U.S. PATENT DOCUMENTS

| | | | |
|---|---|---|---|
| 6,594,643 | B1 | 7/2003 | Freeny, Jr. |
| 7,716,121 | B2 | 5/2010 | Walsky |
| 7,974,909 | B1* | 7/2011 | Tresenriter ............ G06Q 40/04 705/37 |
| 9,047,243 | B2* | 6/2015 | Taylor .................. G06F 15/167 |
| 2002/0073017 | A1 | 6/2002 | Robertson |
| 2002/0088726 | A1* | 7/2002 | Chou ....................... A45F 3/04 206/320 |
| 2003/0004853 | A1 | 1/2003 | Ram et al. |
| 2008/0133395 | A1 | 6/2008 | Jimenez et al. |
| 2010/0332650 | A1* | 12/2010 | Aisen ................. H04L 43/0852 709/224 |
| 2011/0112952 | A1 | 5/2011 | Annunziata et al. |
| 2012/0143784 | A1 | 6/2012 | Miles et al. |
| 2012/0215801 | A1 | 8/2012 | Indeck et al. |
| 2012/0246052 | A1 | 9/2012 | Taylor et al. |
| 2013/0218739 | A1 | 8/2013 | Kmiec et al. |
| 2013/0262287 | A1 | 10/2013 | Parsons et al. |

FOREIGN PATENT DOCUMENTS

| | | |
|---|---|---|
| JP | 2005202977 A | 7/2005 |
| JP | 2006053839 A | 2/2006 |
| KR | 100985644 B1 | 10/2010 |
| WO | 00/65510 A1 | 11/2000 |

OTHER PUBLICATIONS

Canadian Communication; Submission of Prior Art (Section 34.1 of the Patent Act) and Protest (Section 10 of the Patent Rules), dated Jun. 30, 2016 in Canadian Application No. 2,893,779, 19 pages.

European Communication dated Jul. 22, 2016 in European Application No. 13863168.4, 1 page.

Canadian Official Action dated Aug. 22, 2016 in Canadian Application No. 2,893,779, 12 pages.

Submission of Prior Art (Section 34.1 of the Patent Act) and Protest (Section 10 of the Patent Rules) dated Dec. 14, 2016 in corresponding Aequitas Canadian Application No. 2,893,779, 5 pages.

* cited by examiner

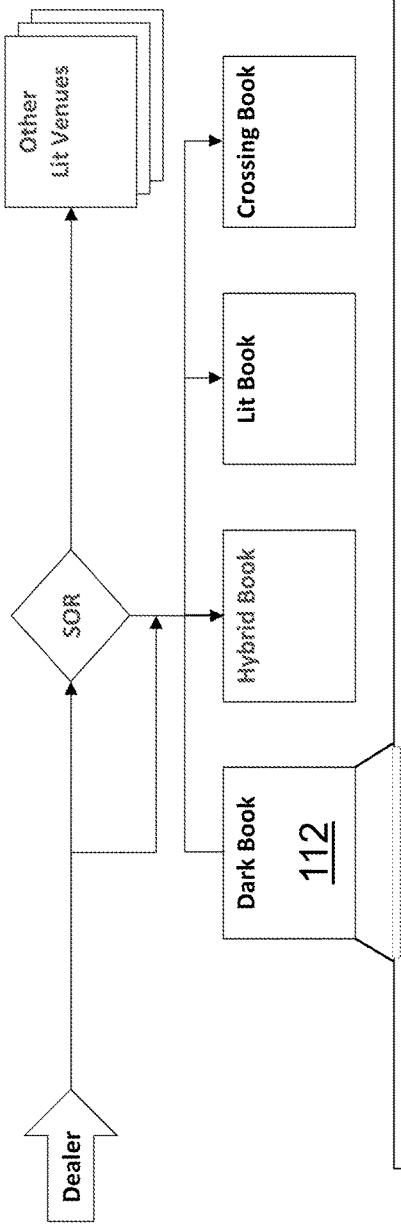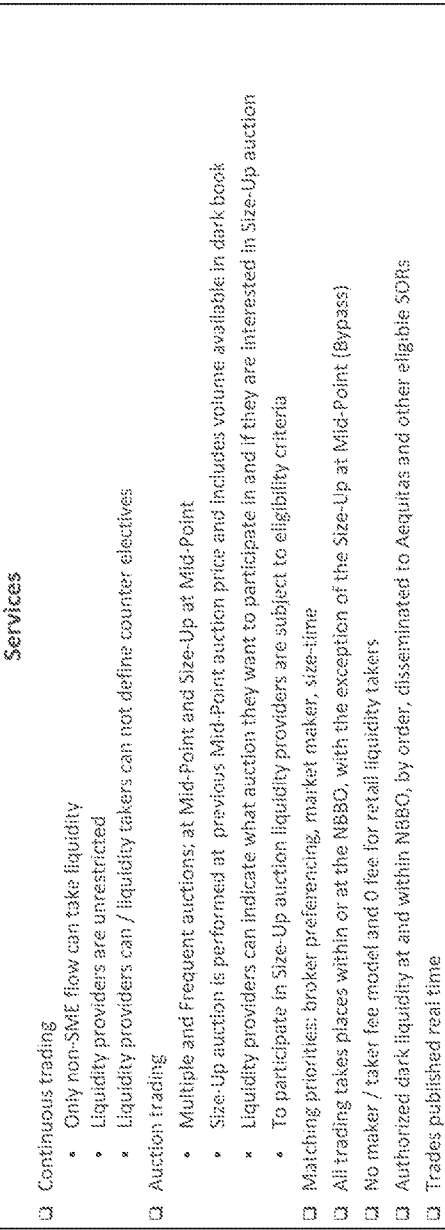
FIG. 2

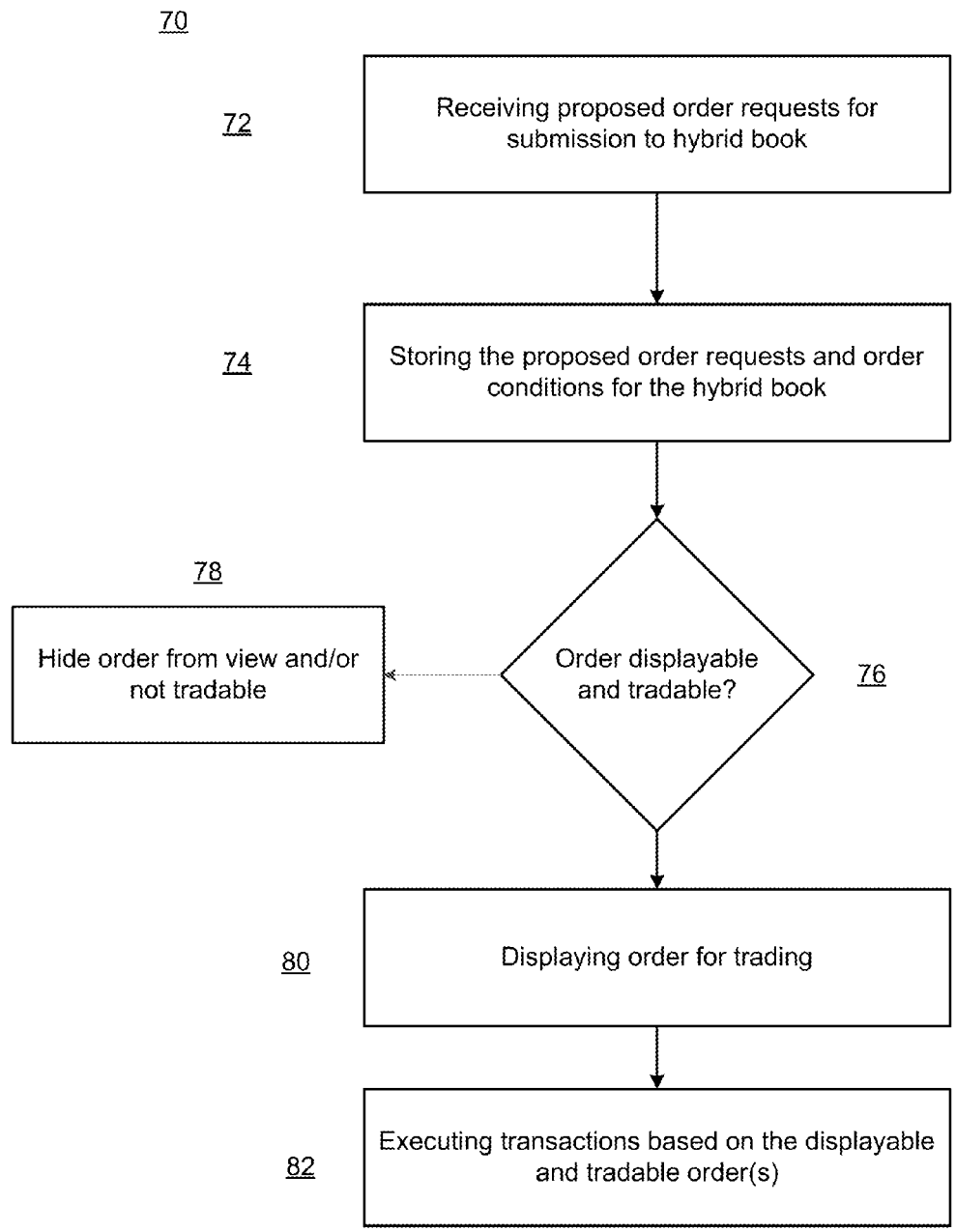

| Market | OID/CNT | Bid Vol | Bid Prc | Ask Prc | Ask Vol | OID/CNT | Market |
|---|---|---|---|---|---|---|---|
| CHIX | <_> | 6,100 | 4.570 | | | | PIOR |
| PIOR | <1> | 1,000 | | | | 67,500 | <4> PIOR |
| CHIX | <5> | | 4.560 | | | 15,500 | <1> CHIX |
| CHIX | <4> | 15,700 | 4.550 | | | 16,300 | <5> CHIX |
| CHIX | <1> | 20,000 | 4.540 | | | 4,200 | <1> CHIX |
| CHIX | <2> | 21,500 | 4.530 | | | 14,000 | <2> CHIX |
| PIOR | <_> | 2,400 | | | | 12,000 | <1> CHIX |
| PIOR | <1> | 1,300 | 4.400 | | | 12,200 | <1> CHIX |
| | | | | | | 12,000 | <1> CHIX |
| | | | | | | 20,000 | <1> PIOR |
| | | | | | | 1,000 | <1> CHIX |
| | | | | | | 20,000 | <1> CHIX |
| | | | | | | 2,145 | <1> PIOR |
| | | | | | | 10,000 | <1> CHIX |
| | | | | | | 12,000 | <1> CHIX |
| | | | | | | 12,000 | <1> CHIX |
| | | | | | | 12,000 | <1> CHIX |
| | | | | | | 20,000 | <2> PIOR |
| | | | | | | | <2> PIOR |
| | | | | | | 1,000 | <2> PIOR |
| | | | | | | | <1> PIOR |
| | | | | | | | <5> PIOR |
| | | | | | | 6,700 | <_> |
| | | | | | | 600 | <2> CHIX |
| | | | | | 7,000 | | |

| Market | Time | Price | Volume | Broker 1 | Broker 2 | Cross | TT | NBBO |
|---|---|---|---|---|---|---|---|---|
| PALP | 09:30:47.849 | 4.580 | 2,000 | 002 | 001 | | N | [CHIX] 18100 4.570, 4.590 6300 [CHIX] |
| PALP | 09:30:47.849 | 4.580 | 2,000 | 002 | 001 | | N | [CHIX] 18100 4.570, 4.590 6300 [CHIX] |
| PALP | 09:30:47.849 | 4.580 | 1,200 | 002 | 001 | | N | [CHIX] 18100 4.570, 4.590 6300 [CHIX] |
| PALP | 09:30:47.849 | 4.580 | 1,200 | 002 | 001 | | N | [CHIX] 18100 4.570, 4590 6300 [CHIX] |
| PIOR | 09:30:47.809 | 4.580 | 83 | 002 | 001 | | N | [CHIX] 4100 4.580, 4.590 4700 [CHIX] |
| PIOR | 09:30:47.809 | 4.580 | 83 | 002 | 001 | | N | [CHIX] 4100 4.500, 4.590 4700 [CHIX] |
| CHIX | 09:30:24.982 | 4.600 | 1,000 | 001 | 001 | | N | [CHIX] 6900 4.590, 4.600 5400 [CHIX] |
| CHIX | 09:30:24.982 | 4.600 | 1,800 | 001 | 001 | | N | [CHIX] 6900 4.590, 4.600 5400 [CHIX] |
| CHIX | 09:30:24.982 | 4.600 | 2,000 | 001 | 001 | | N | [CHIX] 6900 4.590, 4.600 7400 [CHIX] |
| CHIX | 09:30:24.982 | 4.600 | 2,000 | 001 | 001 | | N | [CHIX] 6900 4.590, 4.600 7400 [CHIX] |
| PALP | 09:30:21.769 | 4.600 | 300 | 002 | 001 | | N | [CHIX] 8000 4.590, 4.600 7400 [CHIX] |
| PALP | 09:30:21.769 | 4.600 | 300 | 002 | 001 | | N | [CHIX] 8000 4.590, 4.600 7400 [CHIX] |
| CHIX | 09:30:10.228 | 4.590 | 800 | 001 | 001 | | N | [CHIX] 7200 4.590, 4.600 7400 [CHIX] |
| CHIX | 09:30:10.228 | 4.590 | 800 | 001 | 001 | | N | [CHIX] 7200 4.590, 4.600 7400 [CHIX] |
| CHIX | 09:30:10.228 | 4.590 | 200 | 065 | 001 | | N | [CHIX] 7400 4.590, 4.600 7400 [CHIX] |
| CHIX | 09:30:10.228 | 4.590 | 200 | 065 | 001 | | N | [CHIX] 7400 4.590, 4.600 7400 [CHIX] |
| CHIX | 09:30:06.470 | 4.595 | 1,100 | 065 | 001 | | N | [CHIX] 5500 4.590, 4.600 19300 [CHIX] |
| CHIX | 09:30:06.470 | 4.595 | 1,100 | 065 | 001 | | N | [CHIX] 5500 4.590, 4.600 19300 [CHIX] |
| CHIX | 09:30:06.430 | 4.595 | 3,200 | 065 | 001 | | N | [CHIX] 3500 4.590, 4.600 19300 [CHIX] |
| CHIX | 09:30:06.430 | 4.595 | 3,200 | 065 | 001 | | N | [CHIX] 3500 4.590, 4.600 19300 [CHIX] |
| CHIX | 09:30:06.352 | 4.595 | 6,300 | 065 | 001 | | N | [CHIX] 200 4.590, 4.600 19300 [CHIX] |
| CHIX | 09:30:06.352 | 4.595 | 6,300 | 065 | 001 | | N | [CHIX] 200 4.590, 4.600 19300 [CHIX] |
| CHIX | 09:30:06.098 | 4.590 | 1,300 | 001 | 065 | | N | [CHIX] 400 4.580, 4.590 1300 [CHIX] |
| CHIX | 09:30:06.098 | 4.590 | 1,300 | 001 | 065 | | N | [CHIX] 400 4.580, 4.590 1300 [CHIX] |

FIG. 7E

| Market | OID/CNT | Bid Vol | Bid Prc | Ask Prc | Ask Vol | OID/CNT | Market |
|---|---|---|---|---|---|---|---|
| CHX | 107781 | 2,000 | 4,570 | | | | |
| CHX | 110718 | 2,100 | 4,570 | | | | |
| CHZ | 110021 | 2,000 | 4,570 | | 19,000 | | PIOR |
| PIOR | | 1,000 | 4,570 | | 67,500 | | PIOR |
| CHX | 110720 | 2,000 | 4,560 | 4,580 | 1,600 | 122306 | CHX |
| CHX | 120409 | 200 | 4,560 | 4,580 | 2,000 | 122309 | CHX |
| CHX | 120678 | 2,100 | 4,560 | 4,580 | 11,900 | 122310 | CHX |
| CHX | 120679 | 2,000 | 4,560 | 4,590 | 2,000 | 120400 | CHX |
| CHX | 37055 | 12,000 | 4,560 | 4,590 | 2,000 | 120401 | CHX |
| CHX | 120691 | 2,000 | 4,550 | 4,590 | 200 | 120402 | CHX |
| CHX | 122307 | 200 | 4,550 | 4,590 | 2,100 | 120677 | CHX |
| CHX | 54444 | 12,000 | 4,550 | 4,590 | 12,000 | 122313 | CHX |
| CHX | 54447 | 1,500 | 4,550 | 4,600 | 2,100 | 110713 | CHX |
| CHX | 58790 | 20,000 | 4,540 | 4,600 | 2,000 | 110715 | CHX |
| CHX | 122309 | 20,000 | 4,530 | 4,600 | 100 | 110727 | CHX |
| CHX | 122311 | 1,500 | 4,530 | 4,610 | 2,000 | 107748 | CHX |
| PIOR | | 100 | 4,500 | 4,620 | 12,000 | 110717 | CHX |
| PIOR | | 500 | 4,500 | 4,620 | 12,000 | 107807 | CHX |
| PIOR | | 800 | 4,500 | 4,630 | 11,000 | 37056 | CHX |
| PIOR | | 300 | 4,400 | 4,630 | 200 | 17167 | CHX |
| PIOR | | 1,000 | 4,400 | 4,640 | 1,000 | 54452 | CHX |
| PIOR | | 500 | 4,050 | 4,650 | 12,000 | 30067 | CHX |
| | | | | 4,650 | 20,000 | 37566 | CHX |
| | | | | 4,660 | 1,000 | | PIOR |
| | | | | 4,660 | 20,000 | 37568 | CHX |
| | | | | 4,660 | 2,145 | | PIOR |
| | | | | 4,670 | 20,000 | 36124 | CHX |
| | | | | 4,680 | 12,000 | 30997 | CHX |
| | | | | 4,690 | 12,000 | 22502 | CHX |
| | | | | 4,700 | 12,000 | 15547 | CHX |
| | | | | 4,710 | 20,000 | 17736 | CHX |
| | | | | 4,720 | 20,000 | | PIOR |

| Market | Time | Price | Volume | Broker 1 | Broker 2 | Cross | TT | NBBO |
|---|---|---|---|---|---|---|---|---|
| PALP | 09:30:47.849 | 4,580 | 2,000 | 002 | 001 | | N | [CHIX] 19100 4,570, 4,590 6300 [CHIX] |
| PALP | 09:30:47.849 | 4,580 | 2,000 | 002 | 001 | | N | [CHIX] 18100 4,570, 4,590 6300 [CHIX] |
| PALP | 09:30:47.849 | 4,580 | 1,200 | 002 | 001 | | N | [CHIX] 18100 4,570, 4,590 6300 [CHIX] |
| PALP | 09:30:47.849 | 4,585 | 1,200 | 002 | 001 | | N | [CHIX] 18100 4,570, 4,590 6300 [CHIX] |
| CHIX | 09:30:47.659 | 4,580 | | 002 | 001 | | N | [CHIX] 4100 4,580, 4,590 4200 [CHIX] |
| PIOR | 09:30:47.609 | 4,500 | | 002 | 001 | | N | [CHIX] 4100 4,580, 4,590 1200 [CHIX] |
| CHIX | 09:30:24.982 | 4,600 | 1,800 | 001 | 001 | | N | [CHIX] 6900 4,590, 4,600 5400 [CHIX] |
| CHIX | 09:30:24.982 | 4,600 | 1,800 | 001 | 001 | | N | [CHIX] 6900 4,590, 4,600 5400 [CHIX] |
| CHIX | 09:30:24.982 | 4,600 | 2,000 | 001 | 001 | | N | [CHIX] 6900 4,590, 4,600 7400 [CHIX] |
| CHIX | 09:30:24.982 | 4,600 | 2,000 | 001 | 001 | | N | [CHIX] 6900 4,590, 4,600 7400 [CHIX] |
| PALP | 09:30:21.769 | 4,600 | 300 | 002 | 001 | | N | [CHIX] 8000 4,590, 4,600 7400 [CHIX] |
| PALP | 09:30:21.769 | 4,600 | 300 | 002 | 001 | | N | [CHIX] 8000 4,590, 4,600 7400 [CHIX] |
| CHIX | 09:30:10.228 | 4,590 | 800 | 001 | 001 | | N | [CHIX] 7200 4,590, 4,600 7400 [CHIX] |
| CHIX | 09:30:10.228 | 4,590 | 800 | 001 | 001 | | N | [CHIX] 7200 4,590, 4,600 7400 [CHIX] |
| CHIX | 09:30:10.228 | 4,590 | 200 | 065 | 001 | | N | [CHIX] 7400 4,590, 4,600 7400 [CHIX] |
| CHIX | 09:30:10.228 | 4,590 | 200 | 065 | 001 | | N | [CHIX] 7400 4,590, 4,600 7400 [CHIX] |
| CHIX | 09:30:06.479 | 4,595 | 1,100 | 065 | 001 | | N | [CHIX] 5500 4,590, 4,600 19300 [CHIX] |
| CHIX | 09:30:06.479 | 4,595 | 3,200 | 065 | 001 | | N | [CHIX] 5500 4,580, 4,600 19300 [CHIX] |
| CHIX | 09:30:06.430 | 4,595 | 3,200 | 065 | 001 | | N | [CHIX] 3500 4,590, 4,600 19300 [CHIX] |
| CHIX | 09:30:06.430 | 4,595 | 6,300 | 065 | 001 | | N | [CHIX] 200 4,590, 4,600 19300 [CHIX] |
| CHIX | 09:30:06.352 | 4,595 | 6,300 | 065 | 001 | | N | [CHIX] 200 4,590, 4,600 19300 [CHIX] |
| CHIX | 09:30:06.098 | 4,590 | 1,300 | 001 | 065 | | N | [CHIX] 400 4,580, 1,590 1300 [CHIX] |
| CHIX | 09:30:06.098 | 4,590 | 1,300 | 001 | 065 | | N | [CHIX] 400 4,580, 1,590 1300 [CHIX] |

| Market | OID/CNT | Bid Vol | Bid Prc | Ask Prc | Ask Vol | OID/CNT | Market |
|---|---|---|---|---|---|---|---|
| CHIX | <3> | 6,100 | 4.570 | 4.270 | 19,000 | <1> | PIOR |
| CHIX | 107784 | 2,000 | 4.570 | 4.270 | 19,000 | | PIOR |
| CHIX | 110710 | 2,100 | 4.570 | 4.290 | 67,500 | <1> | PIOR |
| CHIX | 110721 | 2,000 | 4.570 | 4.290 | 67,500 | | PIOR |
| PIOR | <1> | 1,000 | 4.570 | 4.580 | 15,500 | <3> | CHIX |
| PIOR | 000531323103AORT1 | 1,000 | 4.570 | 4.580 | 1,000 | 122309 | CHIX |
| CHIX | <5> | 18,300 | 4.560 | 4.580 | 2,000 | 122309 | CHIX |
| CHIX | 110720 | 2,000 | 4.560 | 4.580 | 11,900 | 122310 | CHIX |
| CHIX | 120403 | 200 | 4.560 | 4.590 | 10,300 | <5> | CHIX |
| CHIX | 120678 | 2,100 | 4.560 | 4.590 | 2,000 | 120400 | CHIX |
| CHIX | 120679 | 2,000 | 4.560 | 4.590 | 2,000 | 120401 | CHIX |
| CHIX | 37055 | 12,000 | 4.560 | 4.590 | 200 | 120402 | CHIX |
| CHIX | <4> | 15,700 | 4.550 | 4.590 | 2,100 | 120677 | CHIX |
| CHIX | 120681 | 2,000 | 4.550 | 4.590 | 12,000 | 122313 | CHIX |
| CHIX | 122307 | 200 | 4.550 | 4.600 | 4,200 | <3> | CHIX |
| CHIX | 54444 | 12,000 | 4.550 | 4.600 | 2,100 | 110713 | CHIX |
| CHIX | 54447 | 1,500 | 4.550 | 4.600 | 2,000 | 110715 | CHIX |
| CHIX | <1> | 20,000 | 4.540 | 4.600 | 100 | 110727 | CHIX |
| CHIX | 58790 | 20,000 | 5.540 | 4.610 | 14,000 | <2> | CHIX |
| CHIX | <2> | 21,800 | 4.530 | 4.610 | 2,000 | 107748 | CHIX |
| CHIX | 122300 | 20,000 | 4.530 | 4.610 | 12,000 | 110717 | CHIX |
| CHIX | 122311 | 1,500 | 4.530 | 4.620 | 12,000 | <1> | CHIX |
| PIOR | <3> | 2,400 | 4.500 | 4.620 | 12,000 | 107807 | CHIX |
| PIOR | 000531307S4AORT1 | 1,100 | 4.500 | 4.630 | 12,200 | <3> | CHIX |
| PIOR | 000531312164AORT1 | 500 | 4.500 | 4.630 | 11,000 | 37856 | CHIX |
| PIOR | 000531321844AORT1 | 800 | 4.500 | 4.630 | 200 | 47167 | CHIX |
| PIOR | <2> | 1,300 | 4.400 | 4.630 | 1,000 | 54452 | CHIX |
| PIOR | 000531306184ORT1 | 300 | 4.400 | 4.640 | 12,000 | <1> | CHIX |
| PIOR | 000531319684ORT1 | 1,000 | 4.400 | 4.640 | 12,000 | 38867 | CHIX |
| PIOR | <1> | 500 | 4.050 | 4.650 | 20,000 | <1> | CHIX |
| PIOR | 000531307404ORT1 | 500 | 4.050 | 4.650 | 20,000 | 37566 | CHIX |

| Market | Time | Price | Volume | Broker 1 | Broker 2 | Cross | TT | NBBO |
|---|---|---|---|---|---|---|---|---|
| PALP | 09:30:47.849 | 4.580 | 2,000 | 002 | 001 | | N | [CHIX] 18100 4.570, 4.590 6300 [CHIX] |
| PALP | 09:30:47.849 | 4.580 | 2,000 | 002 | 001 | | N | [CHIX] 18100 4.570, 4.590 6300 [CHIX] |
| PALP | 09:30:47.849 | 4.580 | 1,200 | 002 | 001 | | N | [CHIX] 18100 4.570, 4.590 6300 [CHIX] |
| PALP | 09:30:47.849 | 4.580 | 1,200 | 002 | 001 | | N | [CHIX] 18100 4.570, 4.590 6300 [CHIX] |
| PIOR | 09:30:47.809 | 4.580 | 83 | 002 | 001 | | N | [CHIX] 4100 4.580, 4.590 4200 [CHIX] |
| PIOR | 09:30:47.809 | 4.580 | 83 | 002 | 001 | | N | [CHIX] 4100 4.580, 4.590 4200 [CHIX] |
| CHIX | 09:30:24.982 | 4.600 | 1,800 | 001 | 001 | | N | [CHIX] 6900 4.590, 4.600 5400 [CHIX] |
| CHIX | 09:30:24.982 | 4.600 | 1,800 | 001 | 001 | | N | [CHIX] 6900 4.590, 4.600 5400 [CHIX] |
| CHIX | 09:30:24.982 | 4.600 | 2,000 | 001 | 001 | | N | [CHIX] 6900 4.590, 4.600 7400 [CHIX] |
| CHIX | 09:30:24.982 | 4.600 | 2,030 | 001 | 001 | | N | [CHIX] 6900 4.590, 4.600 7400 [CHIX] |
| PALP | 09:30:21.769 | 4.600 | 300 | 002 | 001 | | N | [CHIX] 8000 4.590, 4.600 7400 [CHIX] |
| PALP | 09:30:21.769 | 4.600 | 300 | 002 | 001 | | N | [CHIX] 8000 4.590, 4.600 7400 [CHIX] |
| CHIX | 09:30:10.228 | 4.590 | 800 | 001 | 001 | | N | [CHIX] 7200 4.590, 4.600 7400 [CHIX] |
| CHIX | 09:30:10.228 | 4.590 | 800 | 001 | 001 | | N | [CHIX] 7400 4.590, 4.600 7400 [CHIX] |
| CHIX | 09:30:10.228 | 4.590 | 200 | 065 | 001 | | N | [CHIX] 7400 4.590, 4.600 7400 [CHIX] |
| CHIX | 09:30:10.228 | 4.590 | 200 | 065 | 001 | | N | [CHIX] 7400 4.590, 4.600 7400 [CHIX] |
| CHIX | 09:30:06.479 | 4.595 | 1,100 | 065 | 001 | | N | [CHIX] 5500 4.590, 4.600 19300 [CHIX] |
| CHIX | 09:30:06.479 | 4.595 | 1,100 | 065 | 001 | | N | [CHIX] 5500 4.590, 4.600 19300 [CHIX] |
| CHIX | 09:30:06.430 | 4.595 | 3,200 | 065 | 001 | | N | [CHIX] 3500 4.590, 4.600 19300 [CHIX] |
| CHIX | 09:30:06.430 | 4.595 | 3,200 | 065 | 001 | | N | [CHIX] 3500 4.590, 4.600 19300 [CHIX] |
| CHIX | 09:30:06.352 | 4.595 | 6,300 | 065 | 001 | | N | [CHIX] 200 4.590, 4.600 19300 [CHIX] |
| CHIX | 09:30:06.352 | 4.595 | 6,300 | 065 | 001 | | N | [CHIX] 200 4.590, 4.600 19300 [CHIX] |

400

402 — Receiving proposed order requests including buy order requests and sell order requests 404 — Storing the proposed order requests 406 — Matching buy orders to sell orders according to at least three matching factors 408 — Executing transactions based on the buy orders matched to the sell orders

FIG. 12

Originating Order Book: 502

| ID | SIDE | TIME | QTY | PRICE | SIDE | TIME | QTY |
|----|------|----------|-----|----------|------|----------|-----|
| 3  |      |          |     | $ 20.30  | SELL | 09:30:05 | 200 |
| 1  |      |          |     | $ 20.30  | SELL | 09:30:01 | 100 |
| 2  |      |          |     | $ 20.25  | SELL | 09:30:03 | 100 |
| 5  | BUY  | 09:30:08 | 200 | $ 20.20  |      |          |     |
| 4  | BUY  | 09:30:06 | 100 | $ 20.15  |      |          |     |
| 6  | BUY  | 09:30:09 | 200 | $ 20.15  |      |          |     |

FIFO scenario: order to buy 250 shares submitted at 20.35
1. 100 shares at 20.25 (order 2)
2. 100 shares at 20.30 (order 1)
3. 50 shares at 20.30 (order 3)

Resulting Order Book: 504

| ID | SIDE | TIME | QTY | PRICE | SIDE | TIME | QTY |
|----|------|----------|-----|----------|------|----------|-----|
| 3  |      |          |     | $ 20.30  | SELL | 09:30:05 | 150 |
| 5  | BUY  | 09:30:08 | 200 | $ 20.20  |      |          |     |
| 4  | BUY  | 09:30:06 | 100 | $ 20.15  |      |          |     |
| 6  | BUY  | 09:30:09 | 200 | $ 20.15  |      |          |     |

Pro rata scenario: order to buy 250 shares submitted at 20.35
1. 100 at 20.25 (order 2)
2. 50 at 20.30 (order 1 1/3 of residual volume)
3. 100 at 20.30 (order 3 (2/3 of residual volume))

Resulting Order Book 506

| ID | SIDE | TIME | QTY | PRICE | SIDE | TIME | QTY |
|----|------|----------|-----|----------|------|----------|-----|
| 3  |      |          |     | $ 20.30  | SELL | 09:30:05 | 100 |
| 1  |      |          |     | $ 20.30  | SELL | 09:30:01 | 50  |
| 5  | BUY  | 09:30:08 | 200 | $ 20.20  |      |          |     |
| 4  | BUY  | 09:30:06 | 100 | $ 20.15  |      |          |     |
| 6  | BUY  | 09:30:09 | 200 | $ 20.15  |      |          |     |

FIG. 16

Example 1: (equal weights applied to all size-time elements)

Originating Order Book:

| ID | SIDE | TIME | QTY | PRICE | SIDE | TIME | QTY | PRIORITY TIME | TIME OF LAST EVENT | ORDER SIZE | S/T RANKING |
|---|---|---|---|---|---|---|---|---|---|---|---|
| 3 | | | | $ 20.30 | SELL | 09:30:06 | 200 | 3 | 3 | 1 | 1 |
| 1 | | | | $ 20.30 | SELL | 09:30:01 | 100 | 1 | 1 | 3 | 2 |
| 2 | | | | $ 20.25 | SELL | 09:30:08 | 100 | 2 | 2 | 3 | 3 |
| 5 | BUY | 09:30:08 | 200 | $ 20.20 | | | | 2 | | | |
| 4 | BUY | 09:30:06 | 100 | $ 20.15 | | | | 1 | | | |
| 6 | BUY | 09:30:09 | 200 | $ 20.15 | | | | 3 | | | |

702a

Size/Time scenario: order to buy 250 shares submitted at 20.35
1. 100 at 20.25 (order 2)
2. 150 at 20.30 (order 3)

Resulting Order Book:

| ID | SIDE | TIME | QTY | PRICE | SIDE | TIME | QTY | PRIORITY TIME | TIME OF LAST EVENT | ORDER SIZE | S/T RANKING |
|---|---|---|---|---|---|---|---|---|---|---|---|
| 3 | | | | $ 20.30 | SELL | 09:30:05 | 50 | 2 | 2 | 2 | 2 |
| 1 | | | | $ 20.30 | SELL | 09:30:01 | 100 | 1 | 1 | 1 | 1 |
| 5 | BUY | 09:30:08 | 200 | $ 20.20 | | | | 2 | | | |
| 4 | BUY | 09:30:06 | 100 | $ 20.15 | | | | 1 | | | |
| 6 | BUY | 09:30:09 | 200 | $ 20.15 | | | | 3 | | | |

Example 2: (equal weight applied to Time of Last Event)

Originating Order Book:                                                                                                      704a

| ID | SIDE | TIME | QTY | PRICE | SIDE | TIME | QTY | PRIORITY TIME | TIME OF LAST EVENT | ORDER SIZE | S/T RANKING |
|----|------|------|-----|-------|------|----------|-----|---------------|--------------------|------------|-------------|
| 5  |      |      |     | $ 20.30 | SELL | 09:30:05 | 200 | 5 | 3 | 1 | 3 |
| 3  |      |      |     | $ 20.30 | SELL | 09:30:02 | 200 | 3 | 5 | 1 | 5 |
| 2  |      |      |     | $ 20.30 | SELL | 09:30:01 | 200 | 2 | 4 | 1 | 4 |
| 1  |      |      |     | $ 20.30 | SELL | 09:30:00 | 200 | 1 | 1 | 1 | 1 |
| 4  |      |      |     | $ 20.25 | SELL | 09:30:03 | 100 | 4 | 2 | 5 | 2 |
| 5  | BUY  | 09:30:08 | 200 | $ 20.20 |      |          |     | 2 |   |   |   |
| 4  | BUY  | 09:30:06 | 100 | $ 20.15 |      |          |     | 1 |   |   |   |
| 6  | BUY  | 09:30:09 | 200 | $ 20.15 |      |          |     | 3 |   |   |   |

Size/Time scenario: order to buy 600 shares submitted at 20.35

1. 100 at 20.25 {order 4}
2. 200 at 20.30 {order 1}
3. 200 at 20.35 {order 5}
4. 100 at 20.35 {order 2}

Resulting Order Book:                                                                                                        704b

| ID | SIDE | TIME | QTY | PRICE | SIDE | TIME | QTY | PRIORITY TIME | TIME OF LAST EVENT | ORDER SIZE | S/T RANKING |
|----|------|------|-----|-------|------|----------|-----|---------------|--------------------|------------|-------------|
| 3  |      |      |     | $ 20.30 | SELL | 09:30:02 | 200 | 2 | 1 | 1 | 1 |
| 2  |      |      |     | $ 20.30 | SELL | 09:30:01 | 100 | 1 | 2 | 2 | 2 |
| 5  | BUY  | 09:30:08 | 200 | $ 20.20 |      |          |     | 2 |   |   |   |
| 4  | BUY  | 09:30:06 | 100 | $ 20.15 |      |          |     | 1 |   |   |   |
| 6  | BUY  | 09:30:09 | 200 | $ 20.15 |      |          |     | 3 |   |   |   |

FIG. 17B

Example 3: (greater weight applied to Order Size)

Originating Order Book:

| ID | SIDE | TIME | QTY | PRICE | SIDE | TIME | QTY | PRIORITY TIME | TIME OF LAST EVENT | ORDER SIZE | S/T RANKING |
|---|---|---|---|---|---|---|---|---|---|---|---|
| 5 | | | | $ 20.30 | SELL | 09:30:05 | 200 | 5 | 3 | 1 | 4 |
| 3 | | | | $ 20.30 | SELL | 09:30:02 | 200 | 3 | 5 | 1 | 3 |
| 2 | | | | $ 20.30 | SELL | 09:30:01 | 200 | 2 | 4 | 1 | 2 |
| 1 | | | | $ 20.25 | SELL | 09:30:00 | 200 | 1 | 1 | 1 | 1 |
| 4 | | | | $ 20.25 | SELL | 09:30:03 | 100 | 4 | 2 | 5 | 5 |
| 5 | BUY | 09:30:08 | 200 | $ 20.20 | | | | 2 | | | |
| 4 | BUY | 09:30:06 | 100 | $ 20.15 | | | | 1 | | | |
| 6 | BUY | 09:30:09 | 200 | $ 20.15 | | | | 3 | | | |

706a

Size/Time scenario: order to buy 600 shares submitted at 20.35
1. 100 at 20.25 {order 4}
2. 200 at 20.30 {order 1}
3. 200 at 20.35 {order 2}
4. 100 at 20.35 {order 3}

Resulting Order Book:

| ID | SIDE | TIME | QTY | PRICE | SIDE | TIME | QTY | PRIORITY TIME | TIME OF LAST EVENT | ORDER SIZE | S/T RANKING |
|---|---|---|---|---|---|---|---|---|---|---|---|
| 5 | | | | $ 20.30 | SELL | 09:30:05 | 200 | 5 | 1 | 1 | 1 |
| 3 | | | | $ 20.30 | SELL | 09:30:02 | 100 | 3 | 2 | 2 | 2 |
| 5 | BUY | 09:30:08 | 200 | $ 20.20 | | | | 2 | | | |
| 4 | BUY | 09:30:06 | 100 | $ 20.15 | | | | 1 | | | |
| 6 | BUY | 09:30:09 | 200 | $ 20.15 | | | | 3 | | | |

| TraderID | Order Books | | | | | |
|---|---|---|---|---|---|---|
| | Dark | | Hybrid | | Lit | |
| | Active | Passive | Active | Passive | Active | Passive |
| ABC123 | A | R | A | R | A | A |
| TTH645 | A | R | A | R | A | A |
| YYY554 | R | A | R | A | A | A |

*A = order acceptance by the system where the originating order TraderID is equal to one of the defined within the table*
*R = order rejection by the system where the originating order TraderID is equal to one of the defined within the table*

FIG. 20

| Tag | Tag Name | Tag Value | Order Books | | | | | |
|---|---|---|---|---|---|---|---|---|
| | | | Dark | | Hybrid | | Lit | |
| | | | Active | Passive | Active | Passive | Active | Passive |
| 7729 | Short Marking Exempt | 0 | A | R | A | R | A | A |

A = order acceptance by the system where the order contains the identified TAG and TAG value
R = order rejection by the system where the order contains the identified TAG but does not contain the identified TAG value

FIG. 21

SYSTEM AND METHOD FOR AGGREGATING MARKET DATA OF FINANCIAL INTERESTS

CROSS-REFERENCE TO RELATED APPLICATIONS

This application is a continuation application of PCT International Application No. PCT/CA2013/001014, filed Dec. 9, 2013, which claims the benefit of U.S. Patent Application No. 61/838,763 filed Jun. 24, 2013; U.S. Patent Application No. 61/838,696 filed Jun. 24, 2013; U.S. Patent Application No. 61/894,608 filed Oct. 23, 2013; U.S. Patent Application No. 61/735,836 filed Dec. 11, 2012; and U.S. Patent Application No. 61/735,846 filed Dec. 11, 2012; each of which are hereby incorporated by reference in their entirety.

FIELD

Embodiments described herein relate to systems, methods, and computer readable instructions for processing data representing and/or otherwise related to transactions in financial interests and market data, and using automated electronic systems configured for aggregating market data relating to financial interests across multiple networked venues, including order books, venues, marketplaces, exchanges, alternative trading systems, and/or other markets, and/or various types thereof.

INTRODUCTION

Aspects of embodiments disclosed herein relate to the trading, holding, transfer, buying, selling, and/or administration of financial interests. Financial interests may be used herein to refer to securities, equity, debt, shares, derivatives, and other types of financial interests or instruments. Trading may be used herein to refer to holding, transfer, buying, selling, and other types of exchange. Aspects of such trading, holding, transfer, buying, selling, and/or administration may be subject to regulation by governmental and other agencies. The disclosure herein is made solely in terms of logical, programming, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

Developments in the semi- and/or fully-automated trading of financial interests have created disparities between different types and categories of market participants, and their various needs, expectations and goals. Market participants may be used herein to refer to traders, dealers, investors, advisors, buyers, sellers, vendors, issuers, and other participants directly or indirectly related to trading of financial interests across one or more networked venues. Networked venues may be used herein to refer to order books, venues, securities trading venues, marketplaces, exchanges, alternative trading systems, and/or other markets, and/or various types thereof.

Market participants may be involved in transactions in financial interests and request access to market data related thereto. There exists a need for automated electronic systems configured for aggregating market data relating to financial interests across multiple networked venues, including order books, venues, marketplaces, exchanges, alternative trading systems, and/or other markets, and/or various types thereof, or at least alternatives.

SUMMARY

Accordingly, in various aspects, embodiments disclosed herein provide market participants with the ability to access multiple different networked venues (e.g. order books, marketplaces, venues, exchanges, trading venues, alternative trading systems, markets), selectively, simultaneously, synchronously, and/or in other desired fashion(s). Types of networked venues that may be accessed include, for example, private equity exchanges, public securities exchanges, various order books within an exchange, such as for example dark (i.e., those in which terms of sought and/or proposed trades are not disclosed to other market participants), lit (i.e., those in which terms of sought and/or proposed trades are disclosed to other market participants), various forms of hybrid and other order books. These are illustrative examples of electronic networked venues, and variations may be used by embodiments described herein. For each of these types of networked venues, and for specific implementations, and for different types of orders (e.g. buy, sell) different trading rules, strategies, and/or other parameters may apply, depending on factors such as the type(s) of market participant(s), jurisdiction(s), and regulation(s) involved, among others.

Order routers, including smart order routers (SORs) such as routers which implement latency-normalized and/or otherwise synchronized trading algorithms, may be used in providing the market participant(s) with access to the networked venues. As noted, networked venues may be used herein to refer to order books, venues, securities trading venues, marketplaces, exchanges, alternative trading systems, and/or other markets, and/or various types thereof.

In various aspects, embodiments may further provide improved methods, systems, and computer readable instructions, for reporting or publishing information related to financial interests, trading transactions, and other financial data in order, for example, to facilitate compliance with regulatory and other reporting procedures, for improved trading capabilities, and book keeping, and/or for a wide variety of other purposes; and for exchanging data between networked venues, reporting services and/or other entities. Reporting or publishing may be referred to herein as various activities for increasing visibility of financial interest data, such as distributing, transmitting, making available, and so on.

In an aspect, embodiments described herein may provide a method for aggregating market data relating to financial interests that may involve: receiving a market participant identifier for a market participant; receiving, using a receiver, market data from a plurality of electronic trading venues, wherein the market data comprises market data visible and accessible to the market participant; receiving, using the receiver, drop copy order management system and execution management system data from market participant processors; storing the market data and the drop copy order management system and execution management system data in a persistent store; generating a set of market participant specific data, using a consolidated market view processor, by aggregating and parsing data from the market data and the drop copy order management system and execution management system data based on the market participant identifier, wherein the set of market participant specific data includes generic data visible and accessible to other market participants and specific data visible and accessible only by the market participant; storing the set of market participant specific data in the persistent store; and transmitting, using a transmitter, a consolidated view of the set of market participant specific data.

In accordance with some embodiments, generating the set of market participant specific data may involve: receiving, using the receiver, monitoring and configuration parameters from an administrative interface; and receiving, using the receiver, input data, using feed handlers, wherein the input data comprises the collected market data and the drop copy order management system and execution management system data, wherein the monitoring and configuration parameters govern the collection of input data by the feed handlers;

In accordance with some embodiments, generating the set of user specific data may involve: buffering the input data using an alignment buffer; and generating the set of user specific data using the buffering input data.

In accordance with some embodiments, the input data may include a plurality of events, wherein buffering the input data may involve: implementing a hold-back queue to effectively age the events before releasing them for inclusion as part of the set of market participant specific data.

In accordance with some embodiments, the aging may reduce alignment error for input data, wherein alignment error comprises cross-feed time differences between a time of receipt of an event and a global timestamp at which the event occurred.

In accordance with some embodiments, generating the set of market participant specific data may involve: implementing a pass-through mode by passing input data from individual feed handlers as received to the consolidated market book processor.

In accordance with some embodiments, the input data may include a plurality of feeds, wherein generating the set of market participant specific data may involve: applying simple fixed latency offsets individually to each of the plurality of feeds, using an average latency of a given feed.

In accordance with some embodiments, the method may further involve calculating the simple fixed latency offsets based on historical data.

In accordance with some embodiments, the method may further involve calculating the simple fixed latency offsets using different latency values for different time periods from a pre-configured schedule.

In accordance with some embodiments, the input data may include a plurality of feeds, wherein generating the set of market participant specific data may involve: applying dynamic latency offsets individually to each of the plurality of feeds, wherein an average latency of a given feed varies over time; and calculating the dynamic latency offsets using a moving average based calculation.

In accordance with some embodiments, the method may further involve using simple fixed latency offsets as maximum and minimum values for the dynamic latency offsets.

In accordance with some embodiments, the input data may include a plurality of feeds, wherein generating the set of user specific data may involve: correlating two or more of the plurality of feeds using one or more predefined keys.

In accordance with some embodiments, the method may further involve providing a consolidated view of the set of user specific data by: generating a consolidated market view feed; and transmitting the consolidated market view feed to one or more feed consumers.

In another aspect, embodiments described herein may provide a system for aggregating market data relating to financial interests that may involve: a receiver for receiving a market participant identifier for a market participant, market data from a plurality of electronic trading venues, wherein the market data comprises market data visible and accessible to the market participant, and drop copy order management system and execution management system data from market participant processors; a persistent store for storing the market data and the drop copy order management system and execution management system data; a consolidated market view processor configured to generate a data set of market participant specific data by aggregating and parsing data from the collected market data and the drop copy order management system and execution management system data, wherein the set of market participant specific data includes generic data visible and accessible to other market participants and specific data visible and accessible only by the market participant; and a transmitter to transmit a consolidated market view feed of the market participant specific data to one or more market participant processors.

In accordance with some embodiments, the system may further involve an administrative interface configured to define monitoring and configuration parameters; feed handlers configured to receive input data, wherein the input data comprises the market data and the drop copy order management system and execution management system data, wherein the monitoring and configuration parameters govern the collection of input data by the feed handlers.

In accordance with some embodiments, the system may further involve an alignment buffer for buffering the input data; and wherein consolidated market view processor is further configured to generate the set of market participant specific data using the buffering input data.

In accordance with some embodiments, the input data may include a plurality of events, and wherein the alignment buffer is further configured to buffer the input data by implementing a hold-back queue to effectively age the events before releasing them for inclusion as part of the data set of market participant specific data.

In accordance with some embodiments, the aging may reduce alignment error for input data, wherein alignment error comprises cross-feed time differences between a time of receipt of an event and a global timestamp at which the event occurred.

In accordance with some embodiments, the feed handler may be configured to implement a pass-through mode by passing input data as received to the consolidated market book processor.

In accordance with some embodiments, the alignment buffer may be further configured to apply simple fixed latency offsets individually to each of the plurality of feeds, using an average latency of a given feed.

In accordance with some embodiments, the alignment buffer may be further configured to calculate the simple fixed latency offsets based on historical data.

In accordance with some embodiments, the alignment buffer may be further configured to calculate the simple fixed latency offsets using different latency values for different time periods from a pre-configured schedule.

In accordance with some embodiments, the alignment buffer may be further configured to apply dynamic latency offsets individually to each of the plurality of feeds, wherein an average latency of a given feed varies over time; and calculate the dynamic latency offsets using a moving average based calculation.

In accordance with some embodiments, the alignment buffer may be further configured to use simple fixed latency offsets as maximum and minimum values for the dynamic latency offsets.

In accordance with some embodiments, the feed handler may be further configured to correlate two or more of the plurality of feeds using one or more predefined keys.

In accordance with some embodiments, the system may further involve using a feed generator or aggregator to generate a consolidated market view feed; and one or more feed consumers configured to receive a consolidated market view feed.

DRAWINGS

Various aspects and embodiments, and advantages offered thereby, are shown in the drawings, and described in connection therewith.

FIG. 1 provides an example schematic diagram of a system for automated trading of financial interests according to some embodiments described herein.

FIG. 2 provides an example schematic diagram of a system for automated trading of financial interests according to some embodiments described herein, including an example, non-limiting summary of features, services, systems, and processes provided or otherwise enabled by dark books.

FIG. 3 provides an example schematic diagram of a system for automated trading of financial interests according to some embodiments described herein, including an example, non-limiting summary of features, services, systems, and processes provided or otherwise enabled by hybrid books.

FIGS. 4A, 4B, and 4C provide an example flow chart diagram, example orders for lit books, hybrid books, and dark books, and an example order for transaction execution for a hybrid book according to some embodiments described herein.

FIG. 5 provides an example schematic diagram of a system for automated trading of financial interests according to some embodiments described herein, including an example, non-limiting summary of features, services, systems, and processes provided or otherwise enabled by lit books.

FIG. 6 provides an example schematic diagram of a system for automated trading of financial interests according to some embodiments described herein, including an example, non-limiting summary of features, services, systems, and processes provided or otherwise enabled by crossing books.

FIGS. 7A to 7H provide diagrams relating to a system for automated aggregation of market data related to financial interests according to some embodiments described herein.

FIGS. 8 to 11 provide an example schematic diagram of a system for automated trading of financial interests according to some embodiments described herein.

FIGS. 12 to 15 provide an example flow chart diagrams of a method for automated trading of financial interests according to some embodiments described herein.

FIG. 16 illustrates an example of order book matched under a price/time scenario and a Pro Rata scenario according to some embodiments described herein.

FIGS. 17A, 17B, and 17C illustrate an example of order book matched under a size-time weighted scenario according to some embodiments described herein.

FIG. 20 illustrates an example of potential segmentation table using market participant ID.

FIG. 21 illustrates an example of potential segmentation table using tag and tag value according to some embodiments described herein.

Figure 1:
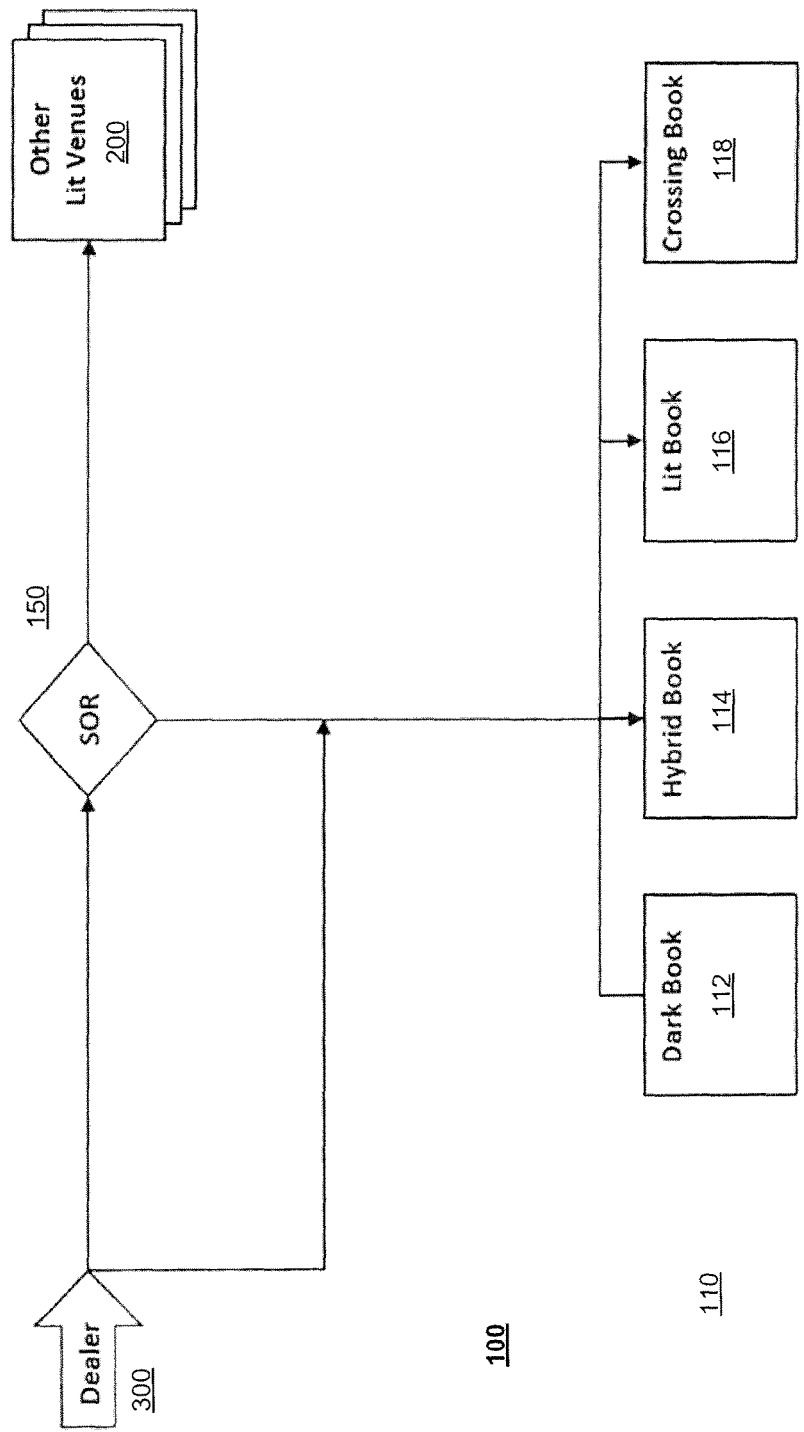

These drawings depict exemplary embodiments for illustrative purposes, and variations, alternative configurations, alternative components and modifications may be made to these exemplary embodiments.

DESCRIPTION OF EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and a combination thereof.

Each program may be implemented in a high level procedural or object oriented programming or scripting language, or a combination thereof, to communicate with a computer system. However, alternatively, the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may execute transactions between buyers and sellers, particularly configure hardware with control logic, transmit, process and store data signals representing transactions, and so on.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Embodiments described herein address a need or provide an alternative for systems, methods, hardware platforms, products, techniques for automated trading of financial instruments.

Embodiments described herein may provide systems, methods, hardware platforms, products, techniques for automated trading of financial interests with improved market structure. The improved market structure may provide quality of execution for all orders (large and small) for different financial interests by various market participants on various networked venues. For example, a smart order router (e.g. computer hardware particularly configured to route orders according to embodiments described herein) may be configured to address book fading and promote maximum order fill rates. A dark and hybrid transparent order book may be configured to prevent or address predatory strategies, and incentivize market maker strategies. A lit book may be configured to favour long term strategies and enable market makers to fulfill their quoting obligations. A crossing book may be configured to support execution of trade prints and opening executions during, and in advance of continuous trading phase availability. The hardware platform may be configured to use a specific order marker or attribute (regulatory or non-regulatory) to identify strategies to prevent or favor. As an example, specific market participants may be restricted to certain types of activities and order types. By way of illustrative example, the Short Marking Exempt (SME) market users may be generally arbitrage accounts, and non-directional trading accounts that hold nominal positions at the end of each trading day.

Embodiments described herein may provide systems, methods, hardware platforms, products, techniques for automated trading of financial interests with cost reduction. For example, embodiments described herein may be configured to prevent or eliminate a maker/taker model for various networked venues with reduced or no fees for active retail trading flows. Embodiments described herein may be configured to provide rebates for resting orders in lit books, or other order books. Embodiments described herein may be configured to provide cost reductions for opening auction event trading Embodiments described herein may provide systems, methods, hardware platforms, products, techniques for automated aggregation of market data related to financial interests. The aggregation of market data may be referred to as a consolidated view. The quality of market data provided by a consolidated market view may be superior to specific trading venue or marketplace data. For example, the consolidated market view may include data for all dealers' orders regardless of the venue to which they are sent. The consolidated view may leverage a strong market making model. The consolidated market view may provide a cost reduction. The consolidated market view may include generic market data available, visible or accessible to a number of market participants, and may also include market data only available, visible or accessible to the market participant requesting the consolidated market view (e.g. private market data). Agreements between market participants may facilitate sharing of private market data between market participants.

Embodiments described herein may provide systems, methods, hardware platforms, products, techniques for automated trading of financial interests with issuance solutions driven by issuers' successes. For example, there may be a listing venue based hardware platform configured to provide data and features for structured products, and corporations ready to be publicly listed. The listing venue may be focused on ensuring adequate liquidity and process efficiency with competitive fees.

Embodiments described herein may provide systems, methods, hardware platforms, products, techniques for automated trading of financial interests with an exempt financial interest marketplace. As an illustrative example, the exempt financial interest marketplace may be configured for companies, and qualified investors. The exempt financial interest marketplace may be targeted to various market participants and intermediaries, such as dealers, investors, issuers, experts, advisors, referral networks, and other types of market participants and intermediaries. The exempt financial interest marketplace may be configured for simplicity, efficiency, and competitive fees. The exempt financial interest marketplace may be configured for coaching and support for small to mid-size companies, and other private organizations, market participants, and intermediaries.

FIG. 1 is a schematic diagram showing both functional aspects and features of a networked system for processing transactions in stocks, bonds, and other financial instruments in accordance with embodiments described herein. In the embodiment shown, a transaction data processing system 100 comprises one or more smart order routers 150 and a plurality of electronic networked venues 110 (e.g. electronic marketplaces, order books, exchanges, alternative trading systems, markets, trading books, and so on). Example electronic networked venues 110 include order books. Example types of order books include dark books 112, hybrid books 114, lit books 116, and/or crossing books 118.

An order book may be an electronic listing of proposed order requests that trading venues (e.g. exchanges) use to record the interest of buyers and sellers in a particular financial instrument. An order book may contain an electronic listing of proposed order requests, where each proposed order request may list a type of order, a market participant identifier, a quantity, a price level, and other attributes or parameters. A matching engine may use the order book to determine which orders can be fulfilled i.e. what trades can be made.

A trading book may be a list of financial interests at different prices or other characteristics for market participants (e.g. dealer, investor, brokerage, financial institution). Financial interests listed in a trading book may be purchased, sold or otherwise transferred by market participants (e.g. dealers) to facilitate trading for themselves, or other market participants (e.g. investors, customers of dealers), to profit from changes in market price or trading spreads between the bid and ask prices, to hedge against various types of risk, and so on. A trading book may record a list of trading interests indicating an interest to buy or sell a financial interest, for example.

Transaction data processing system 100 is configured to receive, from one or more market participant system(s) 300 (referred to by way of illustrative example as dealer systems 300), signal data sets representing instructions relating to transfer, trade, purchase, sale, bid, offer and/or other transaction requests, and/or other processes, relating to transactions in financial interests (e.g. financial instruments, stocks, bonds, and/or any other compatible type(s) of instruments and/or other financial interests). In the embodiment shown, transaction data processing system 100 is further configured to provide to any one or more other electronic networked venues 110, 200 the same and/or other signal data sets relating to such transactions and/or processes. Networked venues may be used herein to refer to order books, venues, financial interest trading venues, marketplaces, exchanges, alternative trading systems, and/or other markets, and/or various types thereof. Networked venues may be implemented using networked hardware, and various electrical configurations.

Communications between market participant system(s) 300, transaction data processing system(s) 100, and/or other networked venue(s) 200 may be accomplished using any suitable means, including for example digital signals processed by suitably configured communications network(s) such as one or more public switched telephone network (PSTNs), the internet, etc., using any suitable communications protocol(s).

As an example of the operation of a transaction data processing system 100 in accordance with embodiments described herein, one or more market participants 300 wishing to propose or execute a transaction in one or more financial interests can access the transaction data processing system 100 via suitably-configured network communications connections to provide suitably-configured transaction data sets comprising any required or otherwise desired transaction parameters or information, including for example identifier(s) associated with interest(s) to be traded, quantity(ies) to be traded, price(s) at which transactions are to be conducted, reserve quantity(ies), etc., and/or any one or more networked venue(s) 110, 200 and or type(s) of networked venue(s) 110, 200 in which such transactions are to take place. Such dealer(s) or other entity(ies) 300 can further specify that some or all of such proposed transactions or processes are to be executed on one or more outside market(s) and/or other networked venue(s) 200.

Among the many significant advantages offered by a transaction data processing system 100 in accordance with embodiments described herein, is the option, provided to market participant system 300, to route any or all of such transaction data sets to any or all of networked venue(s) 110, 200 via any one or more smart order router(s) 150, which can include an order or transaction routers configured for desired type(s) of synchronized or otherwise controlled order routing, including for example, serial, sweep, and/or latency-normalized routing.

Embodiments described herein may configure various electronic order or trading books to facilitate trades received from market participant system 300 via order router 150. Market participants may be used herein to refer to traders, dealers, investors, advisors, buyers, sellers, vendors, issuers, and other participants directly or indirectly related to trading of financial interests. Networked venues 110 may include electronic order books (e.g. marketplace order book), and example types of order or trading books include dark books 112, hybrid books 114, lit books 116, and/or crossing books 118. An order book may be an electronic listing of proposed order requests. A trading book may be portfolio or listing of financial interests associated with market participants (e.g. dealer, investor, brokerage, or financial institution). A trading book may be a listing of trading interests by market participants, such as indicating an interest to buy or sell a financial interest. Financial interests identified in a trading book may be transferred, traded, purchased or sold by market participants (e.g. dealers) to facilitate trading for other market participants (e.g. investors, customers of dealers), to profit from changes in market price or trading spreads between the bid and ask prices, to hedge against various types of risk, and so on. Order books may record a list of proposed orders for different financial interests.

An electronic networked venue 110 (e.g. trading venue, order book, trading book) may be implemented using a general-purpose computing device, including a processing unit and a system bus that couples various system components including the system memory such as ROM and RAM to the processor. The networked venue 110 can include a cache of high speed memory connected directly with, in close proximity to, or integrated as part of the processor. The processor can configure various modules of the networked venue 110 to perform various actions. Other system memory may be available for use as well. The memory can include different types of memory with different performance characteristics. The networked venue 110 may operate on a computing device with more than one processor or on a group or cluster of computing devices networked together to provide greater processing capability. The processor can include any general purpose processor and a hardware module or software module configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

The system bus may be any of several types of bus structures including a memory bus or memory controller, a peripheral bus, and a local bus using any of a variety of bus architectures. A basic input/output (BIOS) stored in ROM or the like, may provide the basic routine that helps to transfer information between elements within the electronic networked venue 110. The electronic networked venue 110 further includes storage devices such as a hard disk drive, a magnetic disk drive, an optical disk drive, a solid state drive, a tape drive or the like. The storage device can include hardware or software modules for controlling the processor. The storage device is connected to the system bus by a drive interface. The drives and the associated computer readable storage media provide non-volatile storage of computer readable instructions, data structures, program modules and other data for the networked venue 110. A hardware module that performs a particular function includes the software component stored in a non-transitory computer-readable medium in connection with the necessary hardware components, such as the processor, bus, display, and so forth, to carry out the desired trading function.

Different types of computer readable media which can store data that may be accessible by the networked venue 110, such as magnetic cassettes, flash memory cards, digital versatile disks, cartridges, RAMs, ROMs, a cable or wireless signal containing a bit stream and the like, may also be used in the exemplary operating environment. Non-transitory computer-readable storage media may exclude media such as energy, carrier signals, electromagnetic waves, and signals per se.

To enable interaction with the electronic networked venue 110, market participant system 300 may include an input device implementing any number of input mechanisms, such as a microphone for speech, a touch-sensitive screen for gesture or graphical input, keyboard, mouse, motion input, speech and so forth. An output device can also be one or more of a number of output mechanisms. In some instances, multimodal systems enable a user to provide multiple types of input to communicate with the electronic networked venue 110 via market participant system 300. The communications interface generally governs and manages the user input and system output.

An electronic networked venue 110 may include individual functional blocks. The functions these blocks represent may be provided through the use of either shared or dedicated hardware, including, but not limited to, hardware capable of executing software and hardware, such as a processor, that is purpose-built to operate as an equivalent to software executing on a general purpose processor. A processor may be provided by a single shared processor or multiple processors, a microprocessor and/or digital signal processor (DSP) hardware, ROM for storing software performing the operations discussed below, and RAM for storing results. Very large scale integration (VLSI) hardware embodiments, as well as custom VLSI circuitry in combination with a general purpose DSP circuit, may also be provided.

The logical operations of the various embodiments are implemented as: a sequence of control logic or computer implemented steps, operations, or procedures running on a programmable circuit within a general use computer, a sequence of control logic or computer implemented steps, operations, or procedures running on a specific-use programmable circuit; and/or interconnected machine modules or program engines within the programmable circuits.

Transaction data processing system 100 may practice all or part of the recited methods, can be a part of the recited systems, and/or can operate according to instructions in the recited non-transitory computer-readable storage media. Such logical operations can be implemented as modules configured to control a processor to perform particular functions according to the programming of the module. The drawings illustrate various features and advantages provided by various types and/or embodiments of networked venues 110.

Smart order router 150 is configured to provide various services to market participant systems 300, networked venues 110, and other networked venues 200. For example, SOR 150 may provide order protection across all lit books 116, route marketable orders based on instruction from market participant system 300, route resting orders based on instruction from market participant system 300, manage routing of orders for the purposes of participating in opening and closing auction events for specific listed financial interests. As further examples, SOR 150 may provide latency normalization across all venues considered, make dark derived orders available, pre-trade risk management, and so on. A market data disseminator may make order details available to marketplace SORs 150 for routing decisions of orders. As an additional example, SOR 150 may route to dark books 112 for the purpose of trading with price improvements.

Characteristics of dark book(s) 112, hybrid book(s) 114, lit book(s) 116, and crossing book(s) 118 may vary. These are examples of electronic networked venues 110.

Dark Books

For example, FIG. 2 provides a schematic of an electronic dark book implemented in accordance with embodiments described herein. A dark book 112 is an electronic order or trading book, market or exchange (referred to herein as a networked venue) comprising a data set (stored on a persistent store) representing a book or other listing of executable proposed transactions in financial and other interests, in which, unlike visible trading venues, orders may be placed without their being made visible or otherwise available or distributed to other marketplace participants.

For example, a dealer wishing to sell a block of stock may use a suitably-configured order processor to generate a data set requesting a proposal for the purchase of a block of stock(s), and transmit the generated transaction data set to the transaction order processor 100, which can hold the data set in a data store representing a pool or listing of executable proposed trades, without making the data visible to other market participant systems 300 through, for example, a graphical user interface representing an order or trading book.

Among other features, in the embodiment of dark book 112 shown in FIG. 2 the following services and features may be provided:

Authorization to place orders, or any one or more type(s) of orders, may be restricted to one or more classes of market participants (e.g. retail, institutional, long term), types of order flow, types of customers, and so on. For example, as shown, liquidity takers may be limited to customers of dealers who are retail, institutional, or long term investors, while any or all types of entities may be authorized to provide liquidity. For example, only traditional (e.g. non-SME, retail, institutional, long term buy side) order flow may take liquidity, liquidity providers may be unrestricted, and liquidity providers and liquidity takers may not define counter electives. This may be an example of segmentation as described herein.

Authorization to designate eligible counterparties, and/or classes of counterparties, may be restricted to one or more classes of market participants. For example, as shown, those authorized to make such designations may be limited to those who sell or otherwise provide liquidity.

Auctions may be conducted according to any of a wide variety of formats, and using any of a wide variety of criteria. For example: multiple and frequent auctions at mid-point and size-up at mid-point; size-up auction may be performed at previous auction mid-point auction price or current mid-point auction price, and may include volume available in dark book; liquidity providers may indicate which auction they want to participate in and if they are interested in size-up auction; to participate in size-up auction liquidity provider orders may be subject to eligibility criteria; and so on.

Buy/sell matchings may be made in accordance with any desired priority(ies), including preferences for price, brokers, market makers, long term investors, and/or other participants, and/or according to order size(s), times, etc. Matching priorities may be the same as, or different than, those provided in any or all of dark book(s) 112, hybrid book(s) 114, lit book(s) 116, and/or crossing book(s) 118. Various matching techniques will be described herein.

All trading may take place within or at the NBBO (e.g. national best bid or offer) or other best bid or offer.

There may be no maker/taker fee model or zero fee for retail liquidity takers.

Information pertaining to executed trades may be disseminated without restrictions, including as described elsewhere herein.

Authorized dark liquidity at and within NBBO, by order, disseminated to SOR 150 and other eligible SORs.

Trading and related data may be published in real time.

Hybrid Books

Figure 3:
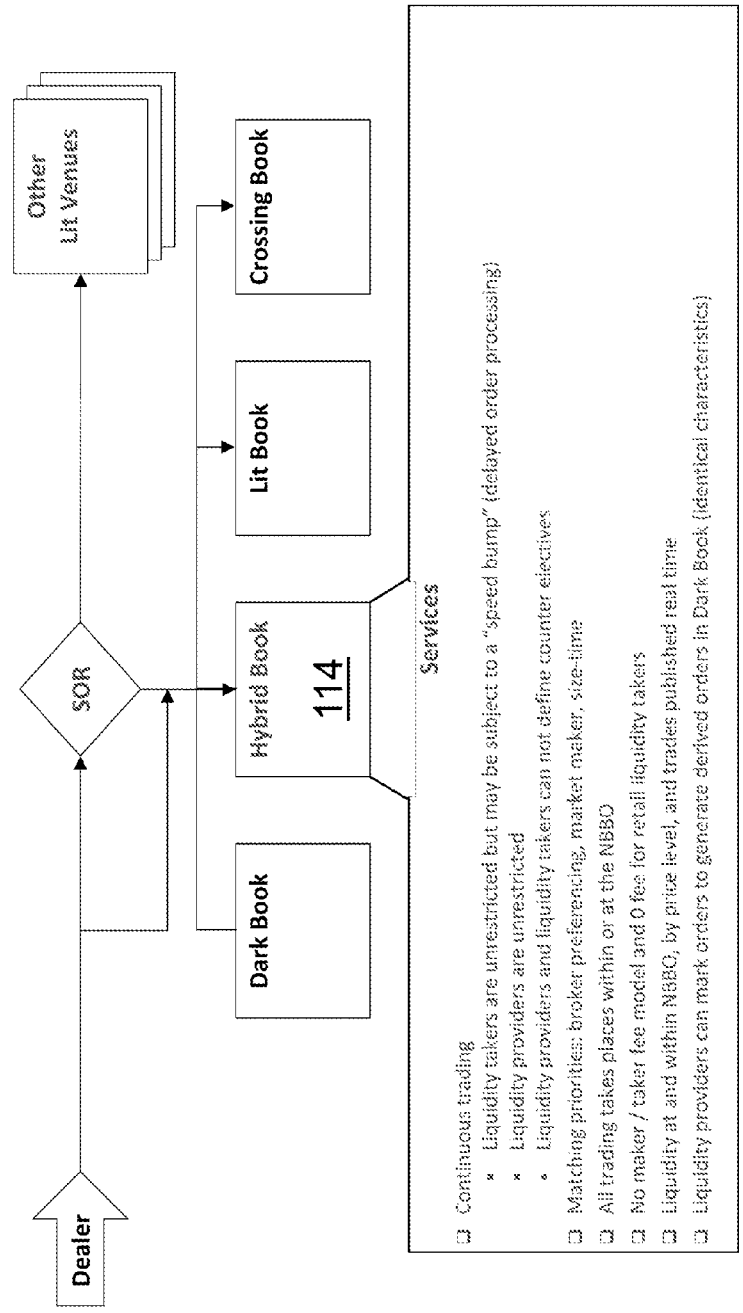

FIG. 3 describes features and advantages enabled by hybrid books 114 implemented in accordance with embodiments described herein. Hybrid book(s) in accordance with embodiments described herein include books which share properties of both dark book(s) 112 and lit book(s) 116. That is, hybrid books 114 are electronic order books, trading books, markets or exchanges (referred to herein as a networked venue) that encompass elements of both lit book 116 and dark book 112 operating principals into a single order book.

A hybrid order book 114 may be an electronic facility designed to foster enhanced price discovery through the anonymous dissemination of all quotes aggregated by specified or identified price level, for example, at prices that are best bid or offer (BBO) or within BBO. The hybrid book 114 facility may also provide an electronic environment where resting orders may trade without being exposed to predatory taker strategies by restricting active order submission to specified (e.g. long term, non-SME, non-HFT or high frequency trading) market participants. Active trading may be limited to specified investors (e.g. traditional, retail, institutional investors)

For example, such a hybrid book 114 may display liquidity and permit trading to occur only at or within prices referenced to a national best bid/offer (NBBO), such as for example at a midpoint thereof, or within a predetermined offset set at pricing increments customarily used or otherwise defined by or for the relevant market or exchange. Such hybrid book(s) 114 may also display liquidity available (in terms, for example, of numbers of shares) at each specified price level, without disclosing information pertaining to specific resting, or posted, orders that are not at specified price level.

Known approaches to order books may create issues and challenges. For example, there may be limited protection from predatory strategies available within lit order books 116. Cost of trading may be significantly higher in lit order books 116. Pre-trade transparency and price discovery may not be provided in dark order books 112. Individual order size detection capabilities may be available in lit order books 116, and order aggregation may be available as a data product, however it may reduce available information that is used by other participants.

There may be unknown order availability in dark order books 112. This may create missed trading opportunity potential, where participating organizations must "test" a dark book 112 to determine if any contra side volume exists. There may be a risk of missing a trading opportunity in a transparent book while the "test" is conducted. There may be a time penalty associated with dark order books 116. Additional time may be required to submit an order to a dark order book, 112 if no contra side volume is available the participating organization has incurred the time penalty associated with sending the original order to a dark order book 112 before proceeding to another venue (dark, or lit). There may be limited choice and general lack of innovation in lit order books 112. There may be little need for innovation and differentiation as the user community may be captive to all protected marketplaces.

A Hybrid order book 114 may have limited order transparency based on a reference price (e.g. NBBO, BBO). A Hybrid order book 114 may establish trade price based on a price set outside of the system. This may be a characteristic of a dark order book 112 in that some orders may not be transparent or visible. However, a Hybrid order book 114 may also make some orders visible or transparent based on the reference price (e.g. NBBO, BBO), where details of such orders are visible, transparent, or otherwise displayed to market participant systems 300 (e.g. volumes/price available). This may be a characteristic of a lit order book 116 in that some orders may be transparent or visible. The visibility of the Hybrid order book 114 may be dynamic and updated regularly. As the outside reference price changes then the display window of the Hybrid order book 114 may in turn update based on the updated reference price.

The Hybrid order book 114 combines key operating elements of traditional lit and dark order books 112, 116. Resulting from the combination of these two books, in addition to active order segmentation, the Hybrid order book 114 is able to provide collective benefits which are presently only available in the lit or the dark order book 116, 112, not both. For example, a hybrid book 114 may implement the following elements (from e.g. dark books 112 and lit books 116):

Lit Book:
order transparency for a set of price levels (e.g. BBO); and
enhanced price discovery
priority/preferencing.
Dark Book:
priority/preferencing;
some orders may not visible (e.g. referenced price strategy, price from outside NBBO or BBO); and
segmentation.

These are examples only and other elements may be implemented by Hybrid Order Books 114. For example, among other features, in the embodiment of Hybrid Order Book 114 shown in FIG. 3 the following services and features may be implemented:

Authorization to place orders, or any one or more type(s) of orders, may be restricted to one or more classes of market participants. For example, as shown, liquidity takers may be limited to dealers who are not exempt from marking short orders, while any or all types of entities may be authorized to provide liquidity. For example, only traditional order flow (e.g. non-SME, retail, institutional, long term) may take liquidity, liquidity providers may be unrestricted, liquidity providers and liquidity takers may not define counter electives, and so on.

Matching priorities may be the same as, or different than, those provided in any or all of dark book(s) 112, lit book(s) 116, and/or crossing book(s) 118. In the embodiment shown, matching priorities may be, in order, price, broker preferencing, market maker, and size-time. Various matching techniques will be described herein.

Displayed liquidity can be limited to proposed transactions associated with price term(s) at or within the NBBO (or BBO), or within predefined or preferred variations thereof, so that orders associated with prices within a predefined threshold window of NBBO may be shown. That is, all trading may take place within or at the NBBO (or BBO), or within a set amount of NBBO (or BBO).

There may be liquidity at and within the NBBO, by price level, and trades may be published in real-time.

In additional to anonymous dissemination of orders, hybrid book(s) 114 can allow for automatic execution of aggregated volumes offered by different liquidity makers at various price levels, so as to allow combined trading of interests offered at common price(s).

Dissemination of information pertaining to executed trades or other traders may be restricted in accordance with rules or regulations of corresponding markets or networked trading venues.

Derived orders to be posted in dark book(s) 112 may be generated automatically by marking of specific orders by the posting market participant systems 300.

There may be no maker/taker model and zero fee for retail liquidity takers.

A derived order may be an order that is placed and anchored in one networked trading venue and coexists, or is also placed, in one or more other networked trading venues. A derived order may be available for all available financial interests or a segment of financial interests being traded on the networked trading venue.

A derived order may be posted in such a way that it may trade with order flow sent to each of the trading venues in which the derived orders are placed without causing an overfill of the original order. Any changes (e.g. modifications, amendments, cancellations) to either of the coexisting orders may be applied at the same time to the orders coexisting in both trading venues. That is, a derived order may be duplicated onto multiple trading venues, where changes to any of the duplicated orders are propagated to the other trading venues.

For example, a derived order may be anchored in a Lit trading book 116 and derived into a Dark trading book 112. The derived order may essentially co-exist in both the Lit trading book 116 and the Dark trading book 112 and could trade with other contra-orders sent to either of these trading books. This is an example and derived order may co-exist on a lit trading book 116 and a hybrid trading book 114, a dark trading book 112 and a hybrid trading book 114, and so on.

Rather than a market participant splitting trading interest across two separate orders sent to the Lit trading book 116 and the Dark trading book 112 independently, the market participant can use the derived order to send the full trading interest to both trading books 116, 112 simultaneously, increasing trading opportunities without creating risks of an overfill. If one trading venue has more trading activity than the other trading venue, the derived order may allow the market participant to take advantage of this opportunity. The objective is to maximize the amount of the fill in the shortest period of time by taking advantage of liquidity in different trading books or trading venues.

Derived orders are managed so that the order may not over-fill. When a trade occurs in one trading venue or book the quantity in the other trading venue or book is reduced by the amount of the trade. Any other changes to either order will be applied to each of the co-existing orders at the same time.

Hybrid trading books 114 may provide various benefits. For example, there may be reduced administrative fees or costs. Order book utilization may be optional for participating organizations, and associated costs are therefore optional. There may be creation of price discovery through the dissemination of a market by price feed. There may be reduced single order size detection through the aggregation of all quotes by price level. There may be elimination of predatory taker strategy interaction for resting orders creating a safe environment in which passive liquidity providers can quote with size. Active order submission may be restricted to specified participants exclusively. Enhanced order management capabilities may be obtained by leveraging available order types which facilitate the posting of an order in both the Hybrid and Dark trading or order books 114, 112 simultaneously. There may be the capability to provide enhanced access to liquidity through the elimination of quote fading (e.g. the posting of an order followed by the immediate removal and replacement of the order at an inferior price). An order may first be submitted to the book in attempt to draw contra side orders attempting to match at the originally posted price. There may be an implementation of a minimum order life restriction that systematically disallows the cancellation of an order for a defined period of time after order entry or modification.

The following provides an illustrative example of a hybrid trading or order book 114 market data. A financial interest represented by symbol XYZ is bid at 10.00 and offered at 10.03 across all Canadian lit book markets 116. A hybrid bid may include $10.01 at 1000 shares, $10.00 at 1000 shares, and $9.99 at 1500 shares. The first two bids of $10.01 at 1000 shares, $10.00 at 1000 shares may be displayed and tradable but only accessible to specified market participants. The last bid of $9.99 at 1500 shares may be hidden from market participant processor 300 and not tradable due to NBBO.

The following provides another illustrative example of a hybrid trading or order book 114 market data. A financial interest represented by symbol XYZ is bid at 9.99 and offered at 10.03 across all Canadian lit book markets 116. A hybrid bid may include $10.01 at 1000 shares, $10.00 at 1000 shares, and $9.99 at 1500 shares. Now all bids may be displayed and tradable due to NBBO change (as compared to first example). Again, the bids may be only accessible to specified market participants.

FIG. 4A illustrates a flow chart diagram of a method 70 for hybrid order execution. The method may involve providing an electronic hybrid order book 114 via a processor and a persistent data store. At 72, transaction order processor 100 may receive, from a dealer processors 300, signals defining data sets representing proposed order requests to execute transactions in financial interests for submission to the electronic hybrid order book. 114. At 74, a persistent data store may store the proposed order requests and order conditions for the electronic hybrid order book. Example order conditions are provided herein. The order conditions may define when proposed order requests are displayable and tradable. For example, an order condition may compare the price of the order to the NBBO level. If the order is outside the NBBO then the order may not be displayable and tradable. If the order is within the NBBO then the order may be displayable and tradable. An order condition may be based on the market participant the order was received from. For example, an order submitted by a type of market participant may be displayable and tradable, whereas an order submitted by another type of market participant may not be displayable and tradable. An order condition may also be based on the type of order, e.g. active or passive orders. The order conditions may be a combination of elements from lit books 116 and dark books 112.

At 76, for each proposed order request, transaction order processor 100 applies the order conditions for the electronic hybrid order book 114 to the proposed order request to determine whether the proposed order request is displayable and tradable.

At 78, if the proposed order request is not displayable then it is hidden from view. If the proposed order request is not tradable, then a rejection notification may be transmitted to the corresponding market participant system 300 the order request was received from.

Upon determining that the proposed order request is displayable and tradable, at 80, the order is displayed as part of the hybrid book 114. At 82, the transaction order processor 100 executes one or more transactions based on the proposed order request.

Figure 4B:
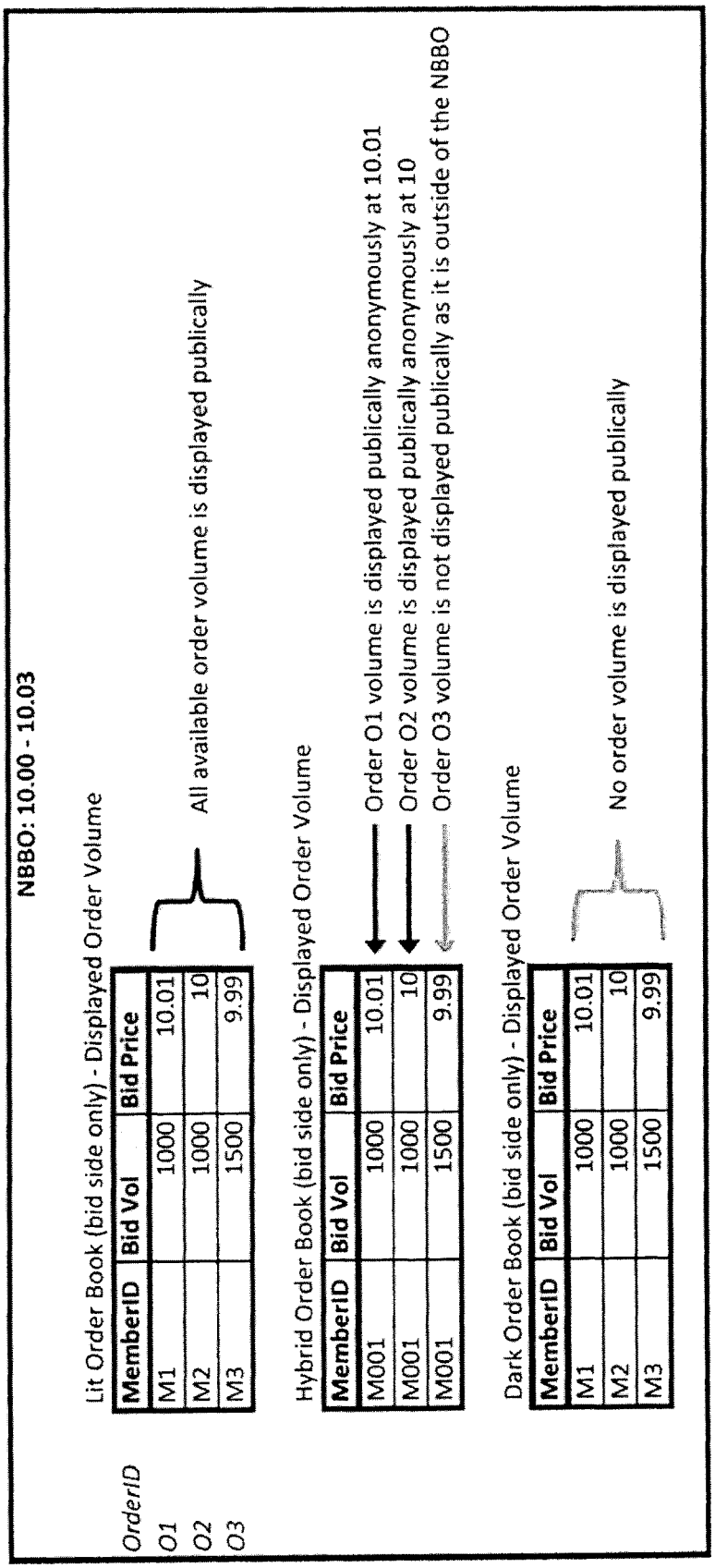

FIG. 4B illustrates an examples of a lit book 116 order, a hybrid book order 114, and a dark book order 112.

For the example shown in FIG. 4B a financial interest may be bid at 10.00 and offered at 10.03 across all Canadian lit book markets 116 (as an example NBBO). Example different order books are shown for the bid side only, as an illustrative example. Orders may also be of different types, such as offer side, for example. An electronic order record or listing may include various attributes including order identifier, market participant identifier (e.g. dealer identifier, investor identifier), bid volume, bid price.

Illustrative example (bid side) orders for a lit order book 116 may be an order O1 received from market participant M1 may be for 1000 shares of a specific financial interest at 10.01, an order O2 received from market participant M2 may be for 1000 shares of the specific financial interest at 10, and an order O3 received from market participant M3 may be for 1500 shares of a specific financial interest at 9.99. For these example orders for a lit order book 116, all available order volume may be visible, such as via a user interface display.

Illustrative example (bid side) orders for a hybrid order book 114 may be an order O1 received from market participant M001 may be for 1000 shares of a specific financial interests at 10.01, an order O2 received from market participant M002 may be for 1000 shares of a specific financial interest at 10, and an order O3 received from market participant M003 may be for 1500 shares of a specific financial interest at 9.99. For these example orders for a hybrid order book 114, order O1 volume may be publically accessible anonymously at 10.01, and order O2 volume may be publically accessible anonymously at 10, such as via a user interface display. Order O3 may not be visible as it is outside of the NBBO.

Illustrative example (bid side) orders for a dark order book 112 may be an order O1 received from market participant M1 may be for 1000 shares of a specific financial interest at 10.01, an order O2 received from market participant M2 may be for 1000 shares of a specific financial interest at 10, and an order O3 received from market participant M3 may be for 1500 shares of a specific financial interest at 9.99. For these example orders for a dark order book 112, no order volume may be visible.

Accordingly, for this illustrative example, order volume submitted to lit order books 116 may be visible, order volume submitted to hybrid order books 114 may be or may not be visible depending on the bid price relative to the NBBO, and order volume submitted to dark order books 112 may not be visible.

Figure 4C:
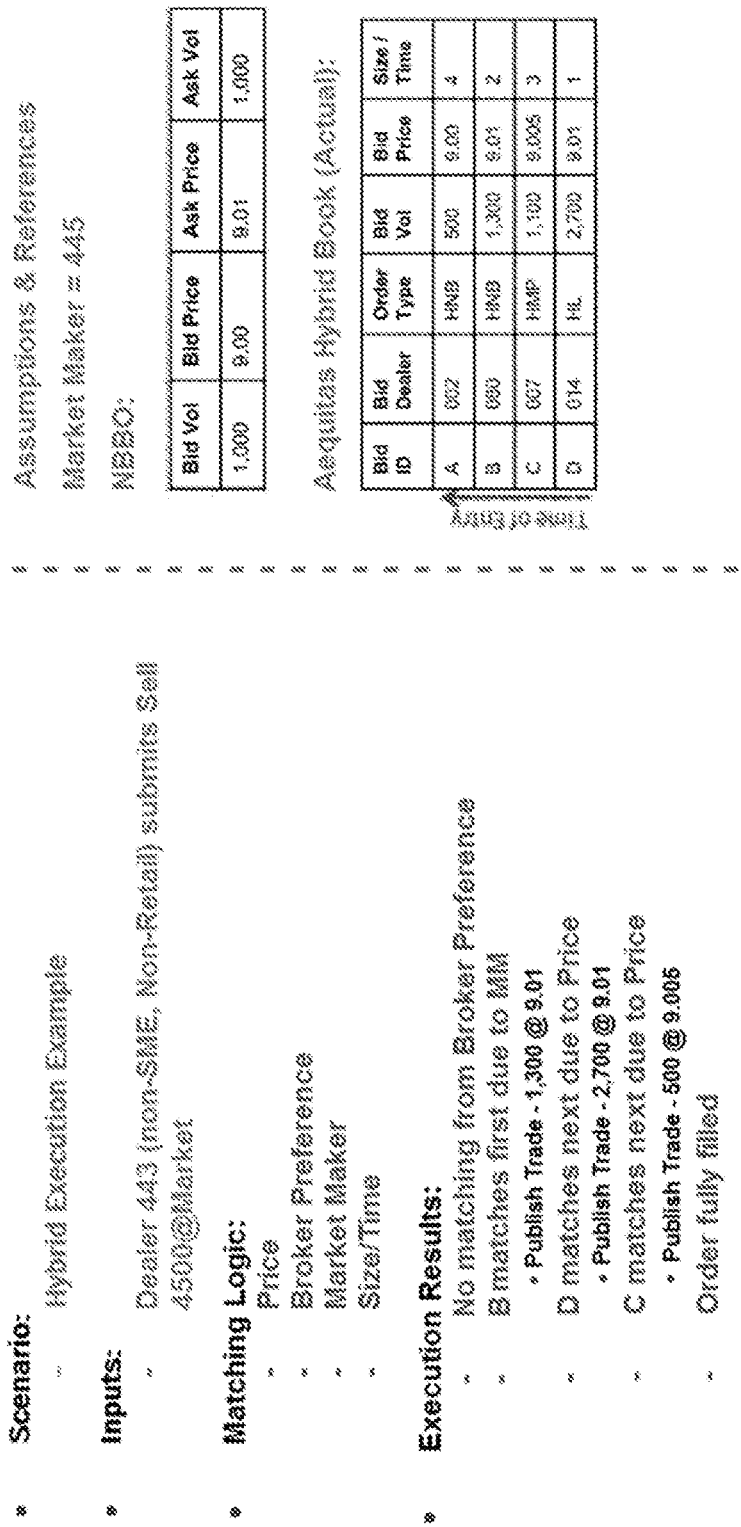

FIG. 4C illustrates an example hybrid order execution. A market participant 300 referenced by number 443 may be a specified market participant (e.g. non-SME and retail), and submits a sell order of 4,500 shares at market. Assumption and references for this example are market maker market participant processor 300 referenced by number 445. The NBBO may be a bid volume of 1,000 shares, a bid price of 9.00, an ask price of 9.01, and an ask volume of 1,000 shares. A matching priority may process orders to match sell orders and buy orders. For example, the matching priority may be implemented as programming logic to configure a processor to match orders based on price, broker preference, market maker, and size/time. Other matching priorities may be used. An example hybrid trading or order book is shown in FIG. 4C with order identifier A, order identifier B, order identifier C, and order identifier D, along with corresponding bid dealer references, order types, bid volumes, bid price, and size/time ranking. These are example order attributes and others may be provided and considered for order processing. The execution results maybe no matching based on broker preference. Order identifier B may match first due to market maker which may trigger a publish trade 1,300 at $9.01. Order identifier D may match next due to price which may trigger a publish trade 2,700 at $9.01. Order identifier C may match next due to price which may trigger a publish trade 5.00 at $9.01. The order may be fully filled and order identifier C may have 600 shares remaining in the book. Order identifier A may have the full remaining volume in the book.

Lit Books

Figure 5:
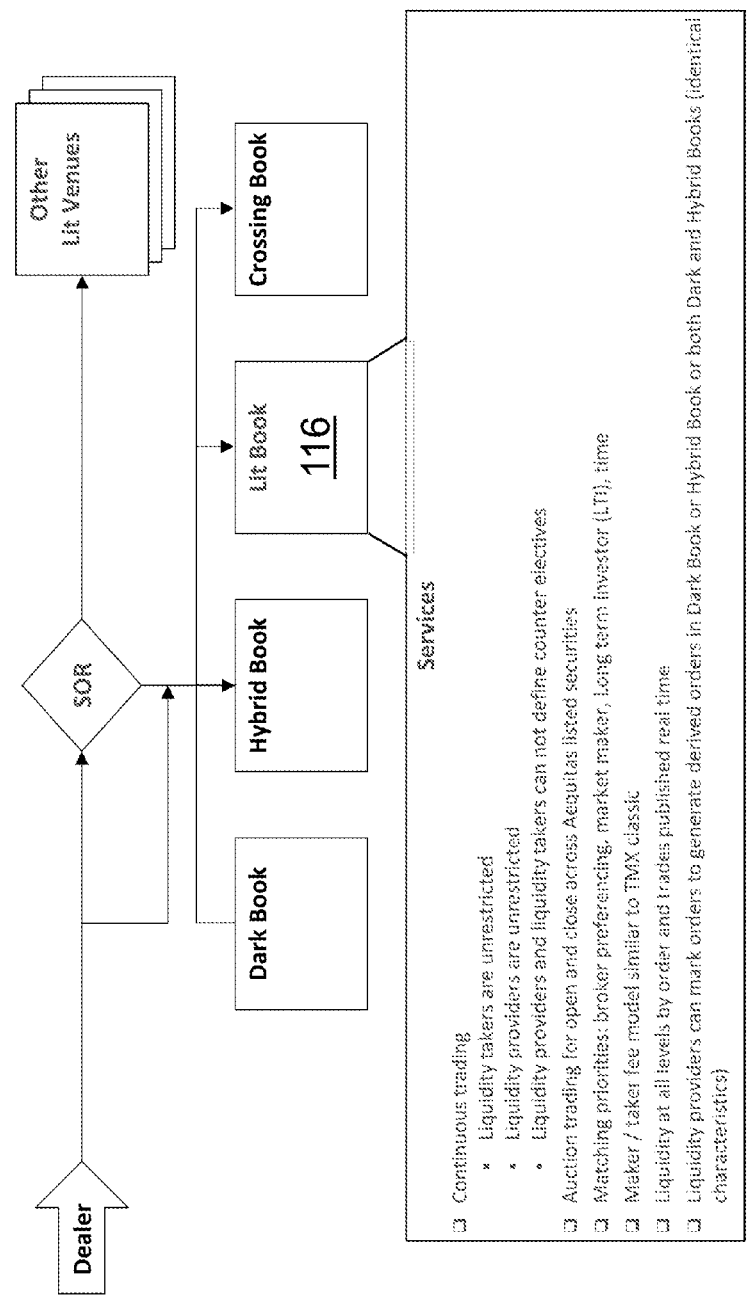

FIG. 5 describes features and advantages enabled by lit books 116 implemented in accordance with embodiments described herein. A lit book 116 is an electronic trading or order book, market or exchange (referred to herein as a networked venue) in which at least price and initial quantity terms of proposed transactions in specified interests are visible and available to all authorized market participants 300.

Among other features, in the embodiment of lit book 116 shown in FIG. 5:
  Unlike as in dark book(s) 112 and hybrid book(s) 114, in lit book(s) 116 authorization to both buy and sell is not limited to any type(s) or class(es) of market participants, other than to those who are qualified members of the venue 110, 200. That is, liquidity takers may be unrestricted, liquidity providers may be unrestricted, liquidity providers and liquidity takers may not choose counterparties (e.g. based on characteristics of counterparties).

Matching priorities may be the same as, or different than, those provided in any or all of dark book(s) 112, hybrid book(s) 114, and/or crossing book(s) 118. In the embodiment shown, matching priorities are, in order, price, broker preferencing, market maker, traditional investors (e.g. specified market participant, not exempt from requirements to mark short orders, non-SME, non-HFT), then the time at which a proposed transaction was posted. Various matching techniques will be described herein Auction trading may be open and closed across specific financial interests.

Maker taker fee model may be similar to other venues (e.g. active pays fees, passive gets rebates).

Liquidity at all levels by order and trades published in real time. That is, information pertaining to orders and executed trades may be disseminated without restrictions, including as described elsewhere herein.

Liquidity providers can mark orders to generate derived orders in dark books 112 (identical characteristic) or other books. That is, derived orders to be posted in dark book(s) 112 may be generated automatically by marking of specific orders by the posting market participants 300.

Crossing Books

Figure 6:
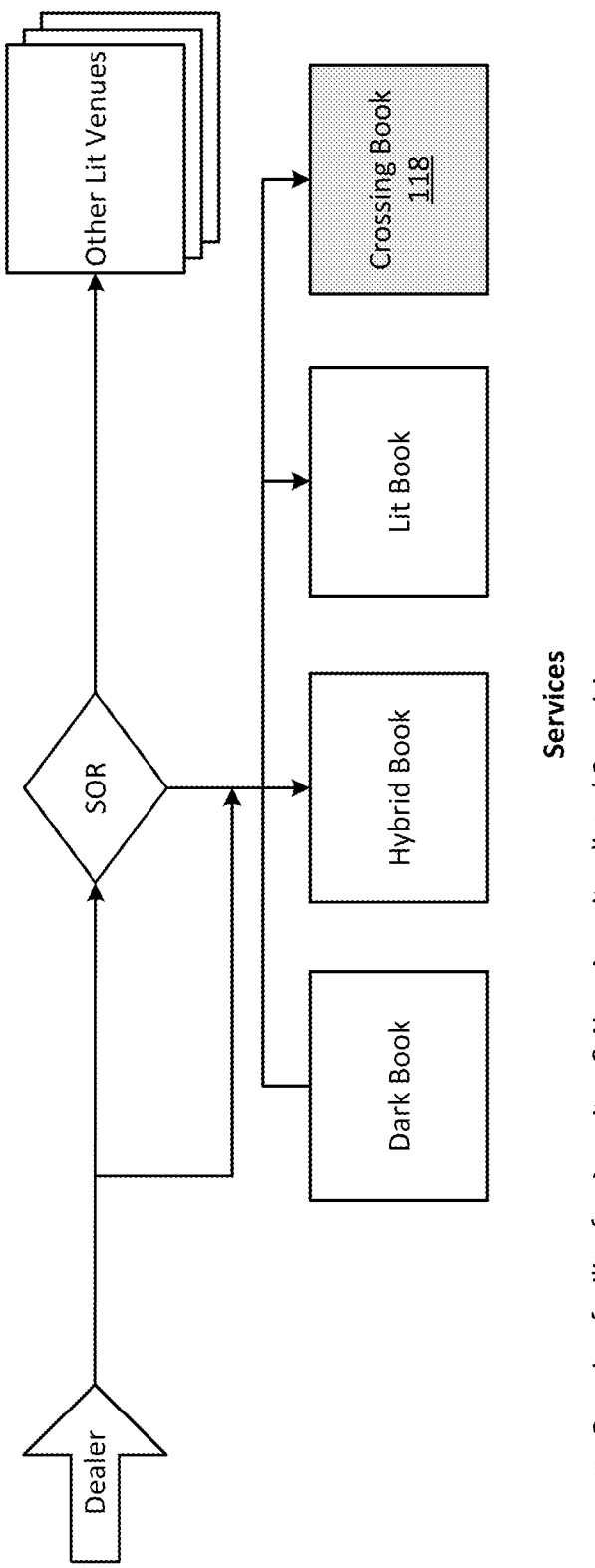

FIG. 6 describes features and advantages enabled by crossing books 118 implemented in accordance with embodiments described herein. A crossing book 118 is an electronic trading or order book, market or exchange (referred to herein as networked venue) in which both sides of a trade are provided simultaneously; thereby eliminating the need for individual orders to be placed by participants for a "match" to occur. Thus, for example, instead of requiring a party to hit or lift a bid or offer, a single transaction will be posted by a participant with bid and offer side details provided.

Among other features, in the embodiment of crossing book 118 shown in FIG. 6:

Information pertaining to executed trades may be disseminated in accordance with any desired instructions, and/or any applicable exchange rules, regulations, or laws.

Crossing facility may be provided for all financial interests available for trading by the venue.

Trade print (i.e. cross) or trade execution posting may be restricted based on a set of defined parameters which may include, all or a sub-set of the following Listing venue
Cross (trade) price
Time of cross submission
Prices on other trading venues For crossing books 118, there may be no orders submitted for matching. Instead, there may be posting of a trade (e.g. with both the bid and ask side of the trade submitted at the time of entry).

Consolidated Market Data View

Also among the many advantages offered by transaction data processing system(s) 100 in accordance with the embodiments described herein is the ability to provide consolidated market views or reports based on trading and market data, including new combinations of information specific to users or groups of users. Reports may refer to interface market views, display views, information work, presentations of data, and so on. For example, a consolidated report or market view may provide a market participant with a full view of its own electronic book and other visible market or trading data. There may also be agreements between various market participants to permit and facilitate sharing of data. As another example, a consolidated report or market view may provide a market participant with a full view of its own electronic book, other visible data (e.g. public market data), and other private data where visibility is permitted for the market participant based on agreements.

A generic view (i.e. non-user specific) of visible market data specific to the marketplace that is producing/providing the corresponding data product may not give a complete view of all market data relevant to a user.

There may currently be a lack of user specific data products, and a "one size fits all" model may not be tailored to specific users. This may increase user costs which may be significant as a market data feed must be sourced from each individual marketplace the user is interested in. For example, users may be subject to the following costs: marketplace data fees, technical infrastructure costs supporting delivery of the feed from its source, network infrastructure costs, data centre and physical hardware costs, feed management and support (feed change implementation/issue resolution) costs.

The Consolidated Market View (CMV) platform may provide a market data product that combines visible marketplace data feeds from one, all, or a subset of available marketplace data feeds (e.g. Lit and Hybrid books 116, 114, trading venues and so on) with one, all, or a subset of all available market participant processor 300 (i.e. participating organization) private drop copy or other sources which have been normalized into a common format for dealer consumption. The CMV platform may provide its users with a complete view of all markets from which market data has been sourced and, on which marketplace each of the participating organization(s) orders reside with respect to a full marketplace view.

A service, platform, facility, or product, for example, may be provided by deploying the CMV processing engine at the site of the transaction data processing system 100 or remote at a client site (e.g. at site of market participant system 300). The operational management of the CMV may be conducted by administrative personnel. Marketplace data feed sourcing may be the responsibility of the deployment site host or by the administrative site, for example.

The CMV platform may include an information processor to collect, process and aggregate visible order and trade information from all or a subset of marketplaces. The CMV platform may aggregate market participant processor 300 specific market data including visible order and trade information from all or a subset of marketplaces with aggregated and normalized private order and trade information from one, all or a subset of participating organizations (e.g. multiple dealers 300). The CMV platform may collect and process visible order and trade information from all or a subset of marketplaces with dealer attributed private order (e.g. an individual market participant processor 300) and trade information (both visible publicly and not visible publicly) from one, all or a subset of participating organizations.

The CMV platform may provide a variety of services. For example, the CMV platform may provide user customized view of market data unique to each user or market participant processor 300 (enrichment elements can be user specific). The CMV platform may provide a (user specific) complete market view. The CMV platform may provide a single source of all visible (venue agnostic) market data complemented with specific user private market data (i.e. user has ability to track/trace all of their order and trade activity within a single market data source). The CMV platform may provide a relational view of client orders against the market (all or a subset of marketplaces). The CMV platform may allow for a user to easily and clearly identify where their orders (both visible publicly and not visible publicly) reside at an given time relative to all other orders in the trading networked venue. The CMV platform may provide a cost reduction mechanism, such that the CMV platform may be utilized as a single source feed for all market data which may reduce costs. The CMV platform may provide reduced feed costs. The CMV platform may reduce administrative burden and associated costs. The CMV platform may reduce technology overhead requirements (and costs). The CMV platform may be easily leveraged to create a competitive consolidated data source.

Figure 7A:
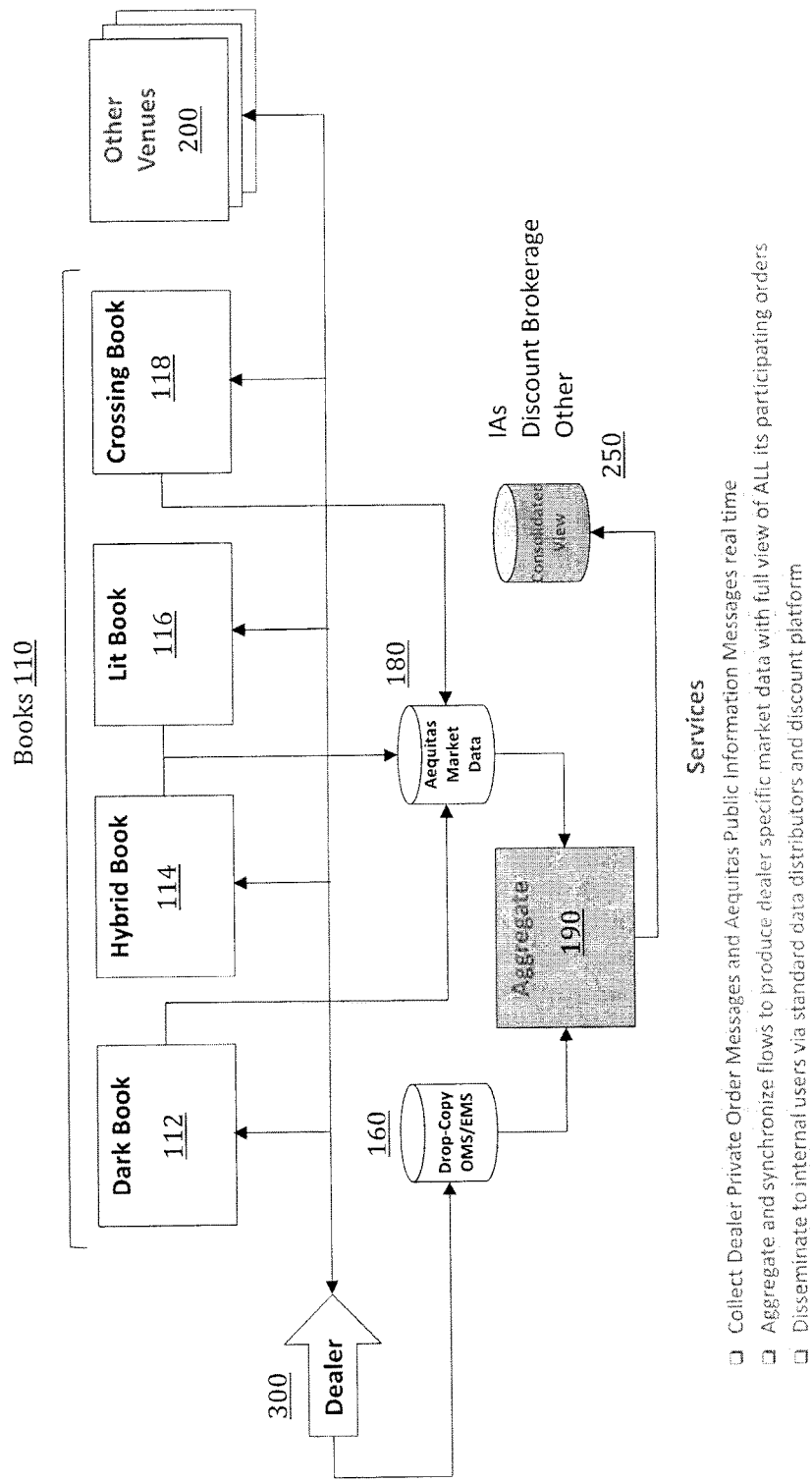

FIG. 7A provides a high level overview of the CMV platform. Data representing orders and other transaction-related information generated by dealer(s) and other trader(s) or entity(ies) 300 can be routed to both networked venues 110, 200, for execution and other purposes, and to drop-copy order/execution management (OMS/EMS) database(s) 160. In addition, data related to trades executed by any or all of networked venues 110, 200 can be routed to a market data base 180.

The CMV platform may include an aggregation engine 190 configured with control logic to receive, by pull, push and/or other desired techniques, data from data storage devices 160, 180, apply any desired reformatting to conform to any desired protocol(s), e.g., FIX, and consolidated (or aggregated); and any desired (sub)set(s) of data may be used to provide desired reports and/or feeds to regulators, news providers, and/or other internal and/or external recipient(s) 250, in any desired format(s).

The CMV platform may use aggregation engines 190 to collect market participant 300 private order messages and exchange visible information messages in real time. The CMV platform may use aggregation engines 190 to aggregate and synchronize flows to produce dealer specific market data with full view of all the market participant's (e.g. dealer in this illustrative example) 300 orders (both visible publicly and not visible publicly) in some or all of the different trading venues. The CMV platform may use aggregation engines 190 to disseminate data to market participants via standard data distributors and discount platforms.

The CMV platform and components thereof (e.g. an aggregation engine 190) may include one or more computing devices operable by users to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network (which may be referred to as "cloud computing").

The CMV platform and components thereof (e.g. an aggregation engine 190) may reside on one or more networked computing devices, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

The CMV platform and components thereof (e.g. an aggregation engine 190) may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. CMV platform may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The CMV platform and components thereof (e.g. an aggregation engine 190) may include one or more input devices, such as a keyboard, mouse, camera, touch screen and a microphone, and may also include one or more output devices such as a display screen and a speaker. The CMV platform and components thereof (e.g. an aggregation engine 190) may have network interfaces in order to enable communication between system components, to access and connect to network resources, to serve an application and other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more CMV platforms distributed over a geographic area and connected via a network. The CMV platform is operable to register and authenticate users (using a login, unique identifier, and password for example) prior to providing access to applications, a local network, network resources, other networks and network security devices. The CMV platform may use different types of devices and may serve one user or multiple users.

Figure 7B:
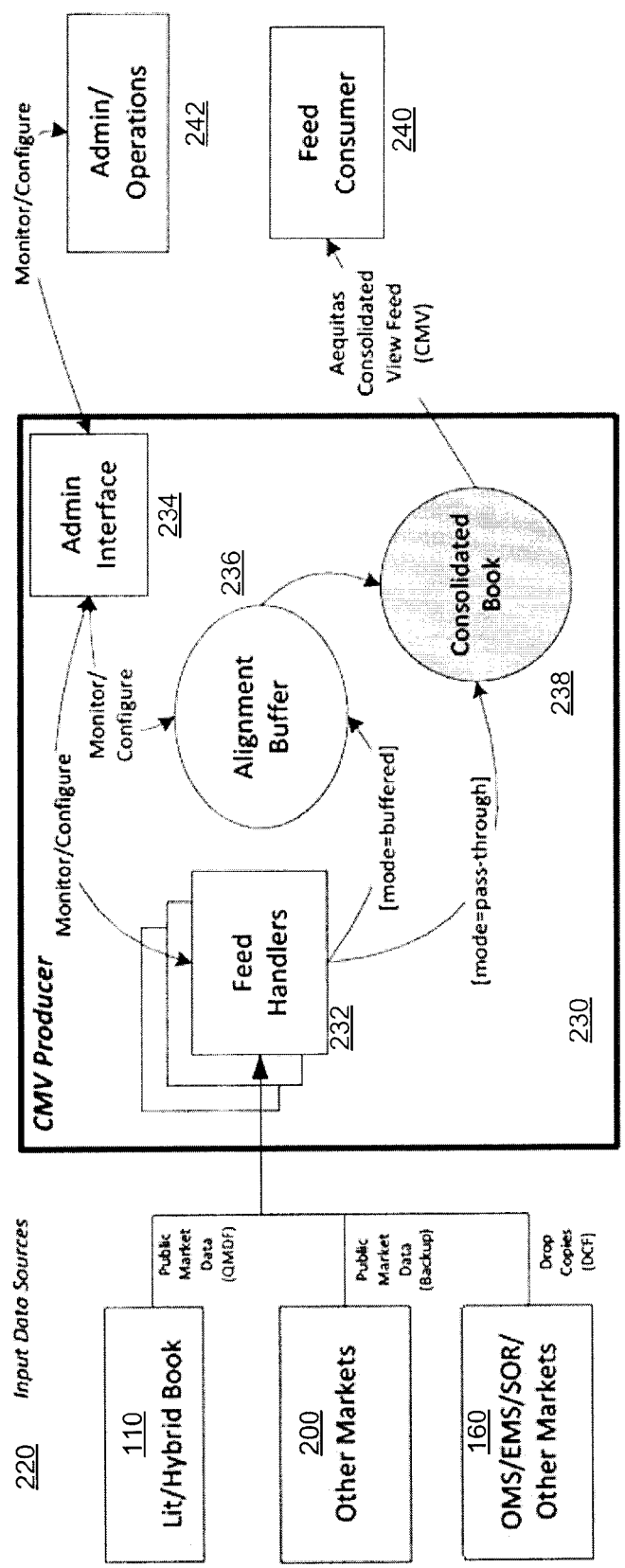

FIG. 7B provides a logical view of the CMV platform. Input data sources 220 may include electronic networked venues 110, other networked venues 200, and OMS/EMS/SOR markets 160, and may provide input data to the CMV producer processor 230. The input data may include visible market data (e.g. QMDF) from networked venues 110, visible market data (e.g. backup data) from other networked venues 200, and drop copies (e.g. DCF) from OMS/EMS/SOR 160.

The CMV platform and components thereof (e.g. an aggregation engine 190) may be configured with control logic for interfacing with input data sources 220 to receive electromagnetic signals defining data sets representing market data for one or more financial interests. CMV platform includes a persistent data store (e.g. data storage device) for storing the market data and consolidated data as described herein.

The CMV producer processor 230 may include control logic to configure various modules including feed handlers 232 for receiving input data from input data sources 220 and for providing data to alignment buffer 236 and consolidated book 238. The feed handlers 232 may provide buffered data to alignment buffer 236 and pass through data to consolidated book 238.

An administrative interface 234 may monitor and configure feed handlers 232 and alignment buffer 236. The administrative interface 234 may transmit and receive monitor and configuration signals to and from administrative and operations system 242.

A feed consumer system 240 may receive the consolidated view feed from consolidated book 238.

The CMV 230 consolidation process may implement various computer acts. For example, in "pass-through" mode (e.g. FIG. 7B), the CMV 230 may pass the individual feeds' events as they are received to the logic 238 which maintains the consolidated book consisting of orders/price levels supplied by each feed. This may be a feed aggregation approach.

In "buffered" mode (e.g. FIG. 7B), the CMV 230 may add incoming events to a aggregation/alignment buffer 236 (e.g. a hold-back queue) which effectively "ages" the events before releasing them to the logic which maintains the consolidated book. The purpose of aging the events is to reduce the "alignment error" between the feeds. In this scope, alignment error may be defined cross-feed time differences between the time of receipt of an event and the actual (theoretical) global timestamp at which the event occurred. Since the "true" theoretical time cannot be actually calculated across multiple data streams, the determination of how long to hold back each event depends on the combination of factors which attempt to indirectly approximate this error.

Simple fixed latency offsets, may be applied individually to each feed. CMV producer 230 may use offsets when the average latency of a given feed is known. This may be calculated based on historical data. Additionally, CMV producer 230 may use different values for different parts of the day from a pre-configured schedule.

Dynamic latency offsets may be used by CMV producer 230 when the average latency of a given feed varies throughout the day. A moving average/rolling window based calculation may be used by CMV producer 230. This technique may be combined with the fixed latency offsets (by using the fixed offsets as min/max caps, for example) to provide better corrections.

Anchor point based offsets may be used by CMV producer 230 when two events from different streams may be correlated using a pre-defined key (or set of keys), e.g. an order ID from the drop copy feed and a visible data feed, then the relative timestamp offset between the two feeds may be used to determine the absolute offset for the less dense data feed. Statistically, the average latency measurement from a dense visible data feed may be more accurate that a low traffic drop copy feed. By correlating the drop copy events to the visible data feed, CMV producer 230 may approximate the latency offset for the drop copy with better degree of accuracy than just using the drop copy feed by itself, for example.

Figure 7C:
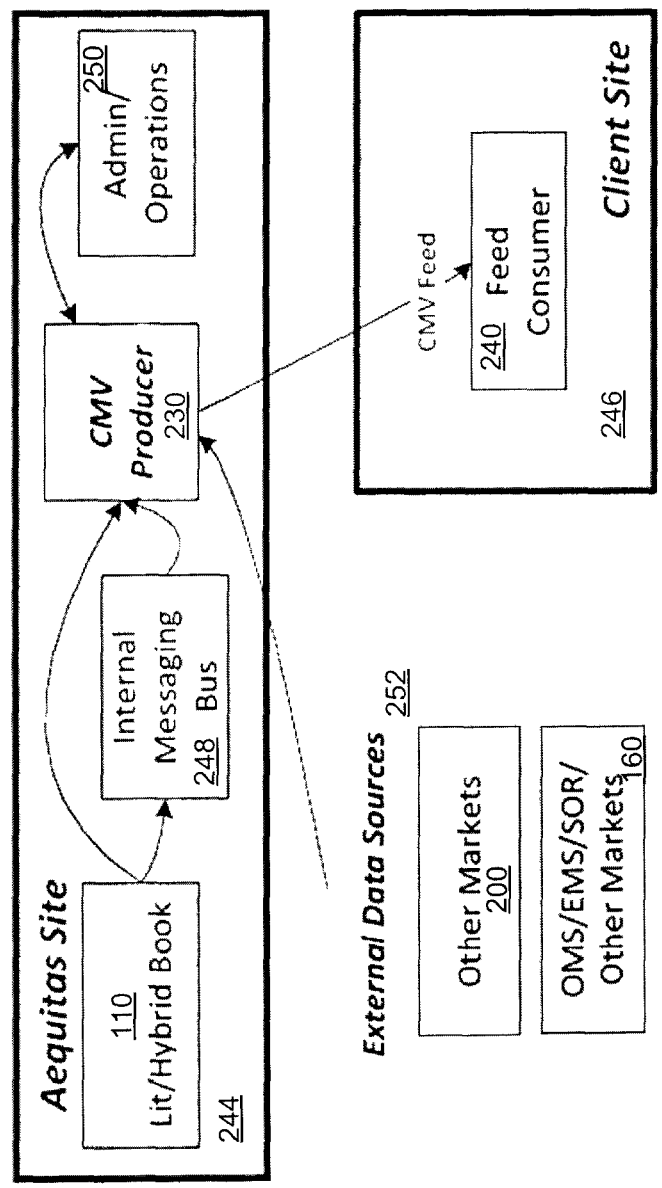
Figure 7D:
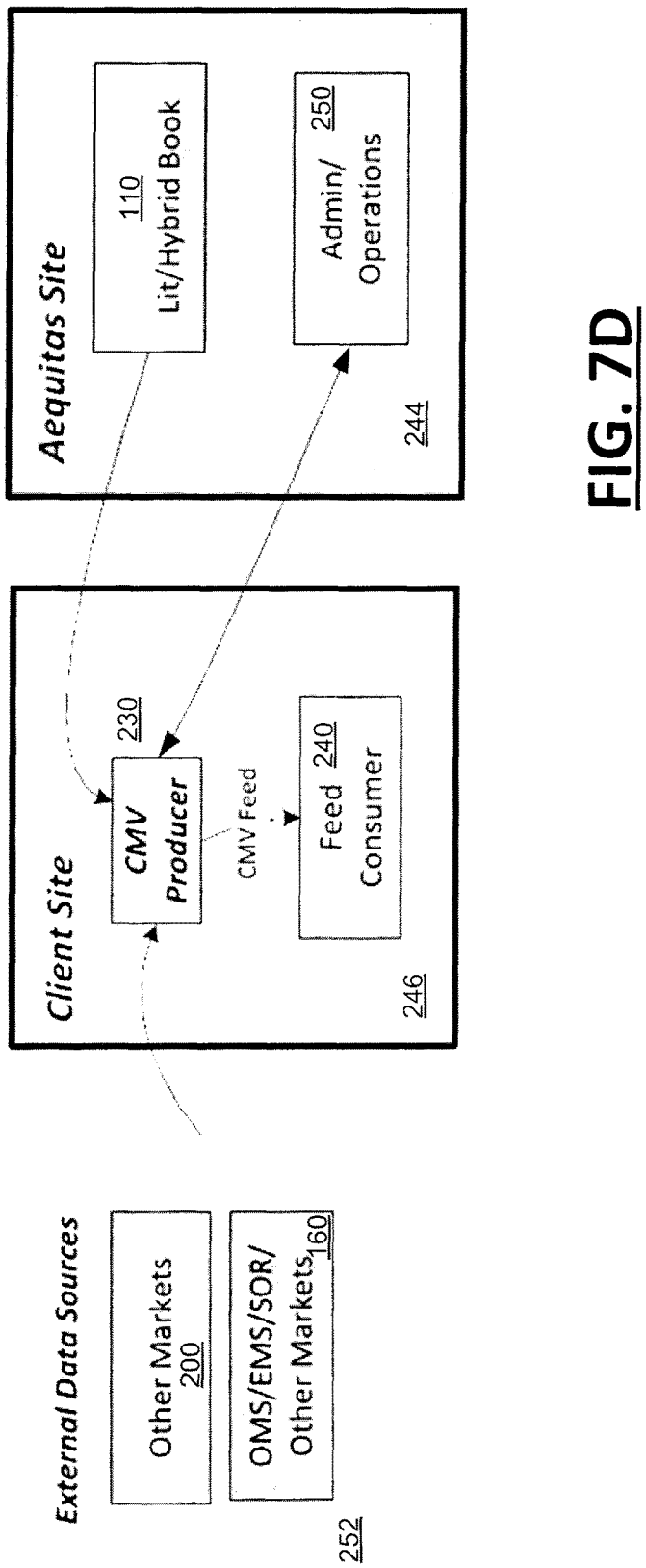
Figure 7H:
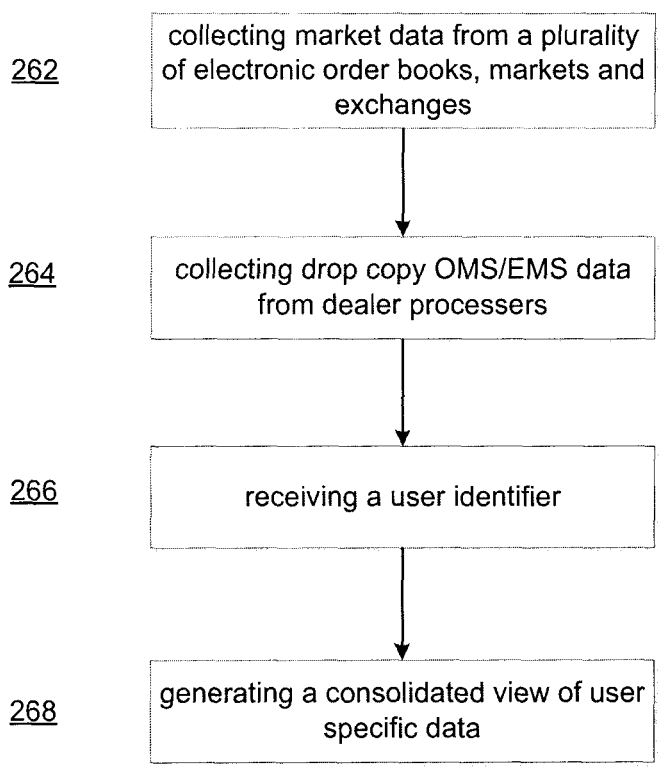
Figure 8:
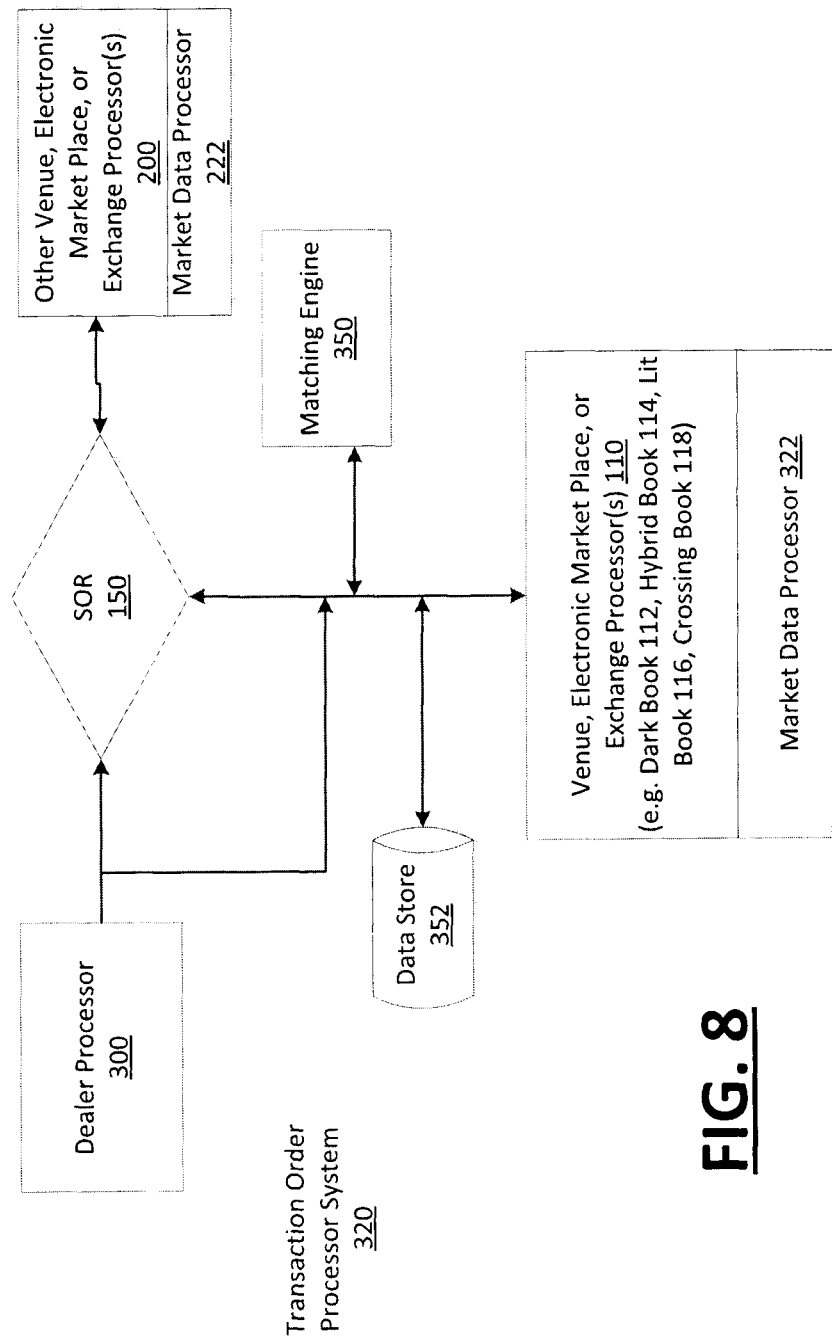

FIG. 7H illustrates a flow chart diagram of a method 260 for generating a consolidated view feed. At 262, the CMV processor 239 collects (via feed handlers 232) market data from electronic order books, markets and venues, and drop copy OMS/EMS data from dealer processors 300 (e.g. input data sources 220). At 266, the CMV processor 239 receives a market data display request, where the request includes a user identifier. At 268, the CMV processor 239 generates a consolidated view of market data specific to the requesting user specific (based on the user identifier). The consolidated market data is specific to the individual user, and may relate to the user's trading book, portfolio and so on.

FIGS. 7C and 7D demonstrate deployment views for the CMV platform.

FIG. 7C illustrates an networked venue deployment for the CMV platform including an exchange site 244, client site 246, and external data sources 252. The exchange site 244 and components thereof may be configured with control logic for interfacing with external data sources 252 to receive electromagnetic signals defining data sets representing market data (or trading data) for one or more financial interests. Market data may be referred to herein to include data relating to trading financial interests by various market participants. Market data may be referred to herein as trading data. The exchange site 244 includes a persistent data store (e.g. data storage device) for storing the market data, and networked venues 110 (e.g. lit book 116, hybrid book 114). The exchange site 244 includes a processor configured with control logic to provide an internal messaging bus 248, CMV producer 230 and an administrator/operations module 250. The CMV producer transmits a consolidated view feed to feed consumer module 252 at client site 246. The client site 246 and components thereof may be configured with control logic for interfacing with exchange site 244 to receive electromagnetic signals defining data sets representing consolidated view feeds.

FIG. 7D illustrates a networked venue deployment for the CMV platform including an exchange site 244, client site 246, and external data sources 252. The client site 246 and components thereof may be configured with control logic for interfacing with external data sources 252 to receive electromagnetic signals defining data sets representing market data for one or more financial interests. The client site 246 includes a persistent data store (e.g. data storage device) for storing the market data. The client site 246 includes a processor configured with control logic to provide a CMV producer 230 and a feed consumer module 252. The CMV producer transmits a consolidated view feed to feed consumer module 252 at client site 246. The client site 246 and components thereof may be configured with control logic for interfacing with exchange site 244 to receive electromagnetic signals defining data sets representing consolidated view feeds. The exchange site 244 includes a processor configured with control logic to provide an administrator/operations module 250. The exchange site 244 includes a persistent data store (e.g. data storage device) for storing electronic networked venues 110 (e.g. lit book 116, hybrid book 114).

FIGS. 7E, 7F, 7G illustrate example interfaces at client site 246 for providing display of consolidated view feeds. FIG. 7E illustrates an example interface displaying consolidated view feeds by market level. FIG. 7F illustrates an example interface displaying consolidated view feeds by order. FIG. 7G illustrates an example interface displaying consolidated view feeds by combined market level and order. These are illustrative example interfaces and other interfaces may be used to display consolidated view feeds.

Matching Priorities

As described above, the various networked venues 110, including dark book(s) 112, hybrid book(s) 114, lit book(s) 116, and/or crossing book(s) 118, can use any of a number of matching priorities, or types of matching priorities, in processing transactions, and may apply the priorities in any desired order(s). Among the various improvements offered by systems and methods according to embodiments described herein is the application of new matching priorities in matching bids, offers, etc., and completing transactions. An example new matching priority may be referred to herein as "size-time" matching.

Different types of networked venues (e.g. dark book(s) 112, lit books 116, hybrid book(s) 114, and/or crossing book(s) 118) may use the same or different matching priorities. For example matching priorities may be price, broker preferencing, market maker identity, and time at which a proposed transaction was posted. As another example, for dark book(s) 112 and hybrid book(s) 114 the matching priorities may be price, broker preference, market maker, size/time. As a further example, for lit books 116, the matching priorities may be price, broker preference, market maker, specified market participant (e.g. traditional, retail, institutional, non-SME, non-HFT), and time. These are illustrative examples only and other matching priorities may be used.

Referring now to FIGS. 8 to 17, various embodiments involving matching priorities implemented by a matching engine will be described. FIGS. 8 to 11 illustrate systems for automated trading of financial interests on electronic trading systems.

The system may be referred to herein as a transaction order processor system 320 which may be similar to the transaction data processor 100 described herein.

Transaction order processor system 320 may include one or more computing devices operable by users to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network (which may be referred to as "cloud computing").

Transaction order processor system 320 may reside on one or more networked computing devices, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

Transaction order processor system 320 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Transaction order processor system 320 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Transaction order processor system 320 may include one or more input devices, such as a keyboard, mouse, camera, touch screen and a microphone, and may also include one or more output devices such as a display screen and a speaker. Transaction order processor system 320 has network interfaces in order to enable communication between system components, to access and connect to network resources, to serve an application and other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more transaction order processor systems 320 distributed over a geographic area and connected via a network. Transaction order processor system 320 is operable to register and authenticate users (using a login, unique identifier, and password for example) prior to providing access to applications, a local network, network resources, other networks and network security devices. Transaction order processor system 320 may be different types of devices and may serve one user or multiple users.

The transaction order processor system 320 is configured with control logic for interfacing with market participant processor(s) 300 to receive electromagnetic signals defining data sets representing proposed order requests to execute transactions in one or more financial interests. The proposed order requests include proposed buy order requests and sell order requests.

The transaction order processor system 320 includes a persistent data store 352 (e.g. data storage device) for storing the proposed order requests, along with rankings, matched results, and matching factors as described herein.

The transaction order processor system 320 includes a matching engine 350 for matching one or more buy orders to one or more sell orders according to matching factors as described herein. The matching factors are used to rank and match buy orders to sell order in a manner that may achieve fairness, and other advantages as described herein. The orders may be ranked according to different matching factors, which may be aggregated to generate a total rank. The different rankings for different matching factors may be weighted different using non-zero coefficients so that one matching factor has greater weight than another matching factor. The matching engine 350 may be integral to or external to venues, electronic networked venue processors 110, other networked venue processors 200, electronic clearing house, or other electronic transaction execution hardware components.

The transaction order processor system 320 is configured to execute transactions based on the buy orders matched to the sell orders using networked venue processors 110, other networked venue processors 200, electronic clearing house, or other electronic transaction execution hardware components. Transaction order processor system 320 may also include market data processors 322, 222.

Figure 9:
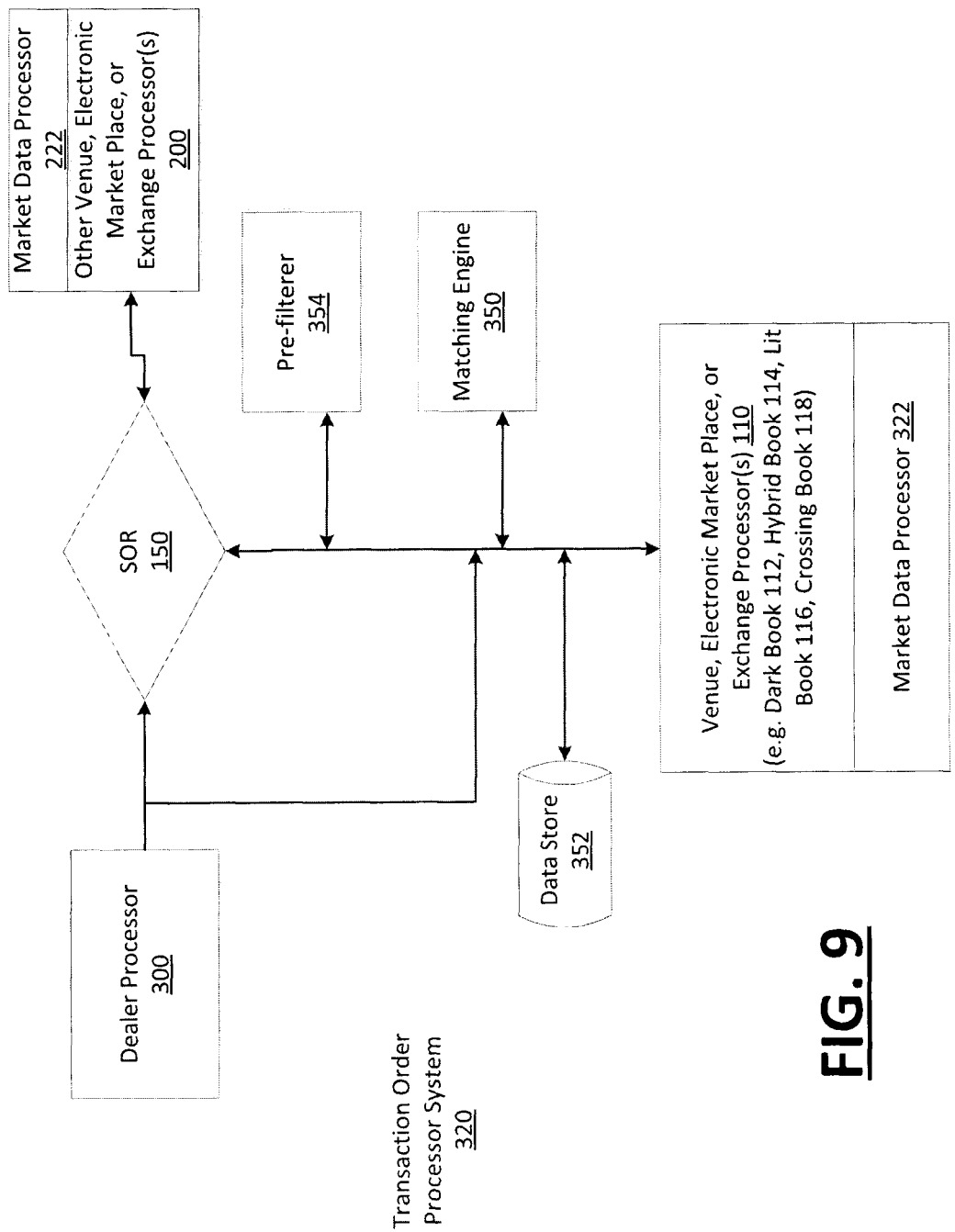
Figure 11:
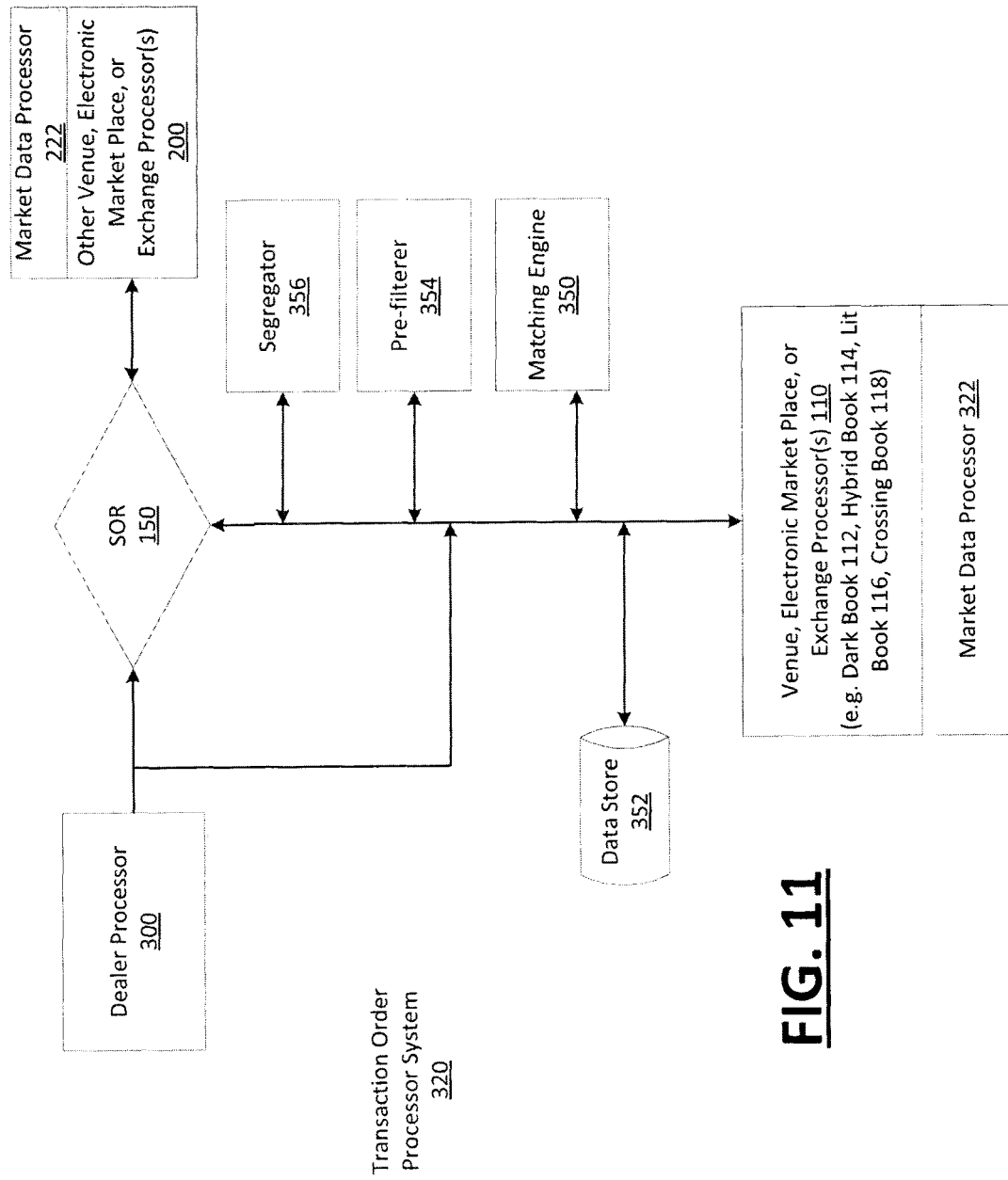
Figure 13:
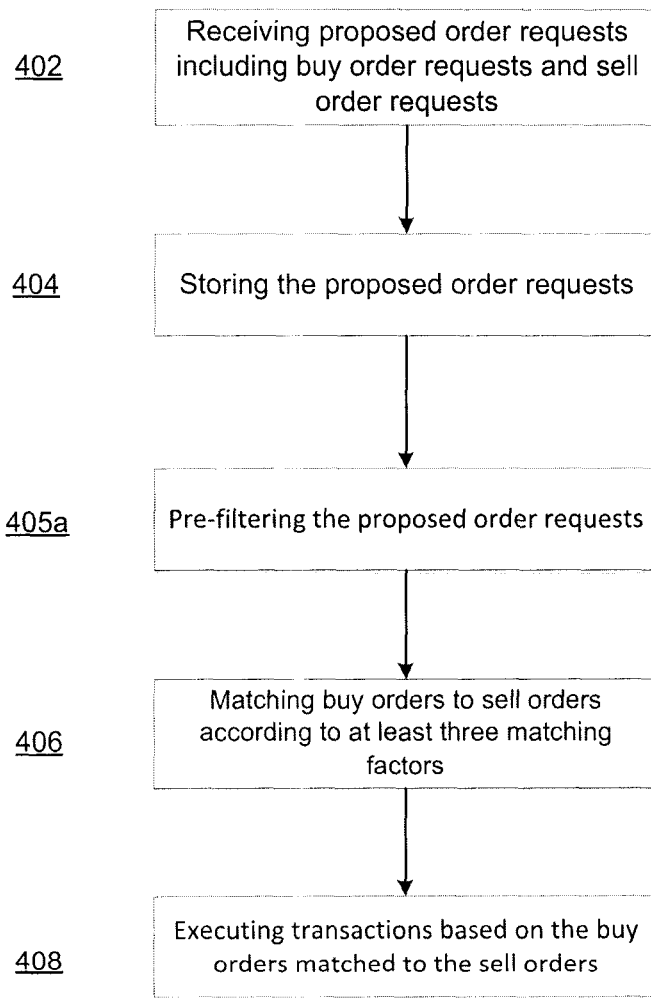
Figure 14:
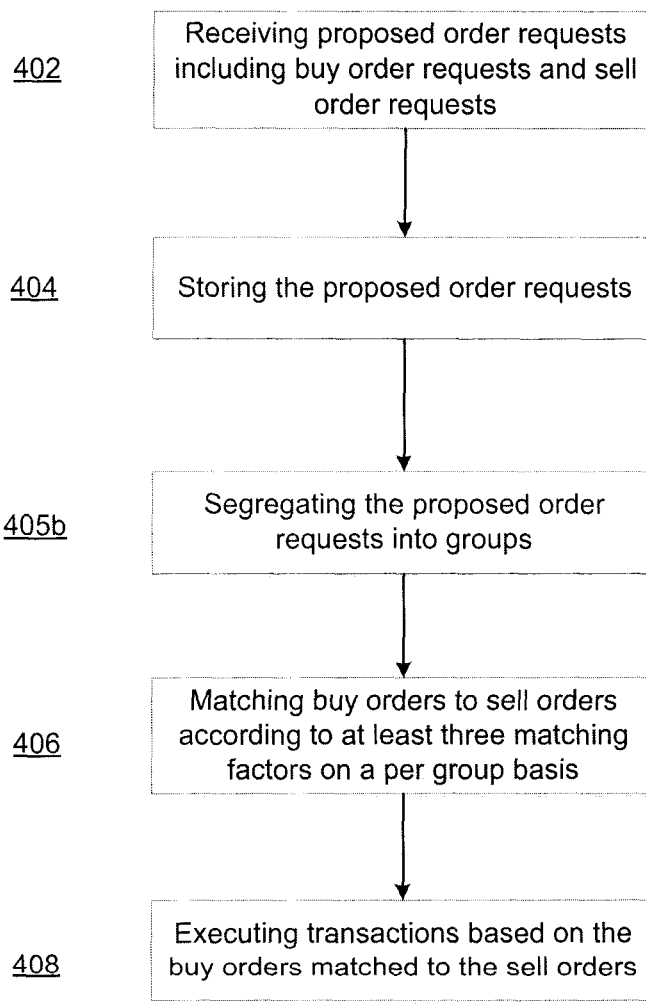
Figure 15:
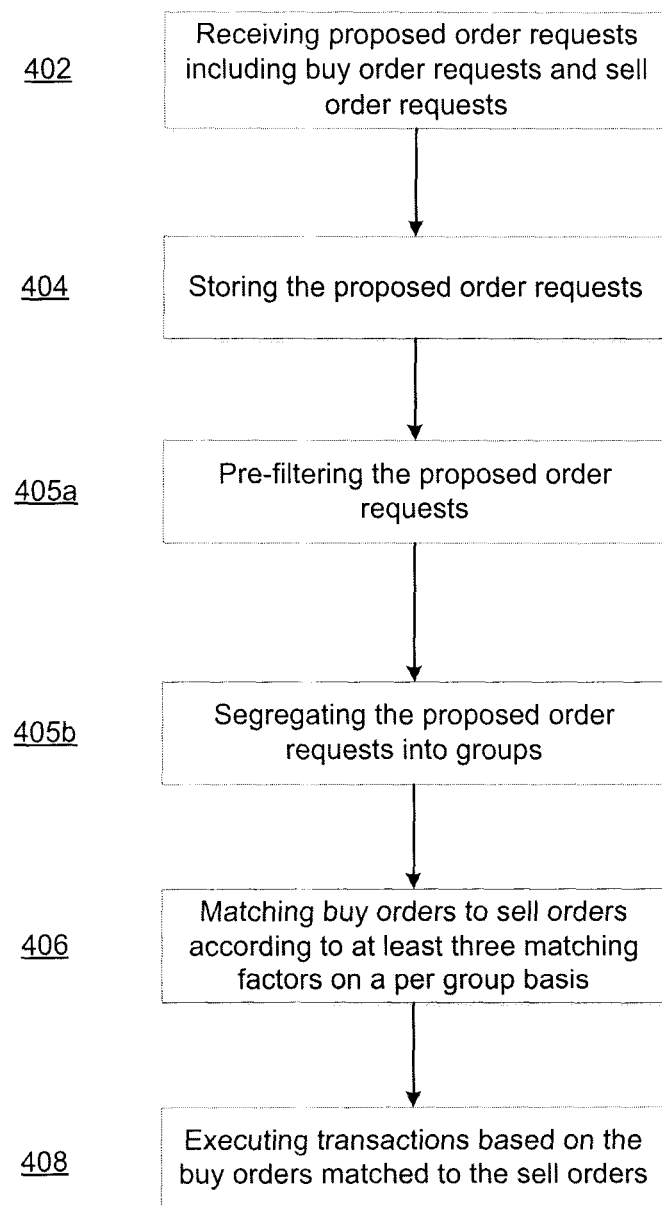

As shown in FIGS. 9 and 11, transaction order processor system 320 may also include a pre-filterer 354 for pre-filtering the proposed order requests prior to the matching by the matching engine 350. Various pre-filtering techniques may be used, as described herein. For example, the pre-filterer 354 may be configured to pre-filter by matching a buy order to a sell order when the buy order fully fills the sell order. This approach may attempt to reduce transaction processing costs and trading fees by recognizing that multiple trades requires more work by a clearing house, and increased costs. For example, one large trade may provide cost savings over multiple smaller trades. Accordingly, one pre-filter may be a size based threshold. If an incoming order can fully match with an order then this may take priority over ranking mechanism. Reduction in the number of trades may reduce trading fees. Other pre-filtering mechanisms include order size, a user type, an order type, and other attributes as described herein. The pre-filterer 354 may decrease fragmentation of orders when filling.

Pre-filterer 354 may be used to implement restrictions on trading. The restrictions may be based on a number of different attributes as noted herein. For example, an attribute restriction may be market participant type or specified market participant (e.g. retail, institutional, a SME, a HFT, a non-HFT, and a non-SME). This enables the pool of proposed orders to be processed by matching engine 350 to be limited. Pre-filterer 354 may be used at multiple iterations, and there may be different levels of pre-filtering. For example, a first pre-filter may be applied to reduce or aggregate the pool of proposed order requests, and then another pre-filter may be applied to the already reduced or selected pool of proposed order requests. Examples include a first pre-filter at a price level, and then a second pre-filter based on order size. The pre-filterer 354 may apply to different pools or groups (e.g. grouped at different price levels) and performed iteratively for each group. Groups as used herein may refer to aggregate pools of order requests, sets of order requests, collections of order requests, and so on.

Figure 10:
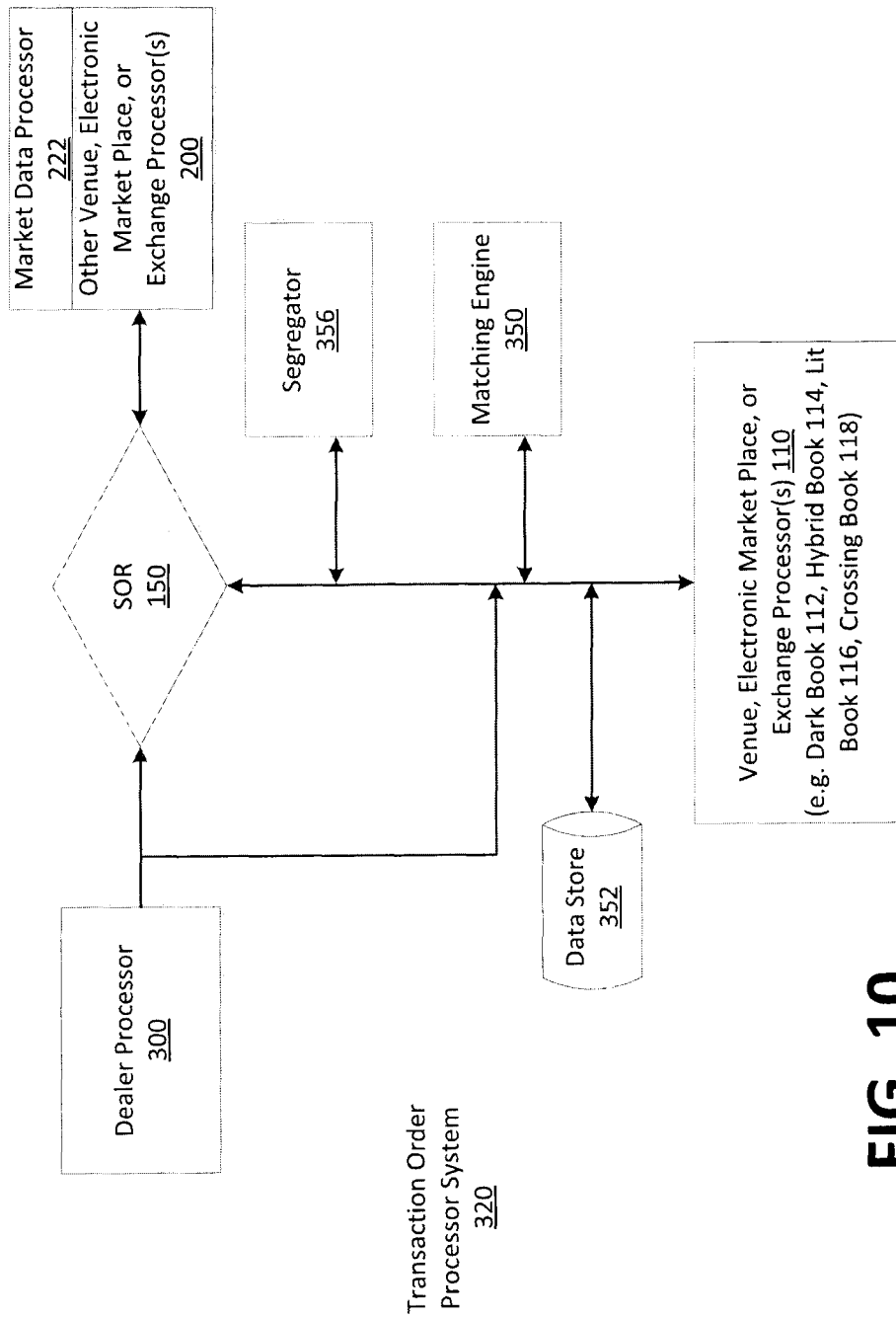

As shown in FIGS. 10 and 11, the transaction order processor system 320 may also include a segregator 356 for segregating the proposed order requests into groups or pools. Example segregation models include price level, order type, order attribute, order size, user type, specified market participant (SME v. non-SME, retail v. non-retail), user attribute, and order origination. The matching engine 350 is operable to perform the matching on a per group basis or across groups. The segregating may be iterative and implemented in levels. For example, the pool of proposed order requests may be grouped by price level and then, for each price level, further grouped by another attribute such as user type. The segregation may be used to implement restrictions, such as user type.

FIGS. 12 to 15 illustrate example flow chart diagrams of methods 400 for automated trading of financial interests on electronic trading systems.

At 402, transaction order processor 320 receives from market participant processor(s) 300 electromagnetic signals defining data sets representing proposed order requests to execute transactions in one or more financial interests. The proposed order requests may be received via SOR 150. The proposed order requests include proposed buy order requests and sell order requests.

The proposed order requests may be associated with one or more attributes such as order time, sequence identifier, price level, order type, order attribute, order size, filled amount, remaining size, various matching factor ranks, total rank, trades, and order origination.

In accordance with some embodiments, each proposed order request may be associated with an attribute defining an order time. The order time may be rounded to a predetermined increment. The order time may be a timestamp for an original time of order entry.

In accordance with some embodiments, each proposed order request may be associated with a composite identifier as an attribute. The composite identifier may include a physical time (e.g. assigned by a physical clock) such as an order time (e.g. timestamp) and a sequence identifier which may be a logical time.

At 404, transaction order processor 320 stores the proposed order requests in a persistent data store 352. Various other components of transaction order processor 320 may access the persistent data store 352 to read data, process data, update data, and so on.

In some embodiments, at 405a, pre-filterer 354 pre-filters the proposed order requests. Each proposed order request may be associated with an order size (e.g. a number of units of a particular financial interest). For example, a proposed sell order may be associated with an attribute defining a size or quantity of financial interests that a dealer proposes to sell. A proposed buy order may be associated with a size or quantity of financial interests that a market participant proposes to buy. The pre-filterer 354 may be configured with control logic to pre-filter by matching a buy order to a sell order when the buy order fully fills the sell order. For example, a buy order that fully fills a sell order may be matched to the sell order over a buy order that only partially fills the sell order. This may reduce the transaction fees by attempting to decrease the number of trades required to complete or fill an order. A proposed order request may be associated with a variety of attributes including an order time, an order size, a user type, a price level, an order type, and so on. Other attributes or parameters are referred to herein. The pre-filterer 354 may be configured with control logic to pre-filter based on one or more attributes.

In some embodiments, at 405b, segregator 356 may be configured with control logic to pre-process the proposed order requests by segregating the plurality of proposed order requests into groups. Matching engine 350 may be configured to perform matching on a per group basis. The segregator 356 may be configured with control logic to group the proposed order requests based on a variety of attributes. For example, segregator 356 may be configured with control logic to group the proposed order requests based on price level, order type (e.g. buy, sell), order attribute, order size, order origination and so on. Other attributes are referred to herein.

At 406, the matching engine 350 matches one or more buy orders to one or more sell orders according to matching factors. As noted, this may be performed on a per group basis if the pool of proposed order requests is segregated.

The matching may be implemented by ranking the proposed orders based on their associated attributes according to a variety of matching factors. Each matching factor may generate a different ranking for a particular proposed order request. The different rankings may be aggregated to generate a total ranking for the particular proposed order request. The aggregation may be based on a weighting for different matching factors, where each matching factor is associated with a non-zero coefficient weighting.

In accordance with some embodiments, the matching engine 350 may be configured with control logic to implement size-time matching using three matching factors. The three matching factors may include a priority time, a sequence identifier, a last order event, a remaining unexecuted order size, and other attributes.

The priority time may relate to the time of entry of the order or the time of an update to the order. The priority time may be an attribute associated with the proposed order request, and a priority time may be defined by a sequence identifier. The sequence identifier may be generated as a logical timestamp such that a proposed order request made or changed before a current proposed order request receives an earlier or lower sequence identifier, and a proposed order request made or changed after a current proposed order request receives a later or higher sequence identifier. The sequence identifier may be unique for each proposed order request (e.g. strictly ascending or descending). The sequence identifier provides a mechanism to sort and rank the proposed order requests based on a logical timestamp (as compared to a physical timestamp that may be assigned using a time clock). The sequence identifier may be assigned to a proposed order at the time of entry when an order size and a price level is defined for an order. The sequence identifier may be reset for the proposed order when the order size changes or the price level changes. That is, an update to price or volume may trigger a new sequence identifier, or reset the sequence identifier.

The last order event may relate to a full fill of the proposed order request, a partial fill of the proposed order request, a change of order size of the proposed order request, a change of price level of the proposed order request, and so on.

In accordance with some embodiments, the matching factors may be associated with a non-zero coefficient weighting. The non-zero coefficient weighting may be used to aggregate the different rankings for different matching factors to generate a total ranking. The total ranking may be used to match the proposed buy order requests to the proposed sell order requests in order to fill orders and execute transactions.

At 408, transaction order processor 320 executes transactions based on the buy orders matched to the sell orders. Executing transactions may result in the filling of buy and sell order requests.

Matching engine 350 may be configured with control logic to implement matching according to various matching techniques. Continuous order matching may refer to the process for executing trades by matching buy orders with sell orders.

An example of matching technique may be Price/Time. When an order is entered into a book it may be assigned a timestamp. The timestamp assigned may be used to prioritize all orders in the book at the same price level (e.g. the order entered the earliest will be executed first). Note that an order may not necessarily be traded at a single price (level) but may generate multiple partial trades at different price levels. When an order trades against all available volume at a given price level, the next best price level may become best and the earliest submitted order at that price level may get priority. Note that a variant of price/time includes size then time whereby orders with the largest equal volumes (at a given price level) are matched first based on timestamp sequence.

Another example of a matching technique is Pro Rata. When matching orders in the book against an inbound order, all resting orders (at the price level) may be taken into account based on a percentage of the overall volume (at that price level) regardless of its timestamp. The inbound order may then match against a portion of all eligible resting orders. Note that this methodology is commonly applied between a specific set of order originator types (ex. market maker order vs. non-market maker orders).

FIG. 16 illustrates an example of order book matched under a price/time scenario and a Pro Rata scenario. The originating order book 502 is matched under a price/time scenario to generate a resulting order book 504 after order execution. The originating order book 502 may also be matched under a Pro Rata scenario to generate another resulting order book 506.

Price/time and Pro Rata matching methodologies may be combined. For example, a Pro Rata matching logic may be applied first and in the event two orders have the same resulting Pro Rata allocation (which would result in the complete fill of the inbound order) then preference is applied to the order which had been submitted to the book first.

Pro Rata allocation may include restrictions. For example, restrictions may include minimum order size restrictions applied to orders which are considered for Pro Rata allocations (primarily utilized to reduce the number of partial fills).

User type or other attributes may also be used by matching methodologies. For example, within the noted matching implementations there may also be a concept of user type priority matching, whereby a specific user type is given matching priority above all other similar orders. For example, in a Canadian marketplace similar orders may be matched based on broker preference (e.g. trading rules set by particular venue). At the same price level, orders submitted by the same broker (i.e. the originating broker on a buy and sell order are the same) may be matched first (e.g. broker preference); followed by orders originating from the designated market maker (for the symbol being traded) (e.g. market maker preference); followed by all other available orders using either the Pro Rata or price/time methodologies, other matching techniques (or combination of). Note embodiments described herein may also support an additional broker preference technique, specified market participant, where an order with a specific regulatory marker assigned thereto or associated with a specific user type or trading behaviour, and may be matched ahead of orders (at the same price level) which do not have the specified market participant marker.

Size/Time Priority

Another example matching technique may be referred to as size-time weighting. The size-time weighting technique may involve ranking orders using at least three different matching factors, as described herein. That is, the ranking may be based on three dimensions of an order. Each dimension may relate to different attributes of an order, or market participant (e.g. user) associated with the order. Example dimensions include priority time, sequence identifier, last order event, remaining unexecuted order size, and so on. Additional dimensions may be referred to herein. Each dimension may be associated with a different weighting. Different factors will result in different rankings or sortings for the orders. The different rankings or sorts will be aggregate to generate a total rank or score for the order. Matching of buy orders to sell orders may be based on the total rank.

Among the advantages offered by size-time weighting in accordance with the embodiments described herein is the ability to fairly arbitrate between important aspects of an order's characteristics in, for example, a central limit order book. For example, data representing price and other attributes (e.g. order terms, considerations) associated with a proposed transaction or order (e.g. broker identity and/or characteristic(s) of a broker) can be used to determine matching priority(ies) in such order books. The matching engine 350 may be configured to implement a variety of matching priorities depending on the type of book, or other attributes. Attributes may relate to an order (e.g. order attributes) or attributes may relate to the market participant associated with the order (e.g. user attributes, market participant attributes). For example, a type of market participant (e.g. retail, institutional investor) may be a user attribute or a market participant attribute).

In accordance with some embodiments, the matching engine(s) 350 may use absolute order timestamps (or sequence IDs by proxy) to further refine matching priority. For example, Pro Rata allocations can be applied in order to fairly allocate fills. However, in various circumstances each of these criteria may suffer deficiencies—in the case of time, for example, issues pertaining to perceived fairness can arise among market participants. Moreover, Pro Rata allocations by their nature involve trade fragmentation, which in some circumstances may be viewed as an undesirable result.

In order to address such issues, size-time priorities in accordance with embodiments described herein may be applied by suitably-configured networked venue processor (s), such as execution engines, matching engines 350, and other processors associated with any or all of networked venue(s) 110. Upon receipt of incoming order data, such venue processor(s) or matching engines 350 can determine the size of corresponding volume terms (or remaining, unfilled size, should other matching considerations, such as broker identity have been applied previously, and some of the order thereby filled). Optionally, aside from any other considerations, the pool of orders may be segregated by various segregation models and attributes for the orders. For example, all single orders residing in an order book at each price level may first be segregated and considered eligible for priority matching with the incoming order. Assuming no such orders exist, the entire population of orders at each price level may be considered, and a weighted scoring mechanism applied. Other segregation models may be based upon order type, order size, order originator type, and other attributes.

In accordance with some embodiments, the pool of orders may be pre-filtered based on various attributes. For example, the pool of orders may be pre-filtered based on order size to match buy orders and sell orders that are fully filled. This may reduce the number of trades required to fill orders which may in turn reduce transaction and trade fees.

By way of illustrative example, a three matching factor scoring mechanism can, for example, consider:
  Priority Time (e.g. Original Order Time of Entry, sequence identifier, and other measure of logical time or physical time): this may reward, for example, ongoing commitment of partially-filled orders. Changes to orders may reset the Priority Time (e.g. price level changes, volume increase);
  Sequence Identifier;
  Last Order Event (e.g. last fill time, last change of volume, last change of price, and so on): this may reward, for example, time commitment while adjusting appropriately for recent fills or other activity;
  Remaining Unexecuted Order Size (to reward, for example, larger resting orders).

Applying each of such factors to different orders can, for example, generate a ranking of the orders on an integer scale from 1 to N (with N being the population count and equal factors rounded down on the rank scale to the first factor with that rank with population count continuing). The ranking by each factor may be aggregated to generate a total ranking for the orders. Aggregation may use non-zero coefficient weightings for each factor.

Different changes to orders may be considered an order event only, or both an order event and a change to trigger a reset to the priority time. For example, a decrease in an order size may trigger a reset of the priority time (e.g. as a form of punishment to encourage increases in orders) and may also be viewed as an event. As another example, an increase in an order size may not trigger a reset of the priority time (e.g. to encourage increases available tradable volume) but may be viewed as an event.

As an example, consider three orders of size 900, 900 and 1,000. Here the rank applied would be 1, 1, 3 with the first two, having the same size, being rewarded the same rank and 3 being the population count. As such, ranking would be ascending based on size. These rankings for order size may be aggregated with other rankings for other factors to generate total or aggregate ranks for the orders.

FIGS. 17A, 17B, and 17C illustrates an example of order book matched under a size-time weighted scenario. The originating order list 702a, 704a, 706a is matched under a size-time weighted scenario to generate a resulting order list 702b, 704b, 706b. The originating order list 702a, 704a, 706a may be matched under a size-time weighted using equal weights (as shown in FIG. 17A), or different weights (as shown in FIGS. 17B, 17C) to generate other resulting order list 704b, 706b. In particular, FIG. 17B shows a greater weight applied to the Time of Last Event factor. FIG. 17C shows a greater weight applied to the Order Size Factor. A pre-filter may also be applied by price level to generate different groupings. These are example weights (e.g. ⅙, ⅔, ½, ¼, 2, ⅓), factors, and values for illustrative purposes. Example order attributes include, but are not limited to, sequence identifier, time of entry, time of entry/last fill, original order size, quantity filled, remaining size, size rank, time/last fill rank, time commitment rank, total rank, and trades. These attributes may be referred to as different dimensions of the order. The order list may be defined within an order book, for example.

Optionally, to improve fairness, timestamps can be determined and ranked, based upon lower time resolutions to address the typical "first past the post" problems associated with absolute time or sequence ID ranking. The timestamp rounding may be performed using various predetermined increments configured per venue (e.g. second, millisecond, and or other). To address temporal logic issues time rounding would be down to the opening timestamp of each window. For example, consider the following:
  10:00:00.001151
  10:00:00.001562
  10:00:00.001671
  10:00:00.002171
  10:00:00.002341
  10:00:00.003421

With the associated timestamps at the microsecond level of resolution, a networked venue 110 which rounds to the millisecond could treat the preceding six timestamps as:
  10:00:00.001
  10:00:00.001
  10:00:00.001
  10:00:00.002
  10:00:00.002
  10:00:00.003

As a result, the orders would be ranked as:
  4,4,4,2,2, 1

Note that assigned rankings descend, based on passage of incremental time. These rankings may be aggregated with the rankings for the size factor, or other factor to generate a total ranking for the order.

Rank scales can subsequently be rescaled by one or more multipliers, as desired. The multipliers may be referred to as non-zero coefficients to weight different factors. For example, the N=6 count above could be rescaled by a factor of 6/4 times each integer, in order to condition the rank score impact on subsequent matching rounds.

Orders may then be allocated scores or total ranks in accordance with the three individual factors, and a priority of matching for incoming orders can be determined based upon a coefficient-weighted total score (optionally, but not necessarily, equaling 100%) of the three factors or more factors.

Ties might be broken, for example, only where final weighted scores are equal, and might use any appropriate factor, including for example a serially-assigned sequence 10, financial interest type, listing venue, financial interest price, currency, or other preferred attribute. A sequence number or identifier may provide a tie breaker as a sequence identifier may be a unique value that may be strictly increasing or decreasing. The sequence identifier may act as a logical time (as opposed to physical time). The priority time of the matching priority may be expressed as logical time, such as a sequence identifier or other time/event identifier.

Among other advantages such priority schemes enable periodic and/or real-time reporting and adjustments, so that, for example, inappropriate or otherwise undesired "gaming" of networked venue rules may be countered, and/or to otherwise optimize desired results. Priorities according to this aspect of embodiments described herein may further be applied on a financial interest-specific basis.

Among other benefits, size-time priorities in accordance with this aspect of the embodiments described herein may address some of the typical problems associated with either time-based or Pro Rata based priority logic. For example, by filtering single orders able to fill the full size (or remainder) of incoming orders, this logic naturally addresses trade execution fragmentation. Further, use of a weighted scoring system can help to address issues typically associated with fairness, priority gaming, size dominance and trade fragmentation. Partially-filled orders using this methodology are naturally lowered in score (and thus priority) on subsequent matching events based upon being assigned a lower rank-based score on 2 (e.g. Last Order Event) in subsequent matching events. Assuming optimal factor weights, this should lead to a more equitable rotation of order priority.

Accordingly, the matching priority may evaluate orders and market participants based on different matching factors or criteria. This may provide a fair mechanism to match buyers and sellers. To only consider time when matching orders may give rise to fairness issues. Participants who react quickly may get ahead of other participants (e.g. retail investor). Time may be a technical factor relating to arbitrary order evaluations based on system performance. For example, a network line or system delays may cause latency which may have large impact on time based processing. A millisecond delay may have a large impact. Further, transaction systems may prefer certain participants and configure matching priorities accordingly.

Segmentation

Known approaches to trading may result in issues and challenges for different groups of market participants.

Known approaches to trading may be subjective in nature and as a result may be applied in an inconsistent manner. This may result in lack of product availability to a market participant. In addition, the subjective nature does not consistently provide the same benefits or protections which flow segmentation in accordance with embodiments described herein aims to provide. Embodiments described herein may rebalance trading opportunities.

Embodiments described herein may implement a segmentation technique to facilitate the automated identification of specific trading strategies (e.g. where order generation and entry is fully automated and in normal course the originator does not have, at the end of each trading day, more than a nominal position) or behaviours (e.g. rapid order insert immediately followed by an order cancellation) in real-time. This segmentation technique may result in the systematic acceptance or rejection of an order flow from entering into, taking liquidity from, or providing liquidity to a specified networked venue 110 (e.g. dark book 112, hybrid book 114, lit book 116, crossing book 118). Trading strategy or behaviour identification can be completed on an order by order basis or a group of orders based on a single, all or a set of defined parameters.

The segmentation technique can be configured to use one, all or a combination of the below defined parameters for purposes of strategy or behavior identification for an order or group of orders which is to be segmented and subject to specified treatment. A user may refer to a market participant. Example parameters include but are not limited to:

Market Participant Identifier: a unique venue assigned identifier assigned to each eligible market participant 300 and associated with each order submitted by the respective market participant 300 via SOR 150.

Order Entry Message Tag/field: a defined tag which may be provided on the submission of each order to the networked venue (may or may not be received via the SOR 150 or direct). This tag/field may be a regulatory or non-regulator marker. This tag/field may be currently existing or newly created by the networked venue.

Order Entry Tag Value: a defined value which must be either present or absent is a specific tag on the submission of each order to the networked venue.

Order Type: an networked venue defined order type available for submission (e.g. Limit, Market, National Best).

Order Attribute: system or networked venue defined attribute (existing or new) of an order submitted to the networked venue (e.g. iceberg, stop).

Order to Trade Ratio: number of orders originating from the same Trader Identifier prior to an order (submitted by the identified Market Participant Identifier) participation in a trade (i.e. number of orders submitted to generate one trade).

Client or agency attributes (e.g. user attributes).

Cancellation to trade ratio: number of cancelled orders originating from the same Trader Identifier prior to an order (submitted by the identified Market Participant Identifier) participation in a trade (i.e. number of orders cancelled to generate one trade).

Figure 18:
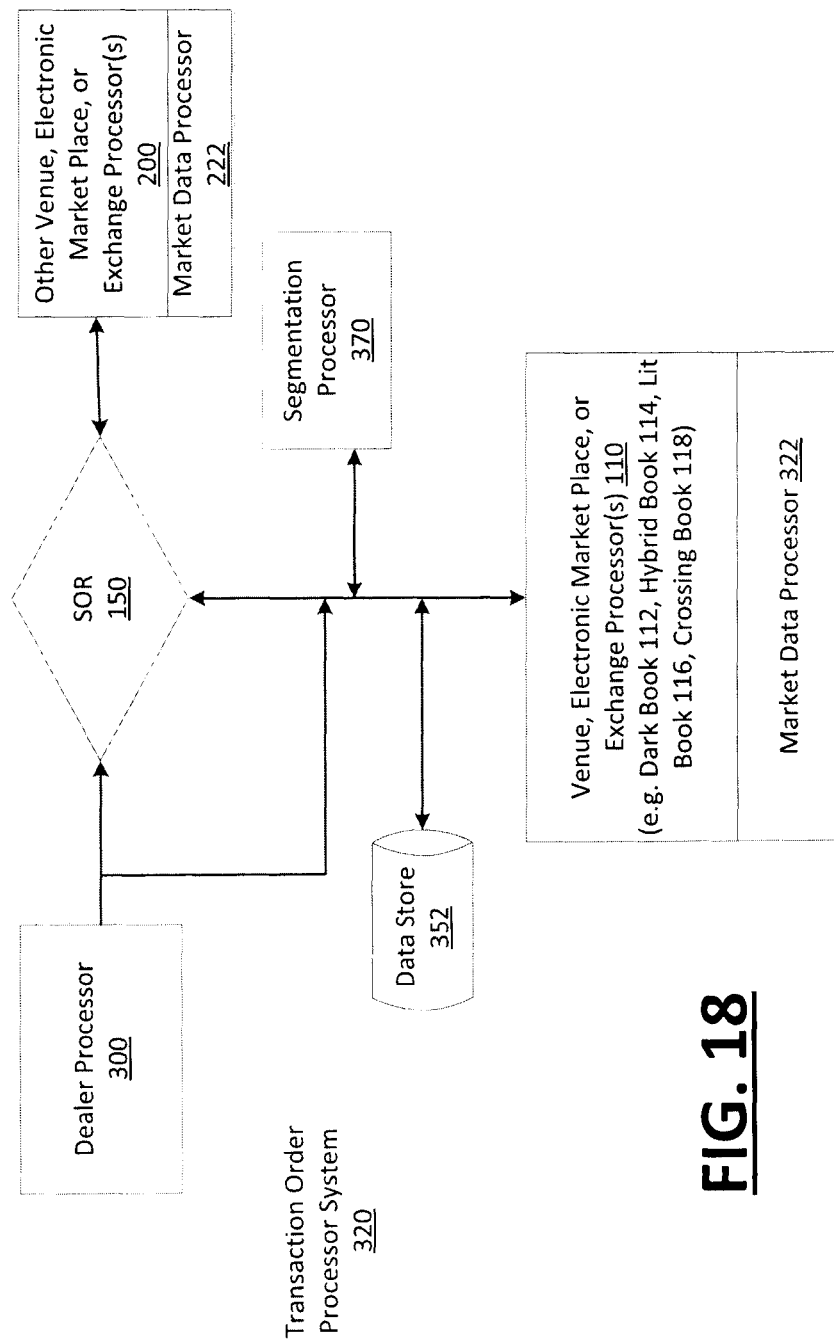
FIG. 18 illustrates an example system including segmentation processor 370 according to some embodiments described herein.

Referring now to FIG. 18 there is shown a transaction order processor system 320 including a segmentation processor 370. The segmentation processor 370 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network (which may be referred to as "cloud computing").

The segmentation processor 370 may reside on one or more networked computing devices, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

The segmentation processor 370 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The segmentation processor 370 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The segmentation processor 370 may include one or more input devices, such as a keyboard, mouse, camera, touch screen and a microphone, and may also include one or more output devices such as a display screen and a speaker. The segmentation processor 370 has network interfaces in order to enable communication between system components, to access and connect to network resources, to serve an application and other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more segmentation processors 370 distributed over a geographic area and connected via a network. The segmentation processor 370 is operable to register and authenticate users (using a login, unique identifier, and password for example) prior to providing access to applications, a local network, network resources, other networks and network security devices. The segmentation processor 370 may be different types of devices and may serve one user or multiple users.

The segmentation processor 370 is configured with control logic for interfacing with market participant processor(s) 300 to receive electromagnetic signals defining data sets representing proposed order requests to execute transactions in one or more financial interests. The segmentation processor 370 is configured with control logic to process the order requests to automatically approve or deny the order requests prior to submitting the requests to electronic networked venues 110.

The segmentation processor 370 connects with or integrates a persistent data store 352 (e.g. data storage device) for storing the proposed order requests, along with attributes and parameters relating to the orders, and segmentation tables, as described herein. The segmentation processor 370 uses the segmentation tables to automatically direct, aggregate, approve or deny orders prior to submission to electronic networked venues 110.

The segmentation processor 370 may be configured with control logic to automatically apply the segmentation technique in a consistent and repeatable manner across one, all or a subset of exchange order books.

The segmentation processor 370 may provide a variety of services. For example, the segmentation processor 370 may provide the ability to protect market participants from predatory or other strategies that may disadvantage them. The segmentation technique may provide consistent and quantifiable approach to monitor and manage usage via the use of specific parameter(s) to direct, aggregate, approve or reject an order from entering a networked venue 110. The segmentation processor 370 may provide elimination of subjectivity for approval and rejection of orders. These are non-limiting examples.

Figure 19:
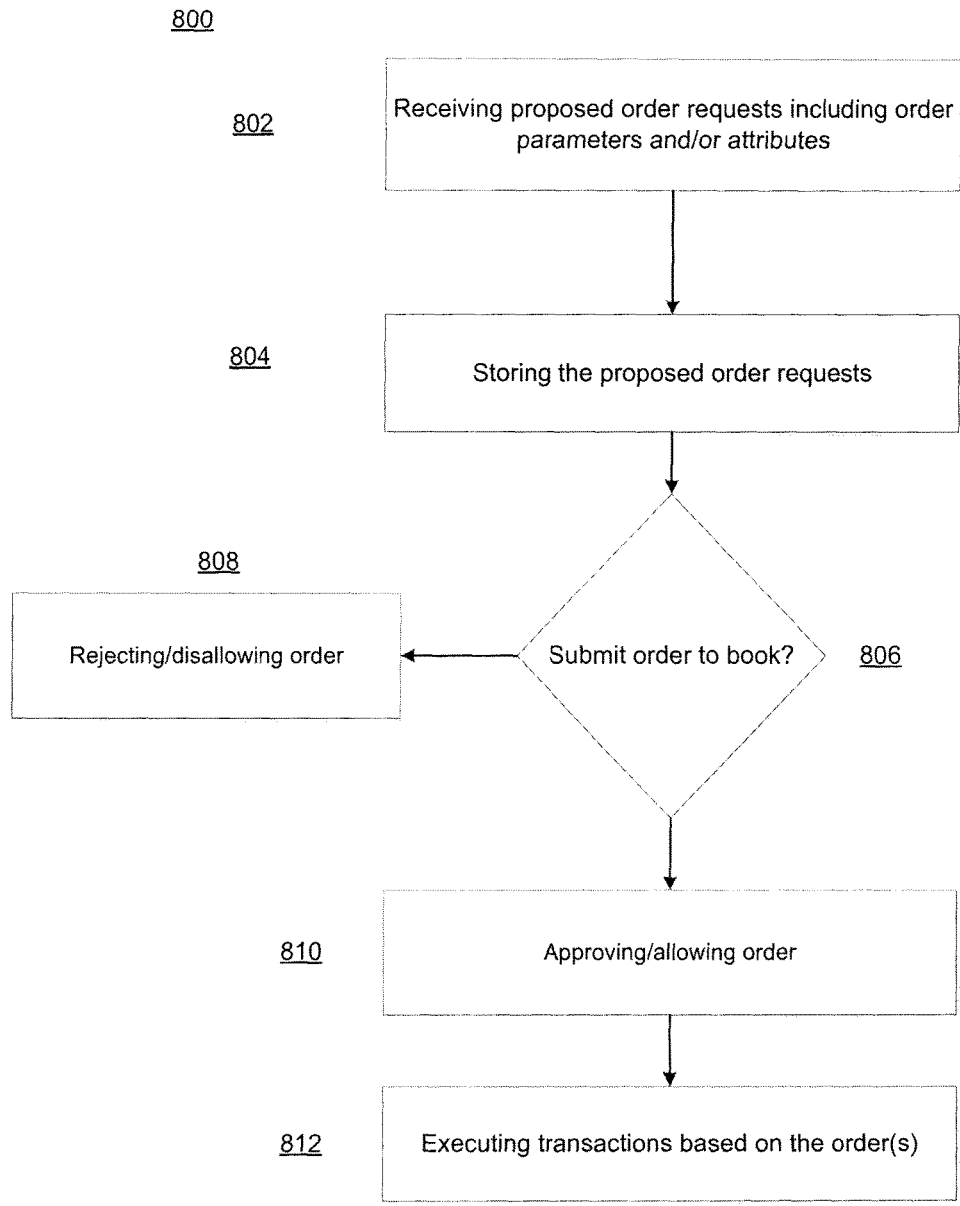
FIG. 19 illustrates an example method implemented by segmentation processor 370 to approve or deny order requests according to some embodiments described herein.

FIG. 19 illustrates an example method 800 implemented by segmentation processor 370 to approve or deny order requests.

Generally, at 802, segmentation processor 370 receives one or more order requests associated with parameters or attributes. At 804, the order requests may be stored via persistent data store 352. At 806, segmentation processor 370 determines whether the order(s) should be submitted to electronic networked trading venues 110. For example, segmentation processor 370 may check the attributes against segmentation tables stored in persistent data store 352 to determine whether the order(s) should be submitted to electronic books, networked trading venues, or markets 110. At 808, segmentation processor 370 may reject or disallow the order(s) from being submitted to electronic books, networked trading venues, or markets 110. At 810, segmentation processor 370 may approve or allow the order(s) from being submitted to electronic networked venues 110. The segmentation processor 370 may then submit the approved orders to electronic networked venues 110 to execute transactions at 812.

FIG. 20 illustrates an example of potential segmentation table by Trader Identifier which may govern order acceptance as active or passive within each order book.

FIG. 21 illustrates example parameters as tags and tag values for different order books. The chart identifies an example of a table that may be used where a specific tag and value (within the tag) is present for order acceptance validation purposes. For example, if Tag 7729 (e.g. SME regulatory marker) is present on an order then the value provided in the field may need to be equal to "0" otherwise the order may be rejected by the system.

As an illustrative and non-limiting example of segmentation processing, consider an order submitted, via market participant system 300, by market participant ID (e.g. TraderID) ABC123 (O1) to buy 100 shares of ZYZ at market price to a dark order book 112. That is, market participant ABC is submitting an active order to purchase 100 shares of ZYZ to the dark order book 112.

The order and parameters thereof is received by the system 320 via SOR 150 and immediately validated by the segmentation processor 370. That is, the segmentation processor 370 checks the order to determine if it can be passed on to the order book, which in this example is dark order book 112.

For this example, segmentation processor 370 identifies market participant ID ABC123 as allowed for active order submission to the dark order book 114 using the segmentation table shown in FIG. 20.

The system rejects the order (O1) back to market participant ABC123.

As another illustrative and non-limiting example of segmentation processing, consider an order submitted, via market participant system 300, by market participant ID ABC123 (O2) to buy 100 shares of ZYZ at market price to the lit order book 116. That is, market participant ABC is submitting an active order to purchase 100 shares of ZYZ to the lit order book.

The order is received by the system via SOR 150 and immediately validated by the segmentation processor 370. That is, segmentation processor 370 checks the order to determine if it can be passed on to the order book, which in this example is lit order book 116.

For this example, market participant ID ABC123 is identified as allowed for active order submission to the lit order book using the segmentation table shown in FIG. 20.

The system accepts the order (O2) and relays the order to the lit order book 116 for processing.

As a further illustrative and non-limiting example of segmentation processing, consider an order submitted, via market participant system 300, by market participant ID YYY554 (O3) to buy 100 shares of ZYZ at market price to the hybrid order book 114. That is, market participant YYY is submitting an active order to purchase 100 shares of ZYZ to the hybrid order book 114.

The order is received by the system via SOR 150 and immediately validated by the segmentation processor 370. That is, segmentation processor 370 checks the order to determine if it can be passed on to the order book, which in this example is hybrid order book 114.

For this example, market participant ID YYY554 is identified as disallowed for active order submission to the hybrid order book 114 using the segmentation table shown in FIG. 20.

The system rejects the order (O3) back to market participant YYY554.

This is an illustrative example and additional factors may be used to evaluate whether a market participant may submit an order, such as for example an order to trade ratio or cancellation to trade ratio.

Size-Up

In another aspect, embodiments described herein may offer a size-up option that may be extended to participants in a variety of markets, including dark books or venue(s) 112, as shown for example in FIG. 2. In accordance with this aspect of embodiments described herein, a participant in such a market, as for example a dealer who has posted a bid or offer, can be provided, either in all cases, randomly, or upon the occurrence of any desired trigger event, and/or at any suitable point in the trading process, whether it would like to consider committing to trading any additional quantities of a specific financial interest in which the trader has posted an order. In the event a trader indicates that it would be willing to consider such 'sizing up' of existing orders then such trader(s) may be provided with an opportunity to indicate a total volume he/she is willing to trade, and a maximum price at which he/she is willing to trade such volume, such as a maximum price differential with respect to NBBO and/or other bench mark, within which the trader (s) would be willing to trade. One or more suitable auctions and/or matching processes may then be conducted at a suitable time. In some embodiments, such sized-up trades occur at the midpoint of NBBO, so as to allow for, or support, price movement between indications of interest, response, and execution. Size-up features may be implemented in an automated way using control logic to generate and respond to size-up requests.

Size-up requests may be generated by networked venue(s) 110, 112, etc., and communicated to eligible market participants in any suitable manner, including for example preformatted text messages; responses can as mentioned include both maximum size-up volumes and desired price terms. Indications of interest or acceptance in such options can be binding, such that auctions or other transaction matchings may be conducted conclusively.

Size-up options in accordance with such aspect(s) of embodiments described herein offer a number of advantages. For example, in order to avoid intelligence gathering by market participants who are attempting to influence or manipulate markets, ratios of expression of initial interest to actual participation may be monitored, and market participants who too frequently express interest but ultimately do not participate may be omitted from corresponding communications lists and/or otherwise barred from participation.

Private Equity Financial Interests

In accordance with an aspect, embodiments described herein relate to methods, systems, products, platforms, computer readable instructions, and so on, useful for helping business entities to accomplish activities such as financing, issuing and trading financial interests, reporting, and other processes, which can have significant effects upon the viability of affected entities, and thus the holding and transfer of wealth, with significant practical consequences for those involved.

Aspects embodiments described herein relate to the creation, holding, transfer, financing and/or administration of financial interests, business entities, growth and development, and so on. Aspects of such creation, holding, offering, trading, transfer, and/or administration may be subject to regulation by governmental and other agencies. The platform may provide a venue for primary offerings and secondary trading (e.g. auction, bulletin board).

Developments in the growth, funding, and development of business entities, including seeking and matching of investors or experts with business entities, and trading of related financial interests, have created opportunities for development in the ways in which such parties and businesses are identified and served.

Accordingly, embodiments described herein may provide issuers, and/or prospective issuers, of financial instruments with the ability to offer and/or trade, and/or otherwise make various forms of financial instruments available to market participants and intermediaries, using various combinations of data visibility and access, order books, trading books, alternative trading systems, exchanges and/or other marketplaces or networked venues, and/or various types and/or categories thereof (which may be referred to herein as networked venues), selectively and/or simultaneously; or to seek and/or acquire various forms of funding through various forms of debt and/or equity issues using such electronic services and venues, and/or types and/or categories of venues.

Auctions, such as Dutch auctions, and/or other mechanisms may be employed in matching market participants buying and selling orders; or to otherwise make financial instruments available on various networked venues. Disclosure and other procedures associated with trading, listing, offering, and/or trading of financial instruments on networked venues may also be managed on a common platform throughout the life cycle of the financial instruments.

Figure 22:
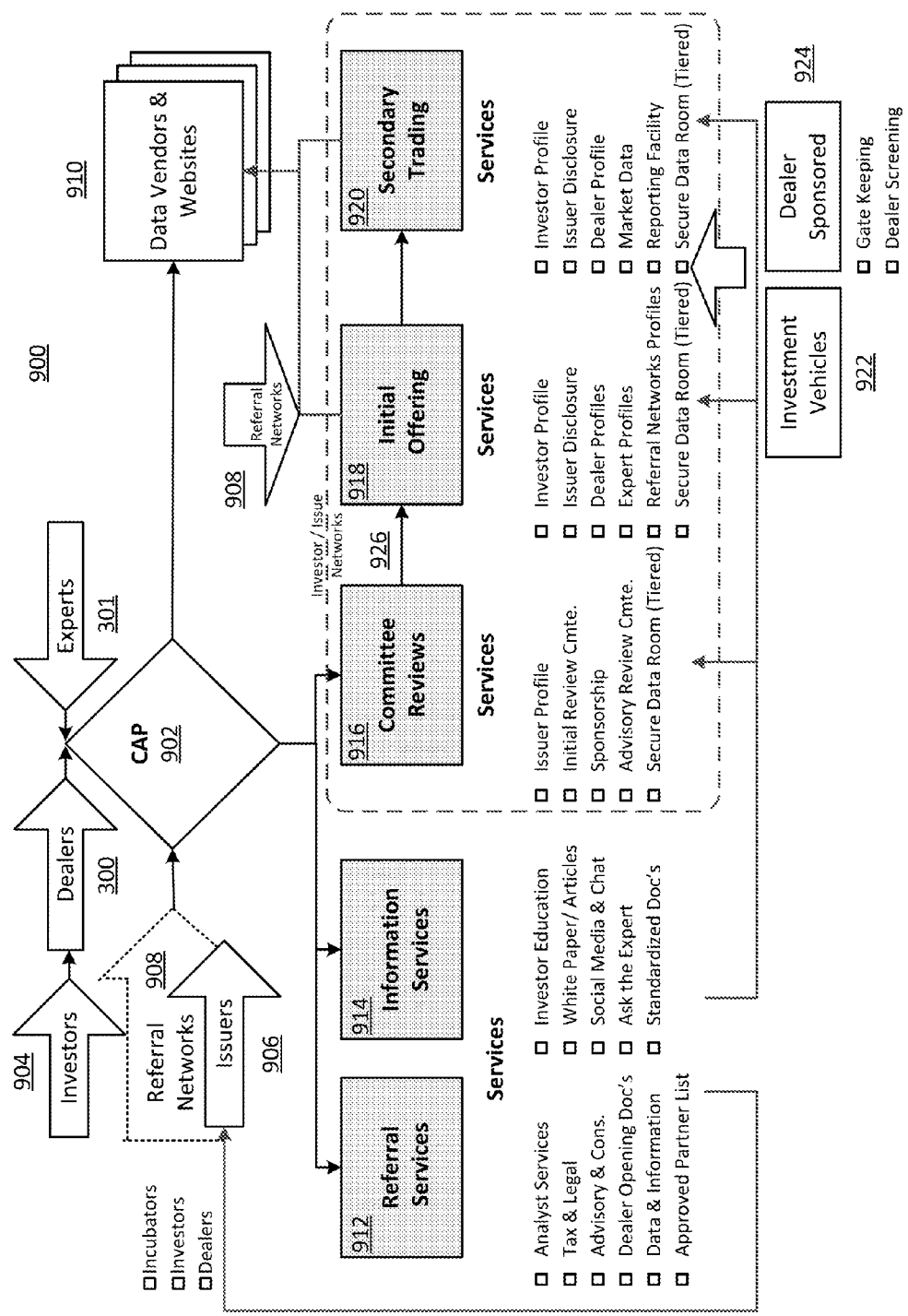
FIGS. 22 to 24 illustrate schematic diagrams for systems for private financing according to some embodiments described herein.

An example of both a process and a corresponding market participant system 300 for making business referrals, providing information services, and facilitating and/or accomplishing other business processes, including for example matching investors with issuers and/or other entities needing funding is shown in FIG. 22.

In the embodiment shown, investor(s) 904 can, by for example working through market participant(s) 300, access financing, issuing, reporting, trading, information, and other business functions by accessing a computer hardware Portal 902, and suitably-configured graphical user interfaces (GUIs), adapted to elicit input of data representing required and/or otherwise desired information, indicating the type(s) of services required and making any corresponding elections/options choices. Issuers 906 and referral networks 908 may also access portal 902. The Portal 902 may also be referred to as an exempt market portal.

As suggested by entities 904, 300, 906, 908 access to the system may be restricted to or through various class(es) of users, including for example any one or more of various type(s) of financial interest dealers or other market participants.

As shown in FIG. 22, examples of processes and services enabled and/or rendered otherwise more efficient by process (es) and system(s) according to embodiments described herein include matching, referral services 912; information services 914; committee review services 916; initial offering assistance services 918; and secondary market trading support services 920. Examples of features of such services enabled by embodiments described herein are shown in FIG. 22.

The Portal 902 and supporting web platform may support various business objectives, facilitate back-end processing, identify key user groups, and provide service offerings, interaction models between internal and external entities, information processing, data storage, dissemination and checkpoints for assessment, validation and appropriate approvals, among other features.

Illustrative examples of business objectives include (but are not limited to) providing a computer hardware platform where companies can access expertise from industry professionals through a sponsorship program (e.g. champion program), find investors to facilitate both the capital raising process and access to secondary market trading utilizing a centralized platform, increase visibility of the company, its ideas, products and services to qualified members of the investing public via various mediums (video, documents, other), have controlled access to services and information by providing tools to set reasonable restrictions on types of Investors, maximum/minimum amount of capital to be raised, frequency of trading, leverage standardized documentation to gain efficiency and save costs, communicate and share information with current and future Investors via various social media channels (e-mail campaigns, notifications or alerts, advertising space, others), and so on.

Illustrative examples of networking functionality include (but are not limited to) providing a network infrastructure where qualified investors can access information about investment opportunities available through the Portal 902, gain confidence and trust in investment opportunities as a result of oversight and governance through sponsorships and expert review committees, buy or sell financial interests of qualified companies through portal 902 secondary market 920, use different investment fund and trust structures to diversify risk, enable communication and social media interaction via public/private chat, posting-boards/forums, and other mediums between Investors and other market participants, and so on.

Illustrative examples of service functionality include (but are not limited to) provide a service infrastructure for eligible market participants 300 to expand access to and visibility of deals/companies/sectors in which market participants 300 participate, gain exposure to additional clients and investor community, leverage standardized dealer forms to create efficiency and save costs (account opening forms, Know Your Client (KYC), suitability reviews, others), visibility and opportunity to develop relationships and attract clients for other services provided by the market participants (underwriting, analyst coverage and research, others), facilitate sales in initial company offerings or subsequent financing rounds, or participate in secondary transactions on behalf of their investors, and so on.

Illustrative examples of referral and expert network functionality include (but are not limited to) allowing experts to share knowledge, expertise and personal/professional network access with prospective companies and investors, certification supports or recommendations for companies ready to move to next stage. Key Partners include approved Incubators, accelerators, hubs or other communities. Services Providers include approved legal, marketing, consulting, accounting/tax advice, others, and License services on white label basis, and so on.

Some or all of the above noted functionality and objectives may be achieved by the portal 902. The portal 902 may provide an accessible and intuitive web based platform to connect current and new initiatives to reduce costs and maximize opportunities. The portal 902 may provide a streamlined and electronic on-boarding process by leveraging standardized document formats. The portal 902 may provide applications that enable choice and control over what services are available to which parties. The portal 902 may provide integration with social networking tools to support information sharing, generate interest and efficiencies, and facilitate networking between companies, investors 904, experts 301 and market participants 300 (e.g. dealers, other market participants). The portal 902 may provide a secondary trading facility for capital raising groups to access liquidity and easily enter/exit investments as required.

A illustrative example of the target audience of the portal 902 may include: companies (e.g. companies with at least a certain amount of market cap for primary issuance, companies with at least a certain amount of market cap and greater than a certain number shareholders for secondary trading, and so on), investors 904 (e.g. qualified Investors and employees of private companies including Angel Investors, Venture Capitalists and Private Equity firms), market participants 300 (e.g. IIROC Members, exempt market dealers, other market participants), Incubators and Accelerators (e.g. established organizations that support start-ups and foster innovation), service providers (e.g. lawyers, accountants, tax advisors, consulting, marketing firms) and so on. These are illustrative examples only and other groups may be targeted.

An example of a process flow for companies may enable company onboarding with committee reviews. To become a participant on the portal 902, a company may confirm readiness and viability. The company may approach providers of the portal 902 directly or indirectly through other market participants (lawyers, dealers, experts, referral networks, others). If a company approaches providers of the portal 902 directly, they may be subject to one or more review committees (e.g. Initial and Advisory). It may be possible to skip the Initial Review process depending on whether or not the referral was through a Certified Partner or a Qualified Champion (approved expert). Committees may be comprised of panels of Experts 301 who will review all the material presented by the prospective company. To become a member of a panel, Experts 301 may submit their own profile through the portal and be subject to an approval and selection process based on a pre-defined set of criteria used to determine eligibility. One of the members of the Initial Review Committee may have to agree to champion a company in order to proceed to the Advisory Review Committee. A Company has the ability to select a Champion should there be more than one that expresses interest. A company can choose to reject a champion. A company may approach providers of the portal 902 with a pre-selected champion (subject to approval). When the champion determines the company is ready, the company may proceed to submit all required documents and required information to the Advisory Committee for review. The Advisory Committee may evaluate the offering to confirm that the information contained in the proposal meets benchmark standards (they will also evaluate that the terms of the proposed structure and the quality of information meets the standards). Should a company not succeed through the Advisory Committee, it may be possible to re-apply after a certain amount of time has passed.

Figure 25:
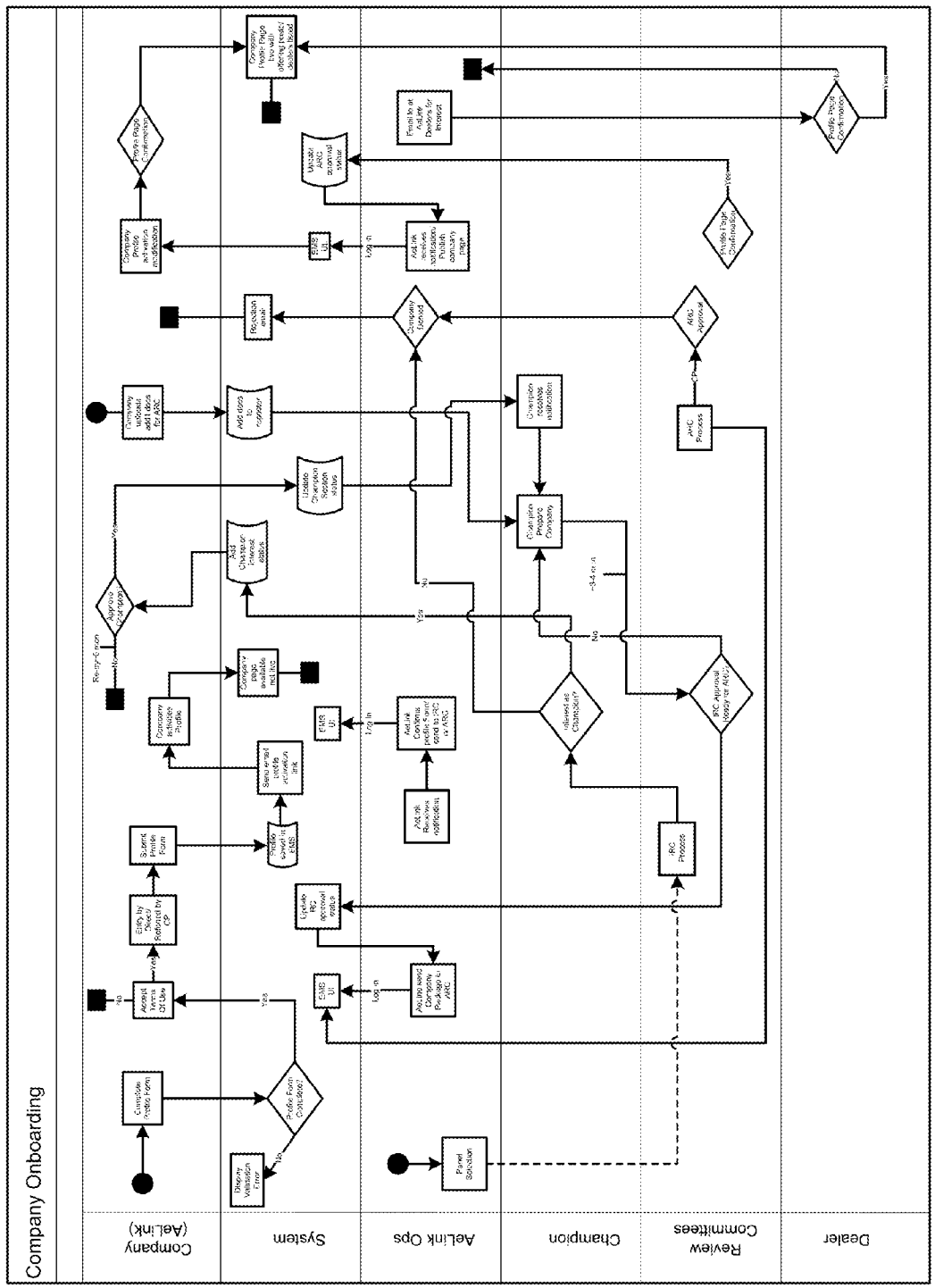
FIGS. 25 to 31 illustrate flow chart diagrams for private financing according to some embodiments described herein.

FIG. 25 provides an overview of a system 900 workflow which may be utilized in its entirety or in part to facilitate the on boarding of a company with a Private Equity Facility. System 900 may provide an interface with a complete company profile form. After receiving input data defining attributes of the company, system 900 may check to see if received input data completes company profile. If not, then system 900 may display a validation error. If the received input data completes company profile, then system 900 may display a terms of use for acceptance. If the terms of use are accepted, then system 900 enters the company and submits the input data for the company profile. The company may also be entered by referral of a certified practitioner. The company profile is stored in data storage device. System 900 may generate a notification or electronic message with a link to a network resource for to activate company profile. When the company activates their company profile the company page may be available by system 900. The company system may connect with system 900 using network.

There may be a panel selection flow involving an Independent Review Committee (IRC) process. A member of the IRC may be a champion for a company. A check is made to determine whether an IRC member is a champion for a company. If not, then the company may be denied entry to the system 900 and system 900 may generate and transmit a notification or electronic message indicating denial. If the IRC member is a champion for a company, then system may list the IRC member as an interested champion on the company profile. System 900 may generate and transmit a notification or electronic message indicating the champion for approval by the company prior to adding the champion to the company profile. System 900 may generate and transmit a notification or electronic message indicating approval by the company to the champion. The champion via a computing device may provide input data as company attributes for the company profile, and may prepare company for further review. System 900 checks for IRC approval of the company and determines whether the company is ready for review by ARC. If not, then the champion may continue to prepare company and provide input data for company profile. If the company is ready for review by ARC then system 900 updates company profile with IRC approval status and transmits electronic data package regarding attributes of the company from company profile data to the ARC. System 900 provides an interface displaying data package about company and starts the ARC process. System 900 checks for ARC approval. If not, then the company is denied entry into system. If so, then system 900 updates ARC approval status on company profile. The system 900 receives notification to publish the company page for review by other interested parties via provision of a user interface. System 900 generates and transmits a notification for company activation and company profile page. The profile page may include offerings and market participants 300. A company may also provide documents for ARC and system 900 may add the provided documents to the company profile stored in the data storage device. System 900 may transmit notification of the company to market participants 300 that may be interested in the company. In response to a market participant processor 300 request, system 900 may provide an interface for display company profile page to market participant processor 300. System 900 may confirm company profile contents and transmit electronic messages regarding the profile to IRC and ARC, or display profile data as part of an interface. Dealers are an illustrative and non-limiting example of market participants.

Another example process flow for companies may enable primary issuance. Once through the Initial and Advisory Review Committees, each approved company may be assigned a profile page on the portal 902 which may contain a promotional video or presentation uploaded by a portal 902 administrator based on approved content, provide required and additional details and documents that support their issuance, identify key personnel and other relevant information, track progress of capital raising on the portal 902 via a scale widget identifying confirmed/committed capital towards their issuance, identify previous funding rounds, committed Investors, and other information about the business and its management may also be posted for Investors to view. Certain sections (company description, offering and trading status) of the company profile page will be accessible to the general public, while other sections (funding details, documents, other investors, etc.) may be subject to receiving permission depending on user's status (companies and dealers may be able to control access). To raise capital, companies may execute standardized subscription agreements with Investors 904. A company can choose its own escrow agent, lawyer, others; alternatively, they can ask the portal 902 for a referral where required. A company can restrict the availability of its offering to specified market participants or make it available to any qualified market participant. A company can limit and control (accept/reject) investment participation to some or all of the qualified investors; they can set selection criteria for how other portal participants are introduced to the company's opportunities as well (e.g. only notify by e-mail to specific Investor types). Once a round of capital raising is complete, historical elements of financing rounds and investors involvement may be maintained for future reporting, both on the portal 902 and within the Issuer Management System 900.

A further example process flow for companies may enable secondary trading capabilities. The portal 902 may be configured with control logic to support different methods of secondary trading. Two illustrative example methods include bulletin board and crossing session. Bulletin board trading may include provision of a subsystem hosted in an execution facility that may be configured to display all current posts of buying or selling financial interests (submitted as IOI's) on the portal 902 posted by the market participant processor 300 on behalf of their clients. Crossing session (e.g. trade book, auction book) trading may include provision of an automated matching subsystem hosted leveraging exchange and trading capabilities, as described herein. The automated matching subsystem may be configured to accept and display orders entered by the market participant processor 300 via an order management application and use a simple auction process to execute trades.

Figure 23:
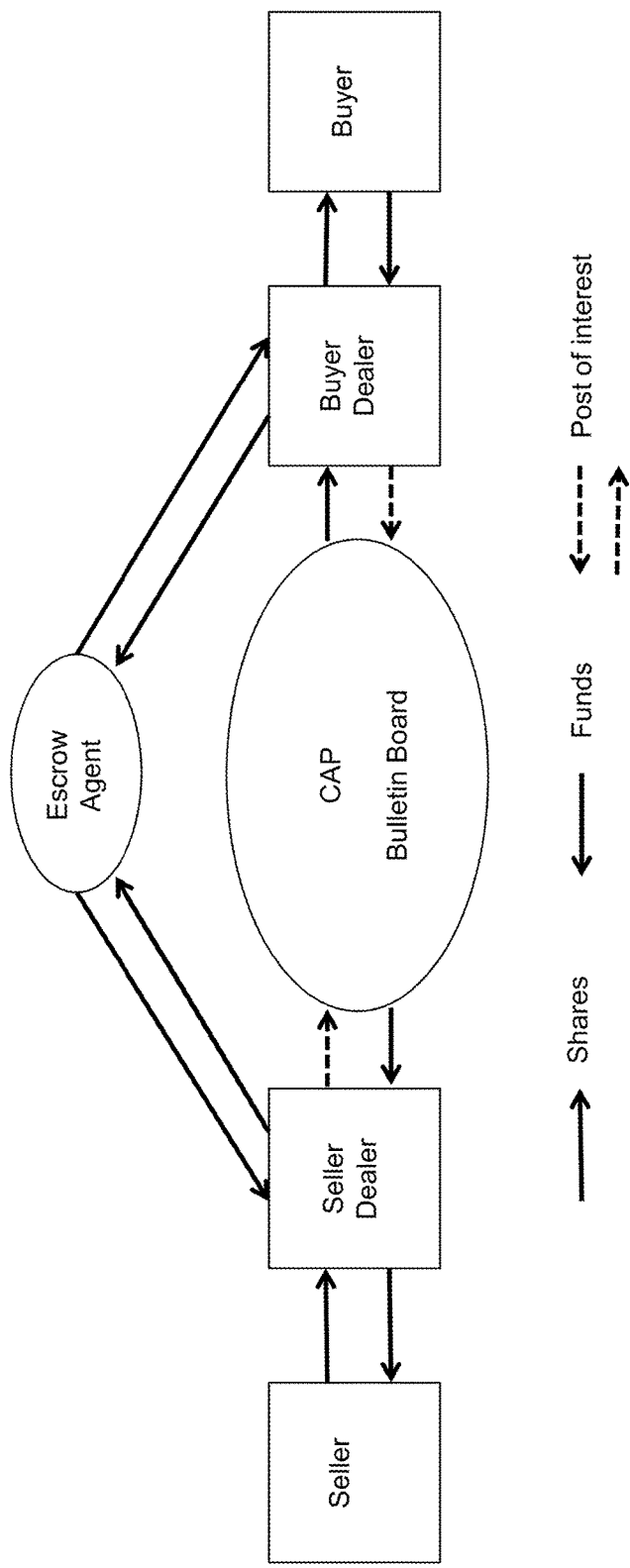

At a high level, the bulletin board workflow is represented in the diagram shown in FIG. 23.

Figure 24:
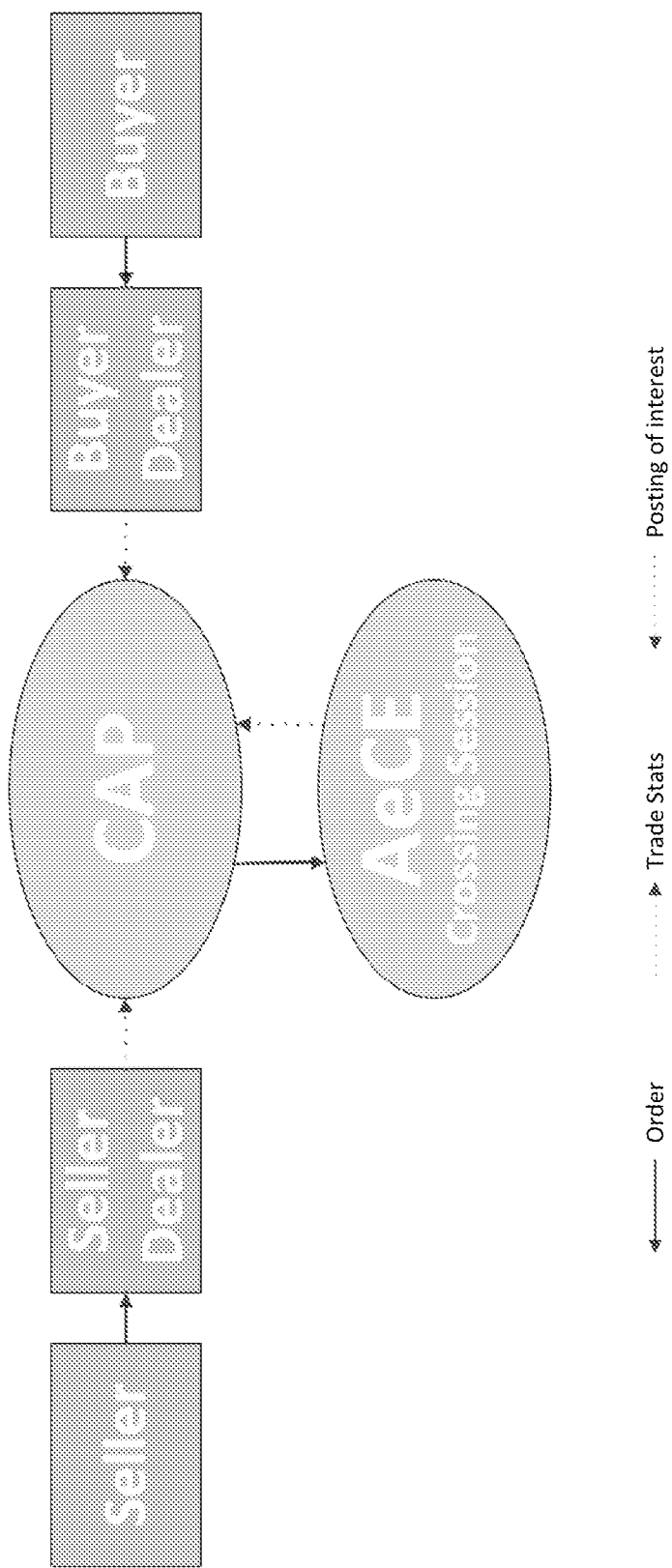

At a high level, the crossing session workflow is represented in the diagram shown in FIG. 24.

Bulletin board matching may be implemented using a bulletin board matching engine (e.g. specifically configured computer hardware). Updated information of the company (Profile and supporting documents) may be made available on the portal 902 to support trading through the electronic bulletin board. To participate in a trade, both sellers and buyers may submit interest through their own market participant processor 300. Market participant processor 300 may be used herein to refer to computer hardware that may be used by various market participants, or agents thereof. An example market participant processor 300 is a dealer processor 300. To make an offer, sellers may submit an order (with selling conditions including number of shares and price) via the portal 902 to his/her own market participant processor 300 for potential matching opportunity. Market participant may post the order on the portal 902 electronic bulletin board. Buyer may express interest using the portal 902 to own market participant processor 300. Once an agreement is reached and signed between the seller and buyer (via respective market participant processors 300), the exchange of funds and shares may be completed by the market participant processor 300 via an escrow/transfer agent and the company. Transaction may be completed at a price negotiated between seller and buyer. Market participants (e.g. dealers) may submit transaction details (price, volume, shareholder name, others) to the portal 302 via a standardized form (e.g. electronic form displayed via a GUI).

Crossing session matching (e.g. trading book, auction book) or other trade matching may be implemented using a crossing session matching engine (e.g. specifically configured computer hardware) or other matching engine. Updated information of the company (profile and supporting documents) may be made available. To participate in a trade, both sellers and buyers must submit interest through own market participant processor 300. Sellers and buyers may submit orders (number of shares and price) to portal 902 for potential matching opportunity. Bid/ask quotes may be entered into an auction. Trade matching may be announced and scheduled to take place at a set time (for example, once every third Friday). Prior to the trade matching taking place, an imbalance-like message may be disseminated informing all involved participants of the imbalance and/or interest participating in the trade matching (e.g. sent day before or on the day of an auction). For example, using a crossing session engine, the orders may be sent by the portal 902 to the crossing session engine for electronic matching at the scheduled match time. The crossing session engine may disseminate transaction details (price, volume, shareholder name, others) to portal 902 who will provide to its participants.

An example process flow for investors 904 includes accredited investor on-boarding and profile management. Investors 904 may be able to initiate the registration process through the portal by completing standardized forms which may be sent to the assigned market participant for review (the market participant may require the Investor to execute other forms required of its clients). Once the market participant approves the 'profile', the market participant may notify portal 902 for the final approval which may create the Investor's username and profile within the portal 902 (may take up to two (2) days). Each investor may be assigned a private profile page as part of the registration process which may contain private information, including biographical information, financial details, investment profiles, areas of interest, confirmation of accredited Investor status for verification by the market participant processor 300, personal information is only available to market participants 300 or companies as permitted by Investors 904. Investors 904 may have the ability to "follow" and electronically interact with other registered Investors via chat, posting boards/forums, likes/dislikes on companies, thumbs up/down on articles, star rankings of champions by Investors 904, etc. Market participant processor 300 may have access to all of its client profiles. General public users (Non-Registered) may not be able to see investors 904 profile pages on the portal (this capability is limited to permitted market participants 300 and companies). Investors 904 may have the ability to browse through various company profiles as well as visibility into current offerings. Investors 904 (e.g. accredited, eligible, qualified) may receive access to special information about specific companies. Companies or market participants 300 may be granted access to secure data rooms allowing them to share confidential information for a limited or unlimited period of time with each other and investors 904. Investor 904 may be able to engage any market participant processor 300 who is interested in the deal and open an account (e.g. current market participant processor 300 may not be involved in a transaction of interest) if he is not already a client. Alternatively, investors 904 use their own market participant processor 300 to inquire about a particular investment opportunity if the market participant (e.g. dealer) has become a participant.

Figure 26:
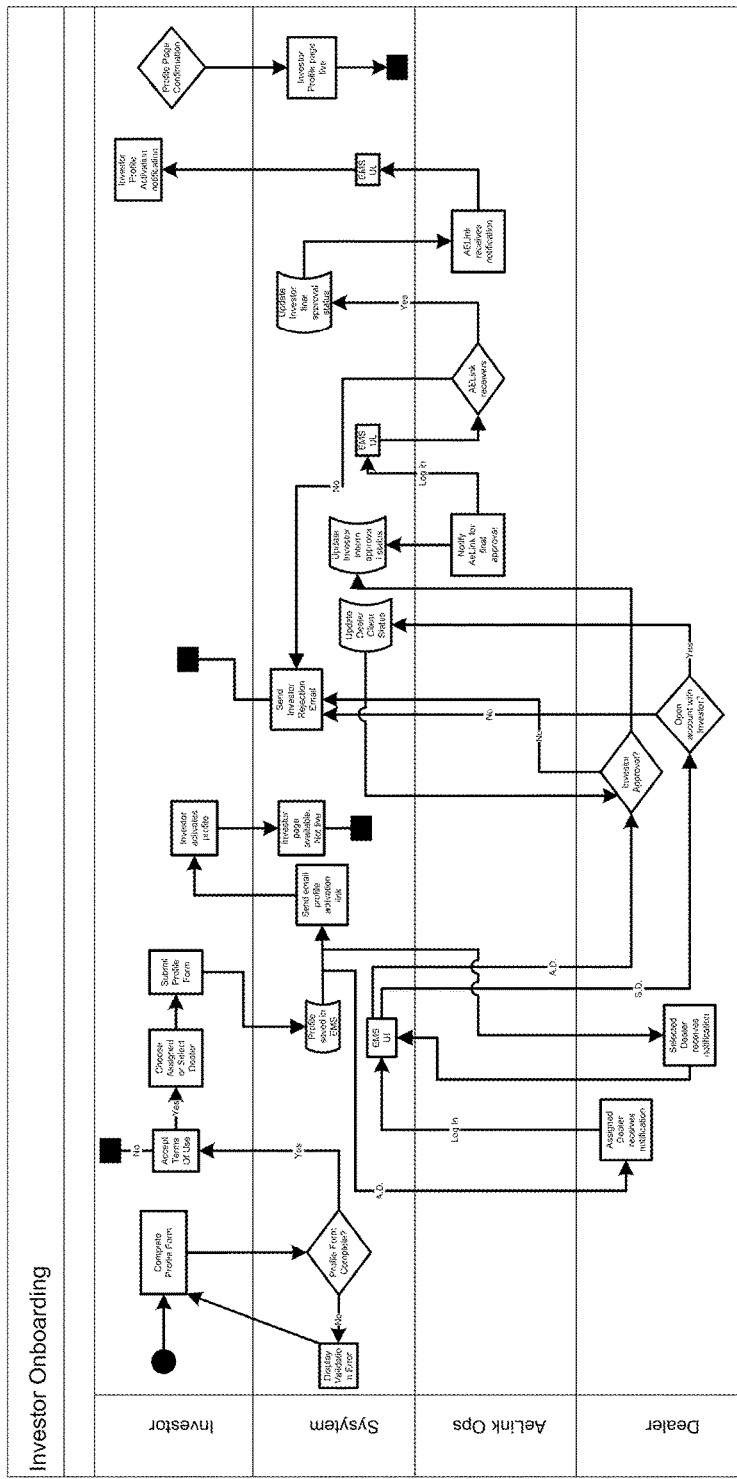

FIG. 26 provides an overview of a system 900 workflow which may be utilized in its entirety or in part to facilitate the on boarding of an investor 904 with a portal 902. System 900 may provide an interface with an investor profile form. After receiving input data defining attributes of the investor, system 900 may check to see if received input data completes investor profile. If not, then system 900 may display a validation error. If the received input data completes investor profile, then system 900 may display a terms of use for acceptance. If the terms of use are accepted, then system 900 provides an interface for selecting market participants 300 (either assigned or selected) and system 900 enters the investor and submits the input data for the investor profile, including market participant processor 300 information. The investor profile is stored in data storage device. System 900 may generate a notification or electronic message to market participant processor 300 indicating selection by investor 904. System 900 may generate a notification or electronic message with a link to a network resource to activate investor profile. When the investor activates their investor profile the investor page may be available by system 900. The investor system 904 may connect with system 900 using network. System 900 may generate a notification or electronic message to market participant(s) 300 associated with investor 904. For example, the market participant processor 300 may log into system 900 via an interface. System 900 may check to see if an account is open by market participant processor 300 for investor 904. If not, system 900 may generate a notification or electronic message of rejection to investor 904 of selected market participant processor 300. If so, then system 900 may update investor profile with market participant client status. System 900 may generate a notification or electronic message to investor 904 for approval of market participant client status. If system 900 receives approval from investor 904 then system 900 updates investor approval status in investor profile. System may generate final approval notifications for display via interface and update final approval status in investor profile. System 900 may activate the investor profile and may generate a notification or electronic message indicating activation of the profile page for confirmation by the investor 904.

A further example process flow for investors 904 includes investing. When interested in making an investment in a deal, investors 904 may communicate interest in the offering using a private message via the portal (email, or some other communication medium) which will be forwarded via market participant processor 300 (investor 904 may not communicate interest without an assignment to an agent, dealer or other market participant). Primary subscriptions and all initial company/investor/dealer/market participant interactions will be captured via portal 902 for various reporting needs. When a transaction is complete, companies and market participants 300 may be required to submit transaction details (price, volume, shareholder name, others) to portal 902 via a standardized form/template. Specified transaction details will be posted online within the Investors private profile page (deal history and previous transactions). Specified transaction details may be posted on the company profile page indicating who their shareholders are, if appropriate (criteria for posting may be established), the price at which financial interests last traded, and others. Unique investment and trust vehicles may be available giving Investors diversification options to help minimize risk. By utilizing investment funds or trusts, an individual investor can make smaller, and more widespread investments into multiple deals thereby providing greater diversification. Investors will have escrow settlement arrangements facilitated through the company and their respective market participants 300.

An example process flow for market participants 300 (e.g. dealer) onboarding and profile management. To register a market participant processor 300 on the portal 902, appropriate forms (profile) may be received and approved. Once accepted, a market participant processor 300 may provide or transmit (via transmitter) a profile and other required materials to be displayed on the portal after approval by a portal 902 administrator. Each market participant processor 300 may receive a profile page on the portal with general information and services it offers. The profile page may also include a history of previously completed deals, promotional videos or presentations which potential companies and investors will be able to access, descriptions of additional resources including current deals, analyst coverage, areas and industries of interest, etc. Market participants 300 may be responsible for know your client (KYC) verification, including confirming qualified Investor status and various suitability reviews. Market participants may have an option to use common client account opening documentation provided by portal 902. Market participants may select which deals are currently available on the portal 902 they are willing to participate in (individual deals). Approved market participants may have access to all of its client profiles and may receive access to non-client investor profiles if a portal 902 investor 904 has granted permission.

Figure 27:
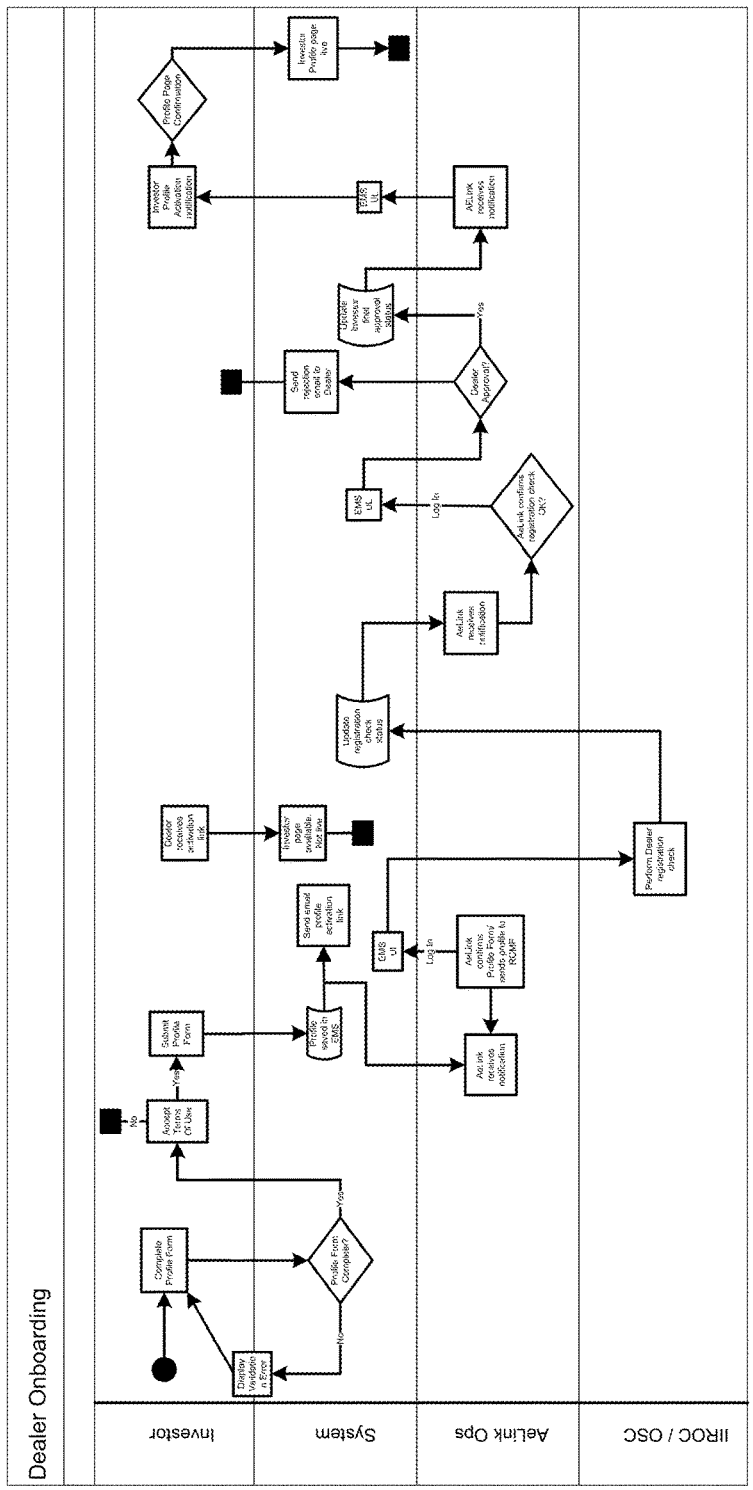

FIG. 27 provides an overview of a system 900 workflow which may be utilized in its entirety or in part to facilitate the on boarding of a market participant processor 300 with a private equity facility. For example, system 900 may provide an interface with an market participant profile form. After receiving input data defining attributes of the market participant, system 900 may check to see if received input data completes market participant profile. If not, then the system 900 may display a validation error. If the received input data completes market participant profile, then the system 900 may display a terms of use for acceptance. If the terms of use are accepted, then the system 900 enters the market participant and submits the input data for the market participant profile, including market participant processor 300 attributes. The investor profile is stored in data storage device. System 900 may generate a notification or electronic message with a link to a network resource to activate market participant profile. When the market participant activates their profile the market participant page may be available by the system 900. The market participant system 300 may connect with system 900 using network. System 900 may generate a notification or electronic message regarding market participant processor 300. System 900 may integrate with regulatory systems to confirm market participant processor 300 profile data and perform market participant processor 300 registration check. System 900 updates registration check status in profile associated with market participant processor 300. System 900 confirms that the registration check indicates that the market participant processor 300 is validated or verified. The market participant processor 300 may log into system 900 via an interface. System 900 may generate a notification or electronic message for approval of market participant approval status. If market participant status is approved then system 900 updates market participant approval status in profile. System 900 may generate a notification or electronic message to market participant processor 300 regarding rejection if the market participant processor 300 is not approved. System may generate final approval notifications for display via interface and update final approval status in market participant profile. System 900 may activate the market participant profile and may generate a notification or electronic message indicating activation of the profile page for confirmation by the market participant 300.

An example process flow for experts 301 includes expert onboarding. An expert's 301 main purpose is to provide knowledge and a network to support early stage companies. Experts 301 may submit a profile using the portal 902 for approval by an administrator which may be based on a set of criteria covering education, expertise, sector, experience (including investment experience), accredited investor status and previous history of participation on portal 902. Once approved, each expert may receive a profile page on the portal with general information and services. The profile page may include specific information including history and statistics of activity on the portal 902 or elsewhere, tracking of an expert's champion success rate, contact information, articles, experts' speeches, presentations (highlighting industry, people, experience), and so on. Experts may provide advice and expertise to companies in various areas including legal, marketing, accounting, technology, and HR (incl. recruitment and compensation packages). Eligibility of an expert to be a champion may be based on alignment of expertise and willingness of the champion to make a commitment to the company. Champions may be obligated to provide time and advice to their companies from the Initial Review Committee process until the offering is completed or acceptance for secondary trading is approved. Champions, participating during the committee review process, may not be obligated to provide advice after the company does its initial offering or is approved for secondary trading. Champions may have an option to invest in the company, but may not be obligated. If the relationship between the company and champion fails, exit interviews may be conducted to determine the reasoning and if any subsequent action is required (i.e. Expert status review, future company eligibility, others).

Figure 28:
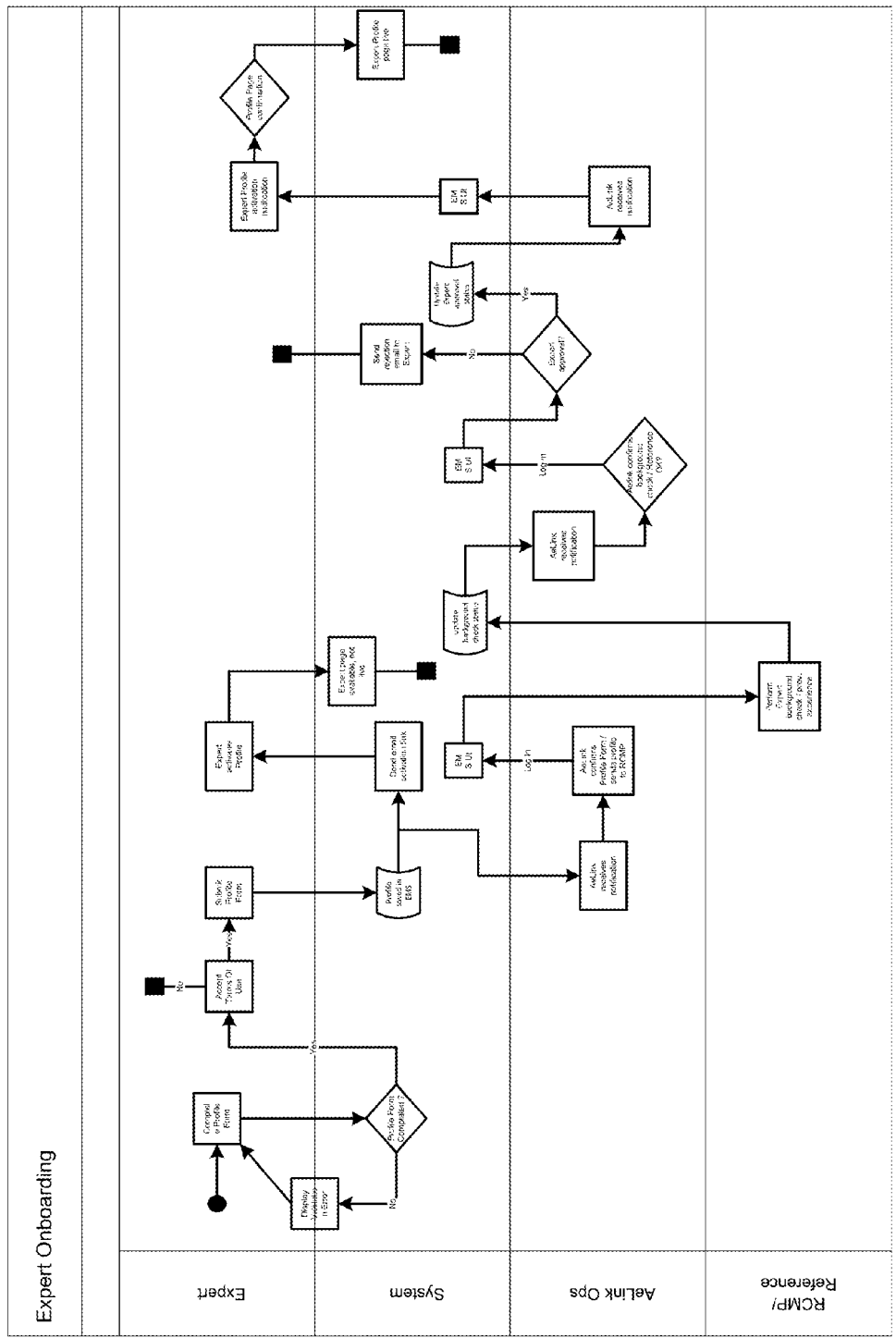

FIG. 28 provides an overview of a system 900 workflow which may be utilized in its entirety or in part to facilitate the on boarding of an expert 301 with a portal 902. System 900 may provide an interface with an expert profile form. After receiving input data defining attributes of the expert, system 900 may check to see if received input data completes expert profile. If not, then system 900 may display a validation error. If the received input data completes expert profile, then system 900 may display a terms of use for acceptance. If the terms of use are accepted, then system 900 enters the expert and submits the input data for the expert profile, including expert 301 attributes. The expert profile is stored in data storage device. System 900 may generate a notification or electronic message with a link to a network resource to activate expert profile. When the expert activates their market participant profile the market participant page may be available by system 900. The expert system 301 may connect with system 900 using network. System 900 may generate a notification or electronic message regarding expert 301. System 900 may integrate with systems to confirm expert 301 profile data and expert 301 background check. System 900 updates background check status in expert profile. System 900 confirms that the background check indicates that the expert is validated or verified. The expert 301 may log into system 900 via an interface. System 900 may generate a notification or electronic message for approval of expert approval status. If expert status is approved then system 900 updates expert approval status in expert profile. System 900 may generate a notification or electronic message to expert 301 regarding rejection if the expert 301 is not approved. System may generate final approval notifications for display via interface and update final approval status in expert profile. System 900 may activate the expert profile and may generate a notification or electronic message indicating activation of the profile page for confirmation by the expert 301.

Figure 29:
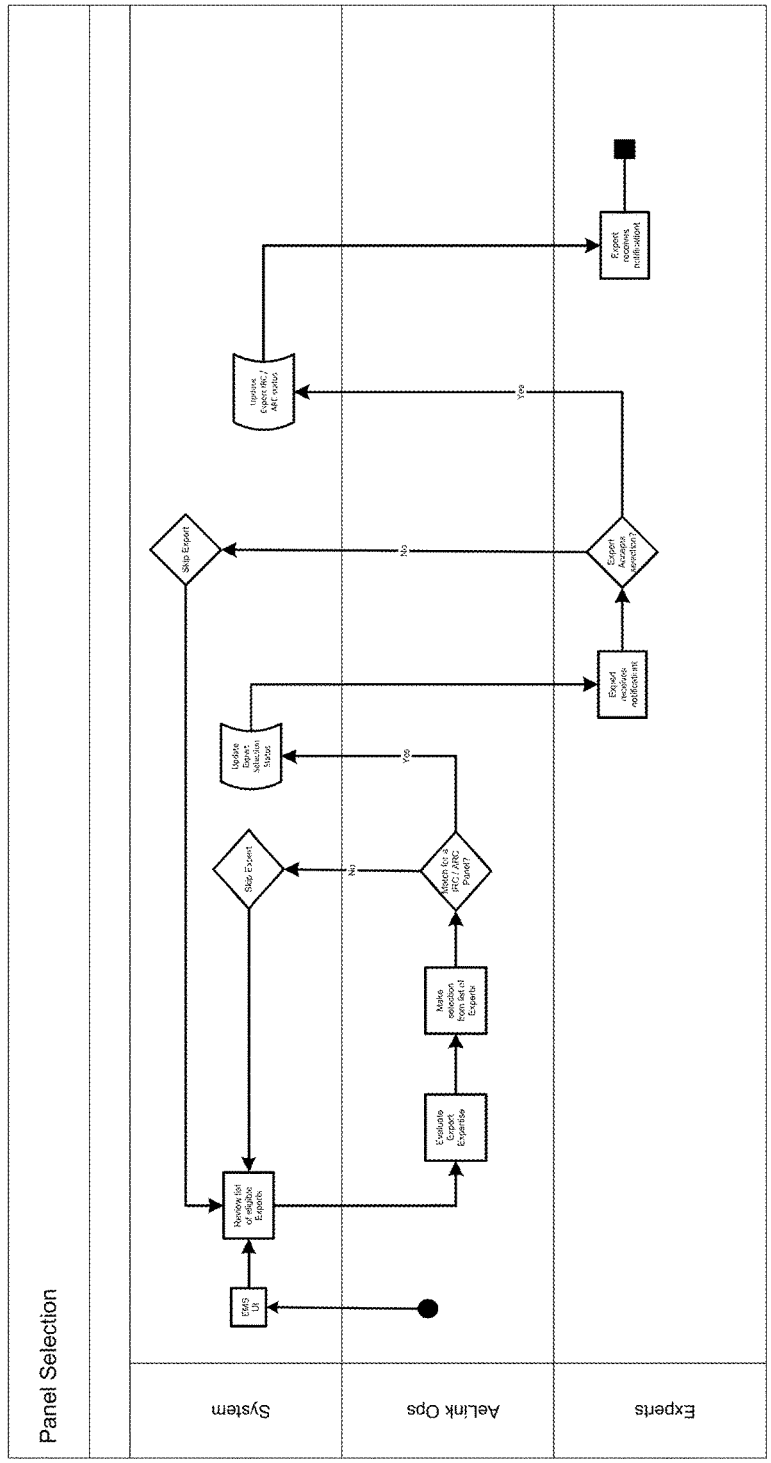

FIG. 29 provides an overview of a system 900 workflow which may be utilized in its entirety or in part to facilitate panel selection of experts 301 with a portal 902. System 900 may provide an interface with an list of eligible experts, and an interface for users to review and evaluate expert 301 expertise. System 900 receives selections of experts form the listing of eligible experts. For each selected expert, system 900 checks for a match to an IRC or ARC panel, if not then system 900 moves to another expert 301. If there is a match, then system 900 updates expert selection status in expert profile and generates and transmits notification to the expert 301 regarding selection on a panel. System 900 checks whether the expert 301 approves selection on a panel. If not, then system 900 moves to another expert 301. If expert 301 approves, then system 900 updates expert IRC/ARC status in expert profile. System 900 provides notification to expert 301 of updated status.

Figure 30:
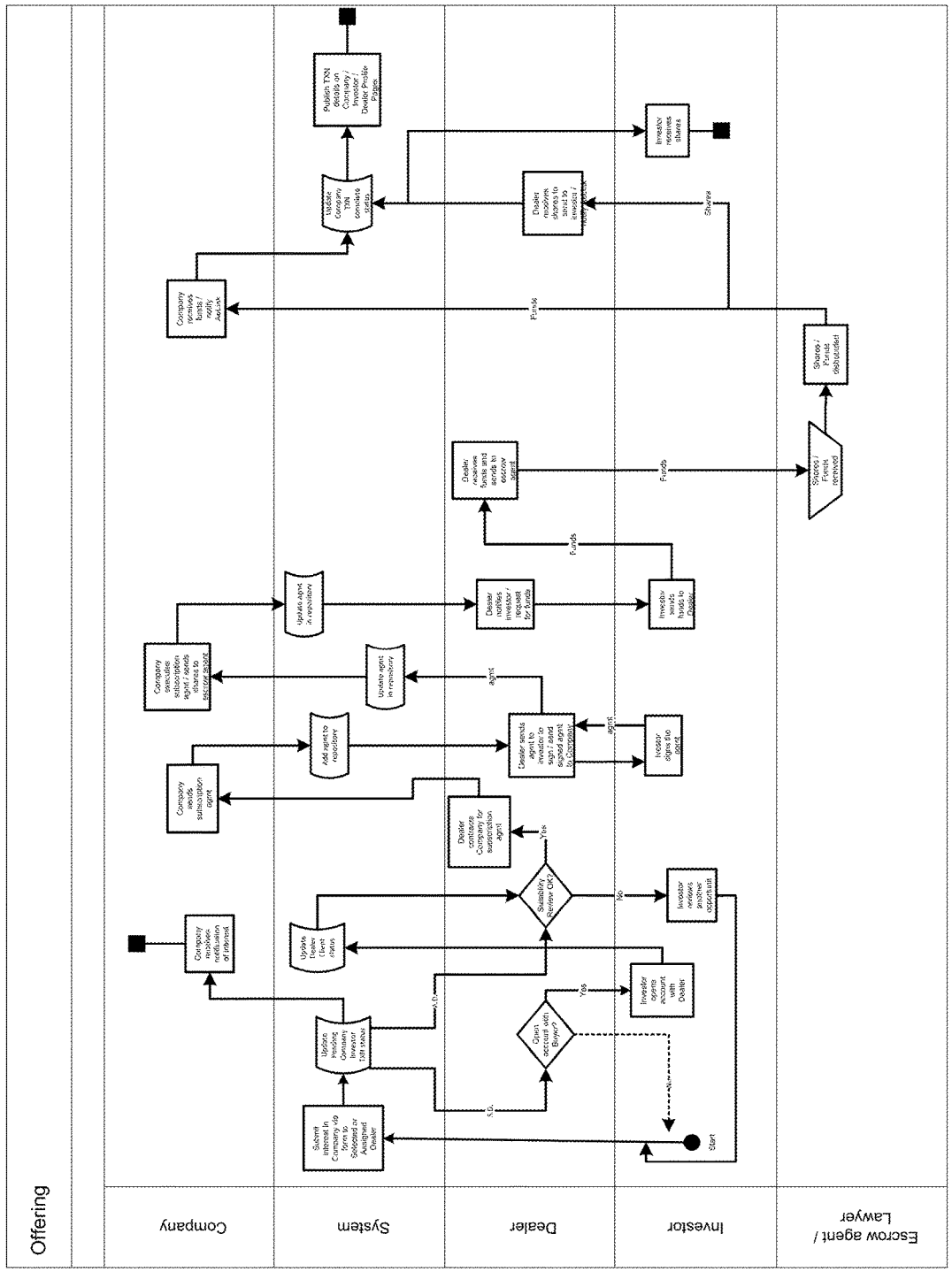

FIG. 30 provides an overview of a system 900 workflow which may be utilized in its entirety or in part to facilitate offerings with a portal 902. An investor 301 may submit an interest in company directly to system 900 or via a selected or assigned market participant processor 300. System 900 updates pending company and investor statuses in the corresponding profiles. System 900 generates and transmits a notification or electronic message to company system. System 900 checks to see if interested investor 904 would like to open an account with market participant processor 300. If no, then the request is not processed further. If so, then investor 904 opens an account with market participant processor 300 and system 900 updates market participant client status data for investor profile. System 900 provides an information interface for the company to market participant processor 300 and checks if market participant processor 300 is willing to participate in the offering and investor 904 is interested and eligible to participate in the offering. If not, then system 900 provides another company opportunity for market participant processor 300 and investor 904 to generate a suitable review. If the review is suitable and there is a decision to invest, system 900 provides a notification to company for subscription agreement, or provides the subscription agreement to market participant processor 300 if already available and stored in company profile. System 900 updates data storage device with received subscription agreements (electronic copies). Market participant processor 300 provides the subscription agreement to investor for execution, and system 900 stores an executed copy of the subscription agreement in data storage device. Company executes the subscription agreement and submits the subscription agreement and shares in escrow to agent. System 900 stores the executed copy of the subscription agreement in data storage device. Market participant processor 300 notifies investor 904 of executed subscription agreement and shares and requests funds. Investor 904 transfers funds to market participant processor 300 and market participant sends the funds to an escrow agent. The escrow agent receives both the shares and the funds, which are distributed to the investor 904 and the company, electronically for example, or otherwise. Company receives the funds and transmits a notification to system 900. Market participant processor 300 and investor 904 receives shares and transmits a notification to system 900. System 900 updates transaction status of company in profile of company and investor. System 900 adds transaction details to company page and investor page. A market participant processor 300 may subscribe on behalf of an investor. Certified partners (e.g. incubators, accelerators) may not need to undergo review process.

Figure 31:
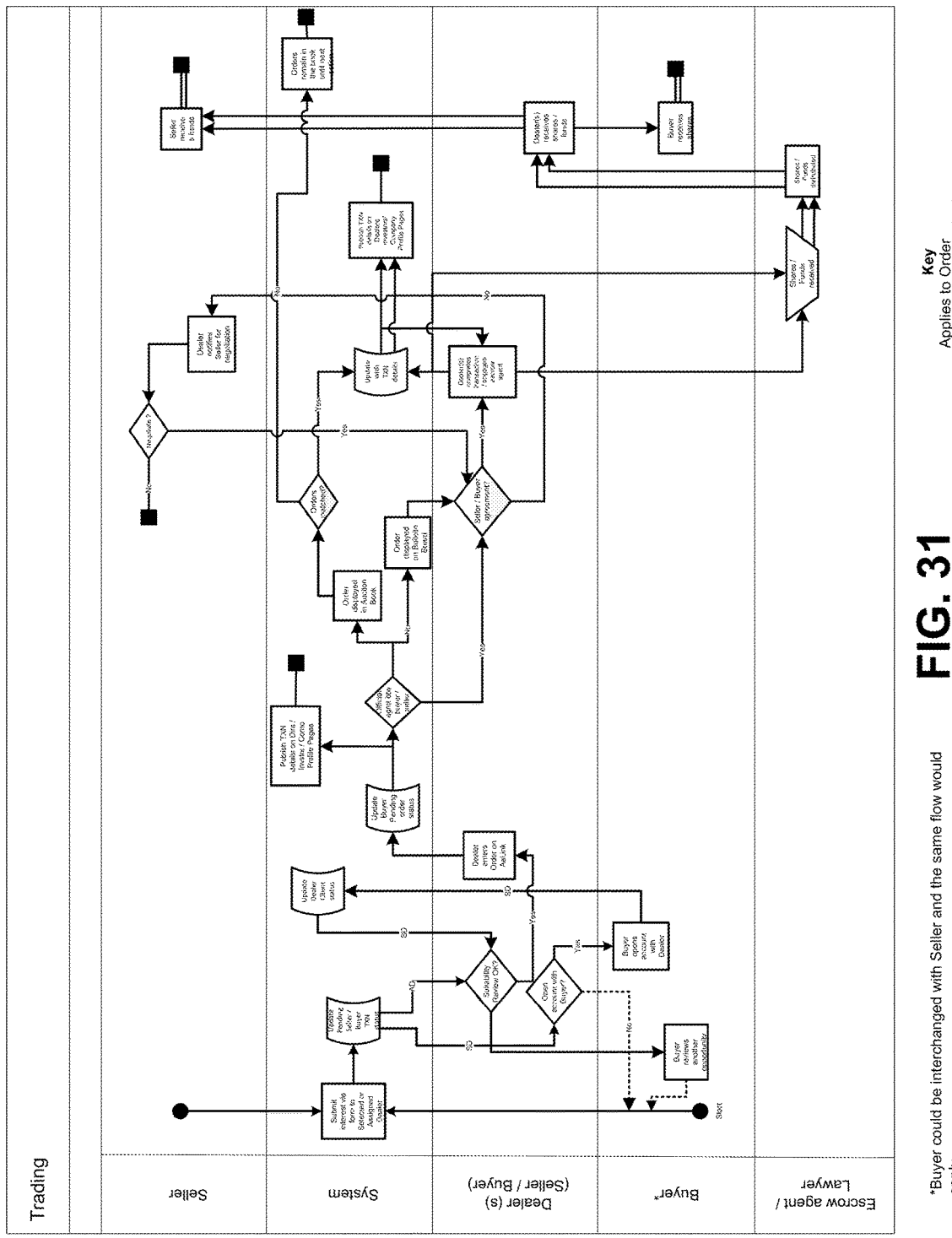

FIG. 31 provides an overview of a system 900 workflow which may be utilized in its entirety or in part to facilitate trading through a portal 902. A seller or buyer 906 may submit an interest in company directly to system 900 or via a selected or assigned market participant processor 300. System 900 updates pending company and seller transaction status in the corresponding profiles. System 900 provides a review interface for the seller to market participant processor 300 to see relevant information and checks if market participant via processor 300 (and indirectly an eligible investor 904 who is a client of the market participant) is willing and eligible to participate in the trade. If not, then system 900 provides another trading opportunity for market participant processor 300 and investor 904 to review. If the review is suitable, system 900 receives an order from market participant processor 300 and updates pending buyer order status on profile or market participant processor 300 or investor 904. System 900 adds transaction details to company page and investor page. System 900 determines if there a market agreement between buyer and seller. If no, then the order is displayed on a bulletin board or matched. If there is a market agreement then system 900 checks for additional buyer and seller agreements. If so, then transaction moves to completion and system 900 engages escrow or other designated agent. System 900 updates profile with transaction details and adds transaction details to company page and investor page. If there is no agreement between buyer and seller, then market participant processor 300 notifies seller for negotiation. Negotiation process may result in agreement between buyer and seller, otherwise negotiation may continue. Seller submits shares in escrow to agent. Investor 904 transfers funds to market participant processor 300 and market participant sends the funds to an escrow or other designated agent. The escrow or other designated agent receives both the shares and the funds, which are distributed to the investor 904 and the seller, electronically for example, or otherwise. Company receives the funds and transmits a notification to system 900. Market participant processor 300 and investor 904 receives shares and transmits a notification to system 900. System 900 updates transaction status of company in profile of company and investor. The agreement may be determined automatically through matching process. If not matched, then the order may remain in the book until the next auction.

An example process flow for referral networks 908 includes providing services to companies and identification of companies ready to do offerings or have access to secondary market. To create a shorter review and issuance process for companies, a company may be able to skip the Initial Review Committee processes as a result of a referral via a Certified Partner (Incubators, Accelerators, Hubs, others who have been reviewed and/or otherwise approved). By working with Certified Partners, there may be an effective quality standardization that could attract more companies to the portal 902. Three illustrative example options include (1) provision of infrastructure (technology/software platform) to certified partners, which process and do initial offering while leveraging the portal 902 to do secondary market trading; (2) creating a set of standards for certified partners to apply to companies who want to do an initial offering on the portal 902 (for example, standards are met while working with incubators) and reduces time to do offering or be admitted for secondary trading because review time may be shortened, for example; (3) sharing of information through disclosure of Investors 904 and Company profiles on portal 902 to provide access to market participants 300 and market participant's clients.

The portal 902 and components interacting therewith may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network (which may be referred to as "cloud computing").

The portal 902 may reside on one or more networked computing devices, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

The portal 902 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The portal 902 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The portal 902 may include one or more input devices, such as a keyboard, mouse, camera, touch screen and a microphone, and may also include one or more output devices such as a display screen and a speaker. The portal 902 has network interfaces in order to enable communication between system 900 components, to access and connect to network resources, to serve an application and other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more portal 902 distributed over a geographic area and connected via a network. The portal 902 is operable to register and authenticate users (using a login, unique identifier, and password for example) prior to providing access to applications, a local network, network resources, services, other networks and network security devices. The portal 902 may be different types of devices and may serve one user or multiple users.

The portal 902 may be configured with control logic for interfacing with market participant processor(s) 300, expert systems 301 and systems of other market participants (e.g. issuers, investors) to receive electromagnetic signals defining data sets representing service requests, company data, proposed order requests to execute transactions in one or more financial interests, and so on. The portal 902 is configured with control logic to process the service requests, company data, proposed order requests to execute transactions in one or more financial interests, and so on.

The portal 902 connects with or integrates a persistent data store (e.g. data storage device) for storing the service requests, company data, proposed order requests to execute transactions in one or more financial interests, along with attributes and parameters relating thereto, as described herein.

The portal 902 is configured to integrate and connect with the Information Services and Referrals utilities 914, 912 to exchange electromagnetic signals defining data sets representing service requests and responses thereto.

The Information Services and Referrals utilities 914, 912 may be configured to provide standardized legal documentation and standardized forms to facilitate process simplification. Examples include non-disclosure agreements, secure data room access agreements, shareholder agreements, escrow arrangements, and so on.

The Information Services and Referrals utilities 914, 912 may be configured to facilitate market participant account opening and company disclosure documents. This may involve the provisions of common forms to creating efficiencies for market participants 300. Examples include know your client suitability reviews, client account opening forms, accredited investor verification forms. This may also involve establishing basic disclosure requirements for an initial offering or to qualify for secondary trading.

The Information Services and Referrals utilities 914, 912 may be configured to provide analyst services. This may involve providing access to analyst coverage and reports which may include overview of a company's product, market and competitive analysis, sales and revenue forecasts, management profiles, discounted cash flow analysis, summary of prior financings, risk analysis, others.

The Information Services and Referrals utilities 914, 912 may be configured to provide professional services. This may involve providing referrals to trained and experienced Experts in matters related to portal 902 including primary issuance and transactions, various consulting/professional services including, tax, accounting, legal, marketing, human resources, consulting services, and so on.

The Information Services and Referrals utilities 914, 912 may be configured to provide education services. This may involve providing information regarding portal 902, services, associated risks, the role of market participants 300, general Q&A/FAQ information, market sizing, deal history and success metrics. This may also involve posting articles and white papers on various Companies, products, sectors, investment topics, and posting webinars on various investment topics.

The portal 902 may also provide an electronic Secure Data Room. The electronic Secure Data Room offer a web based platform supporting controlled and secure document information disclosure and access. The electronic Secure Data Room may allow for uploading and sharing of private information to authorized market participants via fine-grained restricted/controlled account entitlements and permissions (such as historical financial statements, forecasts and projections, other confidential documents). The electronic Secure Data Room may provide proper authentication for accessing the secure area and information will be required; service could be managed by the Company directly, or by an administrator. All documents may encrypted, watermarked, logged and can be password-protected; optionally, documents can be forced to remain on a secure server (i.e. not downloadable), and general access can be set to expire after a certain period of time The portal 902 may also provide market data for secondary market trading via the Secondary Trading Utility 920. The portal 902 may have the capability to disseminate market data for display as required on the portal 902 for investor 904 or other market participant use, or through an ITCH-like protocol making information available to market data vendors (i.e. Bloomberg, Thomson Reuters, others). Relevant investment or trading information may be published to facilitate disclosure of investor and trading information (either through IOI's or auction book orders) including high level topic summaries, executed trades/deals between Investors 904. Relevant post-trade historical information may be displayed on the Company's main page including past transaction data, historical pricing and bid/ask data.

The portal 902 may also provide a reporting facility. Periodic reports may be generated to provide insight into overall activity on portal 902. Customized reports may be created tailored to each group of market participants i.e. investors, companies, dealers, experts, others.

The portal 902 may also provide social media and networking functionality. The Portal 902 may utilize social media tools to identify and share investment opportunities, performance/selection history of market participants, and identification of experts (ranking champions by investors). The portal 902 may create social/educational events or annual conferences relevant to the industry to facilitate networking. The portal 902 may create chat rooms or forums allowing market participants to interact with other market participant, and operators if needed. The portal 902 may provide e-mail distribution services allowing: investors to stay current on new deals within their area of interest; portal 902 would provide updates on deals on a frequent basis, market participant or operators can reach out to investors to notify targeted groups of individuals of a new/pending transactions, and portal 902 can notify about new companies or deals and other metrics of interest (number of pending deals, new features/functions, others). The portal 902 may provide a ranking of services (rating of services by investors, companies, dealers, market participants, others). The portal 902 may provide an "Ask the Expert" service by creating a specialized information service to allow market participants to interact in near real time with knowledge centers.

Among the many advantages offered by embodiments described herein are improvements in communications and funding or trading possibilities offered by investor/issuer matching (sub)system/(sub)process 926. In the embodiment shown in FIG. 22, (sub)system/(sub)process 9276 enables both privately-and publicly-traded companies to access a variety of services and platforms related to listing, funding, and financial interest offerings.

The service utilities include referral service utility 912, information services utility 914, committee review utility 916, initial offering utility 918, and secondary trading utility 920.

Referral service utility 912 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network. The referral service utility 912 may provide and enable a variety of referral services, examples of which are described herein. For example, referral services may include analyst services, tax services, legal services, advisory services, consulting services, market participant (e.g. dealer) opening document services, data and information services, approved partner services, and so on.

The information services utility 914 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network. The information services utility 914 may provide and enable a variety of information services, examples of which are described herein. For example, information services may include investor education services, white paper and article services, social media and chat services, ask the expert services, standardized document services, and so on.

The information services utility 914 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network. The information services utility 914 may provide and enable a variety of information services, examples of which are described herein. For example, information services may include investor education services, white paper and article services, social media and chat services, ask the expert services, standardized document services, and so on.

Investor and issuing matching utility 926 may implement matching services for committee review utility 916, initial offering utility 918, secondary trading utility 920, and other components of system 900. Referral networks 908 and data vendor and websites may integrate with committee review utility 916, initial offering utility 918, secondary trading utility 920 to exchange electromagnetic signals defining data sets representing service and data requests and responses thereto. Investment vehicle systems 922 and sponsored systems 924 may integrate with committee review utility 916, initial offering utility 918, secondary trading utility 920 to exchange electromagnetic signals defining data sets representing service and data requests and responses thereto.

The sponsored systems 924 may provide services and data related to gate keeping and market participant screening.

The committee review utility 916 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network. The committee review utility 916 may provide and enable a variety of committee review services, examples of which are described herein. For example, committee review services may include issuer profile services, initial committee review services, sponsorship services, advisory review committee services, secure data room (tiered) services, and so on.

The initial offering utility 918 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network. The initial offering utility 918 may provide and enable a variety of initial offering services, examples of which are described herein. For example, initial offering services may include investor profile services, issuer disclosure services, market participant (e.g. dealer, investor) profile services, expert profile services, referral network profile services, secure data room (tiered) services, and so on.

The secondary trading utility 920 may be implemented using one or more computing devices operable to access remote network resources. The computing devices may be the same or different types of devices. The computing device may be implemented using one or more processors and one or more data storage devices configured with database(s) or file system(s), or using multiple devices or groups of storage devices distributed over a wide geographic area and connected via a network. The secondary trading utility 920 may provide and enable a variety of secondary trading services, examples of which are described herein. For example, secondary trading may include investor profile services, issuer disclosure services, market participant (e.g. dealer, investor) profile services, investor interest services, market data services, reporting facility services, secure data room (tiered) services, and so on.

Further aspects, features, and advantages of the embodiments described herein are provided in U.S. Provisional Application Nos. 61/735,836, 61/735,846, 61/838,696, 61/838,763, and 61/894,608 which are hereby incorporated herein by reference.

Various aspects, embodiments may be configured for processing of data related to transactions and other processes associated with any of a very wide variety of financial interests, including for example stocks, bonds, and all other forms of debt and/or equity instruments, options and other derivatives, currency exchange, and/or a wide variety of commodities, including goods, services, and energy.

While certain feature(s) and/or function(s) of systems, methods and computer readable instructions for automated trading of financial instruments have been described, still other aspects not explicitly described herein may be included as well in a wide variety of further embodiments. This disclosure is meant to be exemplary in nature of the described functionalities and not to be considered limiting.

What is claimed is:

1. A method for distributing event data received from a plurality of data feeds implemented by a computer system comprising a processor and at least one network interface, the method comprising:

receiving, over the at least one network interface, a plurality of data feeds from a plurality of remote input data sources, including at least one data feed comprising public data visible to a plurality of participants, and data feeds comprising data generated by a plurality of management systems of the plurality of participants, the plurality of data feeds comprising a plurality of events, said data feeds including a first data feed provided by a first user;

determining and applying to the plurality of events, by the processor, latency offsets for each event of the plurality of events based on times of receipt of events by the processor, wherein determining the latency offsets comprise using an anchor point associated with two of the plurality of data feeds to determine a latency offset for one of the two data feeds;

queuing, by the processor, the plurality of events based on the determined latency offsets; and generating and transmitting, using the processor, a consolidated view of the queued plurality of events to the plurality of participants, the consolidated view being renderable on a display of participant data processing systems, wherein the consolidated view includes events from the public data and events from the data generated by the plurality of management systems, the plurality of participants including the first user, the consolidated view thereby including events from the first data feed provided by the first user.

2. The method of claim 1, wherein generating the consolidated view comprises selecting data based on an identifier associated with the participant receiving the consolidated view.

3. The method of claim 1, wherein the plurality of participants comprises market participants, and the management system comprises an order management system or execution management system.

4. The method of claim 1, wherein the anchor point comprises a predefined key.

5. The method of claim 1, wherein a first one of the two data feeds is a less dense data feed and a second one of the two data feeds is a more dense data feed, and determining the latency offset for one of the two data feeds comprises correlating an event in the less dense data feed to an event in the more dense data feed using the anchor point and computing a relative timestamp offset between the less dense data feed and the more dense data feed.

6. A system for distributing event data received from a plurality of data feeds, the system comprising:

at least one network interface; and a processor configured to enable:

receiving, over the at least one network interface, a plurality of data feeds from a plurality of remote input data sources, including at least one data feed comprising public data visible to a plurality of participants, and data feeds comprising data generated by a plurality of management systems of the plurality of participants, the plurality of data feeds comprising a plurality of events said data feeds including a first data feed provided by a first user;

determining and applying to the plurality of events, latency offsets for each event of the plurality of events based on times of receipt of events by the processor, wherein determining the latency offsets comprises using an anchor point associated with two of the plurality of data feeds to determine a latency offset for one of the two data feeds;

queuing the plurality of events based on the determined latency offsets; and generating and transmitting a consolidated view of the queued plurality of events to the plurality of participants, the consolidated view being renderable on a display of participant data processing systems, wherein the consolidated view includes events from the public data and events from the data generated by the plurality of management systems, the plurality of participants including the first user, the consolidated view thereby including events from the first data feed provided by the first user.

7. The system of claim 6, wherein generating the consolidated view comprises selecting data based on an identifier associated with the participant receiving the consolidated view.

8. The system of claim 6, wherein the plurality of participants comprises market participants, and the management system comprises an order management system or execution management system.

9. The system of claim 6, wherein the anchor point comprises a predefined key.

10. The system of claim 6, wherein a first one of the two data feeds is a less dense data feed and a second one of the two data feeds is a more dense data feed, and determining the latency offset for one of the two data feeds comprises correlating an event in the less dense data feed to an event in the more dense data feed using the anchor point and computing a relative timestamp offset between the less dense data feed and the more dense data feed.

11. A non-transitory computer-readable medium bearing code which, when executed by at least one processor in a computing system, causes the system to implement the method of:

receiving, over at least one network interface, a plurality of data feeds from a plurality of remote input data sources, including at least one data feed comprising public data visible to a plurality of participants, and data feeds comprising data generated by a plurality of management systems of the plurality of participants, the plurality of data feeds comprising a plurality of events, said data feeds including a first data feed provided by a first user;

determining and applying to the plurality of events, by the processor, latency offsets for each event of the plurality of events based on times of receipt of events by the processor, wherein determining the latency offsets comprises using an anchor point associated with two of the plurality of data feeds to determine a latency offset for one of the two data feeds;

queuing, by the processor, the plurality of events based on the determined latency offsets; and generating and transmitting, using the processor, a consolidated view of the queued plurality of events to the plurality of participants, the consolidated view being renderable on a display of participant data processing systems, wherein the consolidated view includes events from the public data and events from the data generated by the plurality of management systems, the plurality of participants including the first user, the consolidated view thereby including events from the first data feed provided by the first user.

* * * * *